US011986862B2

(12) United States Patent
Akbar et al.

(10) Patent No.: US 11,986,862 B2
(45) Date of Patent: May 21, 2024

(54) SYSTEM AND METHOD FOR OPTIMIZING A CLEANING SESSION OF A FOOD PROCESSING SYSTEM

(71) Applicant: John Bean Technologies Corporation, Chicago, IL (US)

(72) Inventors: Alaska Akbar, Munich (DE); Erland Leide, Helsingborg (SE); Jean Bülow, Helsingborg (SE); Owen E. Morey, Huron, OH (US); Dominik Deradjat, Munich (DE)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 18/550,627

(22) PCT Filed: Apr. 25, 2023

(86) PCT No.: PCT/US2023/019834
§ 371 (c)(1),
(2) Date: Sep. 14, 2023

(87) PCT Pub. No.: WO2023/211959
PCT Pub. Date: Nov. 2, 2023

(65) Prior Publication Data

US 2024/0082884 A1 Mar. 14, 2024

Related U.S. Application Data

(60) Provisional application No. 63/369,685, filed on Jul. 28, 2022, provisional application No. 63/363,542, filed on Apr. 25, 2022.

(51) Int. Cl.
*B08B 3/02* (2006.01)
*B08B 3/10* (2006.01)

(52) U.S. Cl.
CPC . *B08B 3/02* (2013.01); *B08B 3/10* (2013.01)

(58) Field of Classification Search
CPC .... B08B 3/02; B08B 3/10; B08B 3/00; B08B 5/00; A23C 7/02; A23L 3/003; A23L 3/00; A47J 31/60; A47L 11/4011; A61L 2/16
See application file for complete search history.

(56) References Cited

U.S. PATENT DOCUMENTS 5,581,836 A 12/1996 Kleber
6,055,996 A 5/2000 Sprenger et al.
(Continued)

FOREIGN PATENT DOCUMENTS

EP 1583027 A1 10/2005
EP 3155491 A1 4/2017
(Continued)

OTHER PUBLICATIONS

International Search Report and Written Opinion dated Aug. 11, 2023, issued in corresponding International Patent Application No. PCT/US2023/019843, filed Apr. 25, 2023, 10 pages.
(Continued)

*Primary Examiner* — Alexander Markoff
(74) *Attorney, Agent, or Firm* — Christensen O'Connor Johnson Kindness PLLC

(57) ABSTRACT

A system for optimizing a cleaning process of a food processing machine having at least one sensor and a computing device having at least one processor and a non-transitory computer-readable medium that is communicatively coupled to the food processing machine and a data store and computer-executable instructions stored thereon including executing instructions by the at least one processor to cause the computing device to perform actions including: receiving, by the computing device, data from the at least
(Continued)

one sensor; processing, by the computing device, the data from the at least one sensor; and displaying, by the computing device, processed sensor data as a first metric relating to at least one cleaning step of a selected cleaning session of the food processing machine compared to an average first metric of the at least one cleaning step of a plurality of past cleaning sessions of the food processing machine.

20 Claims, 19 Drawing Sheets

(56) References Cited

U.S. PATENT DOCUMENTS

| | | | |
|---|---|---|---|
| 6,264,889 | B1 | 7/2001 | Tottenham et al. |
| 8,025,740 | B2 | 9/2011 | Juergens et al. |
| 8,443,757 | B2 | 5/2013 | Westman et al. |
| 9,017,485 | B2 | 4/2015 | Murthy et al. |
| 9,441,991 | B2 | 9/2016 | Haga et al. |
| 9,863,694 | B2 | 1/2018 | Broadbent |
| 10,143,135 | B2 | 12/2018 | Xu et al. |
| 10,210,486 | B2 | 2/2019 | Heinis et al. |
| 10,506,019 | B2 | 12/2019 | Brian |
| 10,755,210 | B2 | 8/2020 | Curran et al. |
| 10,842,158 | B2 | 11/2020 | Verouden et al. |
| 11,055,797 | B1 | 7/2021 | Carone |
| 11,300,300 | B2 | 4/2022 | Weber |
| 11,308,788 | B2 | 4/2022 | Hayes et al. |
| 2005/0098575 | A1 | 5/2005 | Carhuff et al. |
| 2009/0038455 | A1 | 2/2009 | Strong et al. |
| 2011/0274138 | A1 | 11/2011 | Auret et al. |
| 2012/0302854 | A1 | 11/2012 | Kamath et al. |
| 2013/0018831 | A1 | 1/2013 | James et al. |
| 2014/0134299 | A1 | 5/2014 | Guidorzi et al. |
| 2015/0219380 | A1 | 8/2015 | Murthy et al. |
| 2015/0339634 | A1 | 11/2015 | Xiao et al. |
| 2017/0140343 | A1 | 5/2017 | Heinis et al. |
| 2017/0176019 | A1 | 6/2017 | Bhogal et al. |
| 2018/0341891 | A1 | 11/2018 | Setchell et al. |
| 2019/0093901 | A1 | 3/2019 | Weber |
| 2019/0190739 | A1 | 6/2019 | Guinard et al. |
| 2020/0122202 | A1 | 4/2020 | Kraus et al. |
| 2020/0364633 | A1 | 11/2020 | Curran et al. |
| 2020/0402021 | A1 | 12/2020 | Jones et al. |
| 2021/0090188 | A1 | 3/2021 | Lai et al. |
| 2021/0198579 | A1 | 7/2021 | Quanci et al. |
| 2021/0224714 | A1 | 7/2021 | Erickson et al. |
| 2021/0285653 | A1 | 9/2021 | Bhogal et al. |
| 2021/0335121 | A1 | 10/2021 | Brinkman et al. |
| 2021/0350689 | A1 | 11/2021 | Kelly |
| 2022/0111097 | A1 | 4/2022 | Hassell |
| 2022/0125070 | A1 | 4/2022 | Feola |

FOREIGN PATENT DOCUMENTS

| | | | | | |
|---|---|---|---|---|---|
| EP | 3155564 | A1 | | 4/2017 | |
| EP | 3180746 | A1 | | 6/2017 | |
| EP | 2528848 | B1 | * | 10/2018 | ............ B65G 43/00 |
| EP | 3426049 | B1 | | 5/2020 | |
| EP | 2954273 | B1 | | 7/2020 | |
| EP | 3446040 | B1 | | 6/2021 | |
| EP | 3870018 | A1 | | 9/2021 | |
| EP | 3872403 | A1 | | 9/2021 | |
| WO | 2013/188246 | A2 | | 12/2013 | |
| WO | 2021134071 | A1 | | 7/2021 | |
| WO | 2021137775 | A2 | | 7/2021 | |
| WO | 2021146624 | A1 | | 7/2021 | |
| WO | 2021184003 | A1 | | 9/2021 | |
| WO | 2021222170 | A1 | | 11/2021 | |
| WO | WO 2022/078839 | | * | 4/2022 | |

OTHER PUBLICATIONS

Goode, K.R., et al., "Fouling and Cleaning Studies in the Food and Beverage Industry Classified by Cleaning Type," Comprehensive Reviews in Food Science and Food Safety, vol. 12(2):121-143, Mar. 2013.

Anet Režek Jambrak, et al., "Internet of Nonthermal Food Processing Technologies (IoNTO): Food Industry 4.0 and Sustainability," Appl. Sci. 2021, 11(2), 686, <https://www.mdpi.com/2076-3417/11/2/686>, Jan. 2021.

Curran, J., "Exploring the Secrets of CIP," Food Quality & Safety, <http://www.foodqualityandsafety.com/article/exploring-secrets-cip/?singlepage=1&theme=print-friendly>, Sep. 19, 2017, 5 pages.

Jude, B, and E. Lemaire, "How to Optimize Clean-in-Place (CIP) Processes in Food and Beverage Operations," Schneider Electric White Paper, <https://download.schneider-electric.com/files?p_enDocType=White+Paper&p_File_Name=998-2095-12-09-13AR0_EN_CIP.pdf&p_Doc_Ref=998-2095-12-09-13AR0_EN>, Sep. 12, 2013, 12 pages.

* cited by examiner

SYSTEM AND METHOD FOR OPTIMIZING A CLEANING SESSION OF A FOOD PROCESSING SYSTEM

CROSS-REFERENCES TO RELATED APPLICATIONS

This application claims the benefit of U.S. Provisional Application No. 63/363,542, filed Apr. 25, 2022, and the benefit of U.S. Provisional Application No. 63/369,685, filed Jul. 28, 2022, both of which applications are incorporated herein by reference in their entireties.

BACKGROUND

Industrial freezers typically house a conveyor, which carries food products along a product path within the freezer environment. By traveling along the conveyor path, the food products have sufficient dwell time in the freezer to be cooled down to a desired temperature, usually to where free water in the food product will form ice crystals as the product reaches a temperature well below the freezing point of water.

Cooling the food product is accomplished by moving chilled air through the conveyor path by forced or induced air convection. In some freezers convection is so very high in velocity, it is said to be impinging on to the food products being conveyed. Convection air movement within a freezer housing is typically produced at least in part by one of more fans. As convection air moves through the food product path, where food products are warmer, heat is added to the air by the cooling food product as it is conveyed through the conveyor path. Rechilling of the heated convection air is achieved normally just outside the process zone by passing of the heated air through a heat exchanger called an evaporator.

The evaporator is typically of fin and tube construction, or just solely many tubes, which connect to create a refrigerant circuit path. Outside the tubes are narrow passages for the convection air movement. Inside the tubes is a flow path for very cold liquid refrigerant, which evaporates within its own path when following the tube circuit. Liquid refrigerant, having just exited a metering device and changing pressure entering the evaporator, rapidly gives a high rate of heat removal from the air stream moving around the exterior of the tubes passing by many tubes in the evaporator.

During production, where the process is conveying food product through the convection air stream and food is chilling or freezing, it may be necessary to periodically defrost the evaporator coil. Frost tends to build up over time, blocking off the narrow heat transfer passages in one or typically multiple evaporator coils. Defrosting an evaporator coil may be accomplished using various methods. In one example, defrosting an evaporator coil starts with shutting off refrigerant flow to it, and then defrost can be accomplished by various defrost techniques, such as by deluge with water or hot refrigeration gases. In another example, high-pressure nozzle blown air is used to defrost the coil (e.g., air defrost or ADF), which does not require loss of coil cooling for the process. In another example, a hot gas defrost technique may be used.

It may also be necessary to periodically defrost the entire freezer system (e.g., all the components inside the freezer housing, including the freezer housing walls) once the production process period ends. The freezer system may be defrosted either after the evaporator coil is defrosted or together with the evaporator coil defrost. In one example, refrigerant flow is stopped, the evaporator coil is optionally defrosted, and the freezer is then brought up in temperature where remaining frost melts and a substantial amount of water falls to the floor and drains away. Once the freezer temperature is above freezing and the coils are mostly clear of frost, the freezer may be cleaned at sanitary temperatures using hot water and various soaps and detergents in solution. Spray nozzles or other devices inside and outside the freezer are used to remove any accumulated filth particles and the deeper frost deposits.

During production, convection air moves from food to conveyor, to all surfaces inside the freezer including the airside of the evaporator coil. All convection air-exposed freezer surfaces must be periodically cleaned to high standards of sanitation, including all surfaces within the housing enclosure (e.g., all the components inside the freezer housing, including the freezer housing walls) as well as conveyor portions which extend outside the freezer walls.

Another consideration in cleaning is removal of debris accumulation. A food particle drop zone is located on the floor vertically beneath the food conveyor path, where small pieces of food items smaller than the conveyor mesh opening fall off and accumulate on the floor. Such accumulated debris must later be removed by cleaning.

The cleaning process typically involves multiple steps, including but not necessarily limited to the steps of: defrosting; then applying cleaning/disinfectant foam to the freezer walls, conveyor, blowers and other equipment in the freezer; rinsing; inspecting and spot cleaning; and drying. Heat is applied to clean-in-place system (CIP) solutions to disinfect and clean surfaces where temperatures are held above 150° F. (65° C.), but generally not greater than 180° F. (82° C.). One or more other steps may be employed as needed. Both the application of the cleaning/disinfectant foam to the freezer surfaces, the conveyor, the blower fans, and other equipment in the freezer, and rinsing can be carried out using nozzles built into to freezer, using a robot or manually. For built-in nozzles and when using a robot, a control system can automatically control the application of the cleaning/disinfectant foam and rinsing, as well as of course the defrosting and drying steps.

Systems and methods for improving the defrosting and cleaning process (or simply the "cleaning process") of an industrial freezer or the cleaning processes of other industrial food processing machines are disclosed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for optimizing a cleaning process of a food processing machine includes a food processing machine having at least one sensor for performing at least one of detecting and measuring a physical property of the food processing machine during a cleaning session, a machine computing device having at least one processor and a non-transitory computer-readable medium, wherein the machine computing device is communicatively coupled to the food processing machine, wherein the non-transitory computer-readable medium has a data store and computer-executable instructions stored thereon, and wherein the instructions, in response to execution by the at least one processor, cause the machine computing device to perform actions including: receiving, by the machine computing device, data from the at least one sensor; processing, by the machine computing device, the data from the at least one sensor; and displaying, by the machine computing device, processed sensor data as a first metric relating to at least one cleaning step of a selected cleaning session of the food processing machine compared to an average first metric of the at least one cleaning step of a plurality of past cleaning sessions of the food processing machine.

In some embodiments, a method for optimizing a cleaning process of a food processing machine includes performing, with at least one sensor, at least one of detecting and measuring a physical property of a food processing machine during a cleaning session; receiving, by a machine computing device, data from the at least one sensor; processing, by the machine computing device, the data from the at least one sensor; and displaying, by the machine computing device, processed sensor data as a first metric relating to at least one cleaning step of a selected cleaning session of the food processing machine compared to an average first metric of the at least one cleaning step of a plurality of past cleaning sessions of the food processing machine.

In some embodiments, a method for optimizing a cleaning process of a food processing machine includes performing, with at least one sensor, at least one of detecting and measuring a physical property of a food processing machine during a cleaning session; receiving, by a machine computing device, data from the at least one sensor; processing, by the machine computing device, the data from the at least one sensor; displaying, by the machine computing device, processed sensor data as a first metric relating to at least one cleaning step of a selected cleaning session of the food processing machine compared to an average first metric of the at least one cleaning step of a plurality of past cleaning sessions of the food processing machine; displaying, by the machine computing device, a status indicating an alarm generated during a step of a cleaning session; and at least one of displaying and performing, by the machine computing device, a machine cleaning optimization step for addressing the issue that generated the alarm during the step of the cleaning session in response to the first metric relating to at least one cleaning step of the cleaning session of the food processing machine being outside a predetermine range of the average first metric of the at least one cleaning step of a plurality of past cleaning sessions of the food processing machine.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
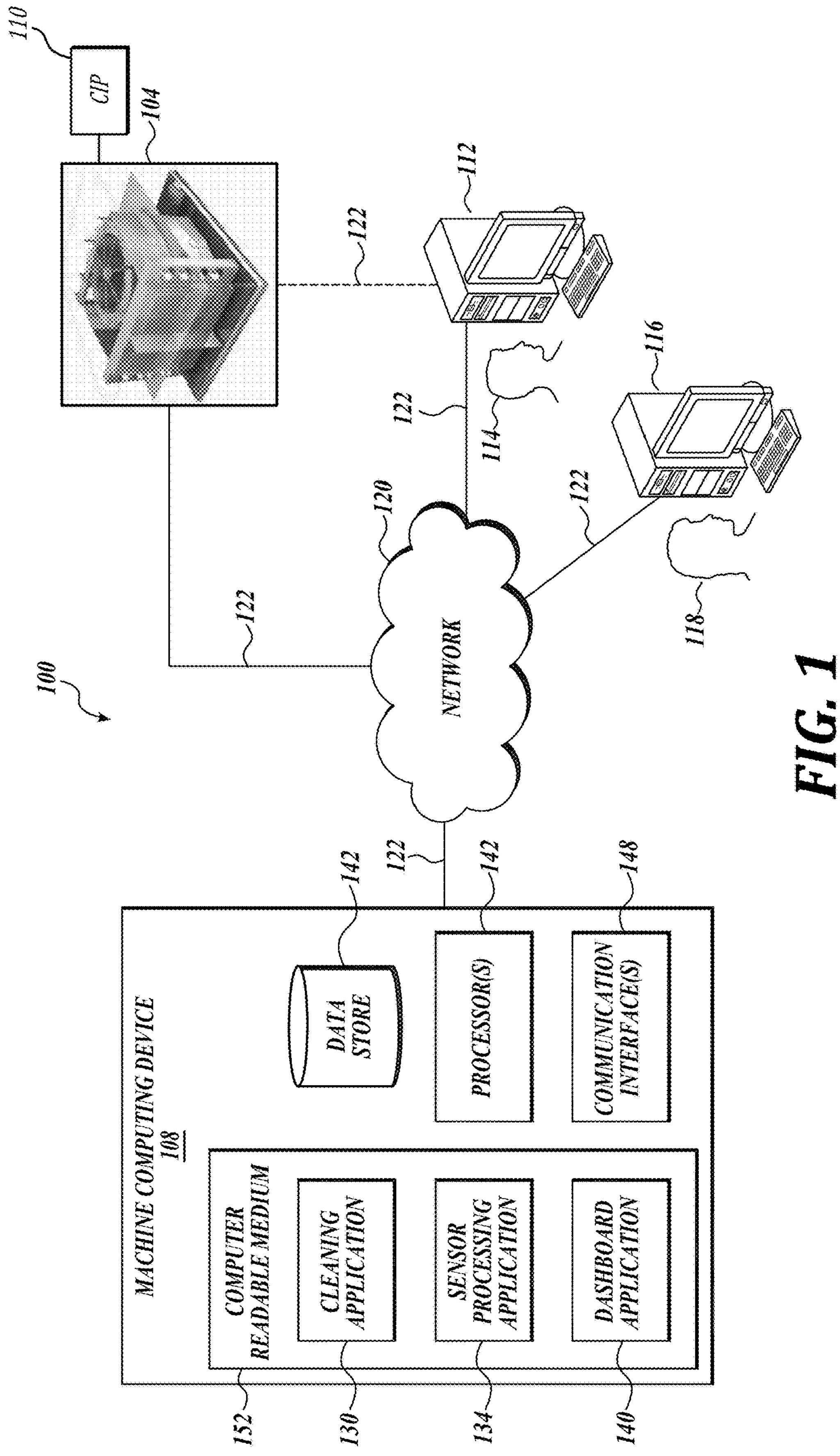
FIG. 1 is a schematic illustration of a non-limiting example embodiment of a system for monitoring, recording, and analyzing key metrics of a cleaning process of a food processing machine ("machine") according to various aspects of the present disclosure.

The industrial freezer is a sanitary process environment maintained at set conditions for lowering the temperature of food products to preserve them prior to shipping to the marketplace. The freezer housing enclosure houses all necessary subsystems for freezing plus tons of food passing through during time of production. The freezer housing enclosure must be prepared prior to production in similar ways to how a can, bottle, tray, etc. is prepared, which includes using sanitizing processes such that surfaces are sanitized prior to direct food contact. In other words, the freezer housing enclosure and internal parts should be treated as though it is a food containing vessel which contains food product safe for human consumption.

Cleaning food processing machines takes the machine off-line; i.e., it stops food processing and production. Some machines, like industrial freezers typically need to be taken offline and cleaned daily while others run for extended periods over many days of operation with cold keeping periods in between multiple production days. Actual cleaning by a clean in place (CIP) system may only happen once a week. Between production cycles, whether cleaning is done on a daily cycle or on a more lengthily cycle period via cold keeping between production shifts, it is important to complete the cleaning process in a timely manner so that the machine can be placed back into service fully cleaned and on schedule. The machine is typically cleaned when not in use (e.g., overnight or longer periods) to minimize food processing disruption.

Cleaning must remove all soiled food filth from affected freezer surfaces, and cleaning processes are often varied from site to site according to the type of food product filth byproduct that deposits inside the freezer. For instance, the cleaning process may be tailored to the type of food product in terms of ease of cleaning and the depth of debris deposits built up during production. For any given food product, it is also important to complete each cleaning event with care to ensure good cleaning process consistency relative to solution spray coverage, chemical solution strengths, heated temperature and time durations of each cleaning process step, as well as being very consistent from one cleaning event to the next for a given product type. One misstep with consistency performance with any of these individual contributors to the overall cleaning process can affect overall process performance in terms of filth deposits left on surfaces, which later could give harborage to microorganism growth.

Such microorganism growth could cause human illnesses if the pathogen becomes foodborne and is ingested. Freezers are especially susceptible to psychrotolerant bacterium such as *Listeria monocytogenes* which have tolerance to the cold as low as about −1.5° C. and as high as about 150° F. (65° C.). Food byproduct debris left in the freezer by inadequate cleaning are both a harborage and food for growth of *Listeria monocytogenes* or other pathogens. Monitoring, recording, and analyzing key performance data of a cleaning process is very important to applying the right cleaning process for food safety attainment.

Because the machine is cleaned when it is not in use, the machine is typically cleaned at off hours times (e.g., in the night or early morning) when there may be insufficient managerial oversight of the cleaning process that is prone to nonconformance to the specified process requirements. Accordingly, the owner of the machine has very little insight into the cleaning process nor enough control over the process. The cleaning process is a critical part of optimal machine operation to ensure there are no sanitation or contamination issues when processing food.

The goal of the freezer cleaning process is to remove all filth residues dropped or precipitated by high fan convection flow onto surfaces inside the freezer or residues that are a result of microbiological growth. Filth is a known harborage for pathogens. If a pathogen is or becomes present, the pathogen (like *Listeria*) may form a film deposit harborage called a biofilm that is hard to remove. It is well known that microbiological life must have an environment temperature that is within approximately a 40° F. (4.4° C.) to 140° F. (60° C.) temperature range that is held for a sufficiently long time to support growth. Cleaning must not only remove all types of films or just individual single point deposits, but also be lethal to the pathogens which themselves can form biofilms.

Occasionally in reaction to found pathogen growth, lethality and cleaning effectiveness must be reviewed and proven again by testing events held by food safety personnel. During down time periods, when equipment is not in use, those skilled in food safety and equipment cleaning effectiveness assessment will test cleaning effectiveness by use of various test methods post cleaning process. Plant operations and government inspection personnel of course visually inspect for filth daily, but also food safety personnel as per them fulfilling HACCP roles may apply swabs attempting to collect microorganisms from cleaned surfaces, followed by doing culture testing of the swab resultant to find if any appreciable microorganism growth happens in the culture.

Also, cleaning system effectiveness can be assessed by a manual test called "riboflavin testing" where a film layer is deposited and let to dry followed by precleaning images taken in special lighting showing the riboflavin filth surrogate in the images. Then, a normal cleaning cycle is performed. Again, in the special lighting post cleaning, photo images are taken to indicate if the known bright translucence of the riboflavin deposited test film material, applied earlier, still shows up. If no translucent material shows from the earlier deposit placement, cleaning was effective, and if translucent material does show from the earlier deposit placement, cleaning must be improved in the given area. Riboflavin testing generally is done in reaction to microorganism detection.

It can be appreciated from the foregoing that any filth missed by a cleaning process is a harborage for the possibility that microorganism life could be supported. Therefore, a method for detection of the filth film layers building up over time due to cleaning ineffectiveness is a poxy indicating probability of microorganism growth. Assessing the cleaning effectiveness and/or machine performance before and/or after times of cleaning effectiveness assessments can be used to improve the cleaning process effectiveness.

Certain methods may be used to monitor the machine performance and/or the cleaning process to prevent the buildup of filth film layers. For instance, temperature sensing monitoring can be indicative of conditions that are fertile for *Listeria* or other biofilm growth usually found in harborages as described above. The whole of the machine enclosure interior, external conveyor paths and especially the floor must have temperatures brought up high enough during sanitation cleaning to eliminate the possibility of filth, films, and microbes.

Sometimes floor frost heating countermeasures are used to keep frost accumulation under the floor in check. Failure of floor heating can lead to frost under the floor, causing unduly cool floors as frost accumulates over time under the floor skin. Such accumulation becomes apparent when, during down time periods, the floors stay very cool, which indicates frost or ice is under the floor skin. Thus, under floor skin frost accumulation, where floor heating counter measures are deficient or had failed, has the effect of keeping the floor and structures proximate to the floor at much lower temperatures than the required cleaning temperatures and temperatures that are required for microorganism lethality. Freezer floor sanitation health monitoring via temperature or other related proxy measures is vital to floor sanitation and ultimately food safety.

In some embodiments of the present disclosure, systems and methods are provided for monitoring, recording, and analyzing key metrics of a cleaning process of a food processing machine, such as an industrial freezer. The "cleaning process" of a food processing machine may include particular cleaning programs (or "recipes") that may be tailored for the machine and/or the food product processed (e.g., variations in foam, water, chemicals, energy utilities, etc. used for the machine), some or all of the (manual or automatic) steps of the cleaning process (e.g., defrosting, applying cleaning/disinfectant foam, rinsing, inspecting, spot cleaning, and drying), particular iterations of the cleaning process for the machine (also called a "cleaning session" or a "cleaning cycle"), machine throughput after a cleaning session, other aspects of the process. Accordingly, the terms "process," "session," "recipe," "cycle", and the like may sometimes be used interchangeably.

The key metrics (hereinafter sometimes referred to as simply "metrics", "key performance indicators," or "KPIs") may include, for example, a specific order of each step in the cleaning process for the machine, the duration of a step, a status of each step, time spent on manual cleaning, a type and amount of cleaning foam used, an amount of water used, pH and concentration of chemicals, the amount of chemicals used or consumed, energy utilities used for defrosting and drying (e.g., energy utilities used for water deluge, high pressure air blow or air defrost (ADF), air movers, etc.), pump discharge pressure or spray nozzle performance, alarms/alerts issued during the cleaning process regarding problems that occurred, indications of pathogen lethality environmental conditions, etc. The foregoing list of key metrics or any other metrics not listed may be for a current cleaning session of a machine, a past cleaning session of the machine, and/or a plurality of past cleaning sessions of the machine (such as an average key metric for those sessions).

The metric information can be processed and visually/graphically presented on a dashboard for each cleaning session of the machine as well as for cleaning sessions of the machine over a desired time frame (e.g., session to session). The information from the dashboard provides transparency into the cleaning process for the machine as well as increased efficiency in assessing each session and the overall cleaning process for the machine. Using the information presented on the dashboard, a user can determine which steps of the cleaning process should be changed/corrected to improve the quality of the cleaning process. The user can also observe trends that indicate that an overall cleaning process change or correction is needed for optimizing the process and maximizing machine production.

The systems and methods disclosed herein are described with respect to the cleaning process of an industrial freezer; however, it should be appreciated that the systems and methods disclosed herein may be adapted for use with other food processing systems or machines, such as industrial ovens, dryers, fryers, charmarkers, searers, fillers, injectors, scalders, portioners, braisers, slicers, massagers, powder filling and processing machines, evaporators/concentrators, choppers/cutters/emulsifiers, molders, can seamers/closers, tray sealers, breaders, juicers, extractors, pasteurizers, sterilizers, peelers, corers, steamers, blanchers, tenderizers, macerators, poultry processors, postharvest (fresh produce) processors, filters, brine machines/systems, presses, high pressure processors, product labeling equipment, food inspection equipment, weighing and packaging equipment, etc. In that regard, any reference to an industrial freezer should not be seen as limiting. Moreover, the term "food processing machine", "food processing equipment", "food processing system" "machine," "food processor," or the like may be used interchangeably and shall not be considered limiting.

FIG. 1 is a schematic illustration of a non-limiting example of a system 100 for monitoring, recording, and analyzing key metrics of a cleaning process of a food processing machine according to various aspects of the present disclosure. As shown, the system 100 is deployed with respect to an industrial freezer 104, although, as noted above, the system 100 may be adapted for use with other food processing machines. The system 100 includes a CIP system 110 that is separate from or at least partially integrated into the freezer 104 for carrying out a CIP process for the freezer.

The system 100 may further include a machine computing device 108, an operator computing device 112, and a client computing device 116, which can communicate with each other and/or the industrial freezer 104 over at least one network 120. The network 120 may be any kind of network capable of enabling communication between the various components of FIG. 1 (e.g., between the machine computing device 108, the operator computing device 112, the client computing device 116, and the industrial freezer 104). For example, the network 120 can be a WiFi network. The various devices may interface with the network 120 through wired and/or wireless communications links 122.

The operator computing device 112, which may be any suitable computing device (such as a laptop computing device, a desktop computing device, a tablet computing device, a smartphone computing device, etc.), enables an operator 114 or other personnel associated with operation of and/or cleaning of the freezer 104 to control and/or monitor operations and/or cleaning of the freezer 104 through an interface displayed on the operator computing device 112. For instance, a food processing operator may control thermal processing aspects of the freezer 104 through the operator computing device 112, and a third-party maintenance operator or cleaning personnel may control maintenance and cleaning aspects of the freezer 104, respectively, through the operator computing device 112.

In instances where the cleaning process is done with a robot, a control system (on the operator computing device 112, the machine computing device 108 or another server or computing device in communication with the freezer 104) can automatically control at least some of the cleaning process steps. For instance, aspects of the freezer cleaning process may be automatically or semi-automatically controlled through a cleaning application 130 on the machine computing device 108, and the process may be monitored by the operator 114 using the operator computing device 112. It should be appreciated that the operator computing device 112 may be integrated into the freezer 104.

The client computing device 116, which may be any suitable computing device (such as a laptop computing device, a desktop computing device, a tablet computing device, a smartphone computing device, a wearable device, etc.), may be used to monitor, record, and analyze key metrics of the freezer cleaning process. For instance, the client computing device 116 may be used to display the dashboard results of the system 100 when monitoring, recording, and analyzing key metrics of the freezer cleaning process. In that regard, the client computing device 116 may be used by management personnel 118 associated with food processing aspects of the freezer (i.e., different than the operator of the freezer 104). The management personnel 118 may include, for instance, the machine owner or production manager of the freezer 104. However, it should be appreciated that devices 112 and 116 may provide (optionally selective) access to the same information. In that regard, the term "user" may sometimes be used to refer to the operator 114 and/or the management personnel 118.

Figure 2A:
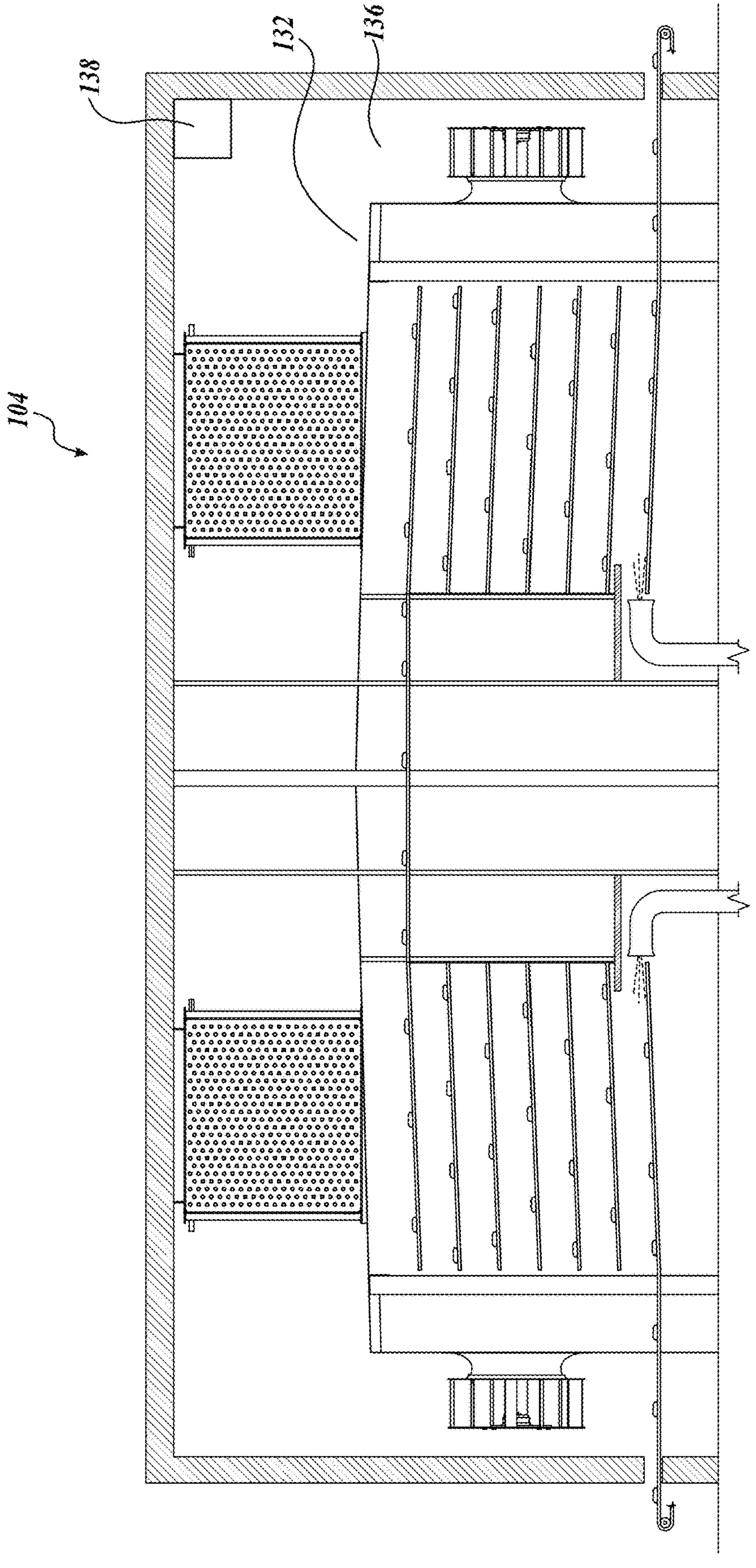
FIG. 2A is a cross-sectional view of a spiral freezer for use with the systems and methods disclosed herein.

As noted above, the system 100 is shown deployed with respect to an industrial freezer 104. The industrial freezer 104 may be any industrial freezer that may benefit from monitoring, recording, and analyzing a cleaning process using the system 100 described herein. For instance, as shown in FIG. 2, the industrial freezer 104 may be a spiral freezer having spiral conveyer 132 to carry food products along a spiral path within a chamber 136 of the freezer. Food processing operations may be controlled through an application of the machine computing device 108, another computing device(s) in communication with the network 120, a computing device of the freezer, and/or manually.

The freezer 104 may include a freezer sensor assembly 138 having various sensors and devices for detecting and/or measuring a physical property of the freezer during the cleaning process. As described above, the cleaning process of an industrial freezer may include the steps of: defrosting; applying cleaning/disinfectant foam to the freezer walls, conveyor, blowers and other equipment in the freezer; rinsing; inspecting and spot cleaning; and drying. The sensors and devices of the freezer sensor assembly 138 may be configured to measure and/or detect various physical properties during some or all of these cleaning steps for monitoring, recording, and analyzing key metrics of the cleaning process. For example, the freezer sensor assembly 138 may include time, temperature, humidity, optical, motion, flow meters, pH, chemical concentration, pressure, RFID, and other sensors to measure or detect various physical properties of the freezer during the cleaning process (not shown).

Temperature sensors may be used to measure the temperature of the freezer chamber 136 and/or its components before, during, and after one or more steps of the cleaning process. For instance, temperature and humidity sensors may measure the temperature and humidity inside the freezer chamber 136 at various locations inside the chamber during the cleaning process to accurately determine the chamber temperature and humidity at each location of measurement and each step of the cleaning process. Temperature and humidity sensors may measure the temperature and/or humidity of or at the freezer floor, freezer walls, freezer parts, the conveyor, the cleaning fluid, etc., during the cleaning process to, for instance, assess the effectiveness of the corresponding cleaning step.

Temperature sensors may be located strategically inside the freezer to accommodate the varied soak and/or holding time needed for the freezer part or area. For instance, internal parts or areas within the freezer having either a thinner or thicker cross-section have varied time functions of soak time to get up to desired cleaning temperatures at the surface. Soak ramp time up to temperature and the process holding time at a temperature reflect total time required for related cleaning steps. Thicker cross-sections are favored for temperature sensing but may not always reflect coolest points in the freezer as temperatures are rising to those necessary for effective cleaning and sanitation. Accordingly, the sensor location and type can be tailored as needed for capturing relevant measurement data.

As discussed above, time of exposure at higher temperature is lethal to pathogens. The humidity exposure can also affect lethal environmental conditions for pathogens. For instance, time greater than 5 minutes at a temperature equal to or greater than about 150° F. (65° C.) and a humidity level up to that approaching the dew point and kept to humidity levels high enough where surface conditions, if moist, can't be unduly cooled by evaporative cooling (which can keep surface temperatures cooler even though dry bulb temperatures are high) can produce lethal environmental conditions for pathogens. Thus, control of heating and humidity are both relevant to microbe lethality.

Steam injection or other means of moisture addition plus any supplementary heating are necessary to create the combination of environmental conditionings necessary to be lethal to microbiological life in a freezer. Temperature and humidity sensors can be used to monitor such a process to assure that every part of the interior surfaces are treated with homogenous lethal environmental conditions for the necessary amount of time at suitable surface temperatures.

Motion sensors may be used to detect, for instance, the opening and closing of a freezer door, movement of components within the freezer (e.g., the conveyor), etc. In this manner, an alarm may be generated if, for instance, the freezer door is opened during a cleaning process, the freezer begins operating during a cleaning process, etc.

Image sensors and/or optical sensors may be used to visually record the interior of the freezer before, during, and/or after completion of the cleaning process. For instance, cameras may digitally capture images of the freezer chamber 136, including the walls, conveyer, blowers and other equipment in the freezer before and after the cleaning process. The captured images may be compared, for instance, to reference images showing clean components or equipment to measure and/or assess the cleaning process. The camera may transmit images (including but not limited to a stream of MJPEG frames or RAW frames), streaming video (including but not limited to a MPEG-4 stream, an HEVC/H.265 stream, or an H.264 stream), or any other image and/or video data to the machine computing device 108 or another computing device for processing.

As a specific example, images may be captured after an initial cleaning step of the food processing machine (e.g., rinse) to ensure that the debris is substantially removed from the interior of the machine. In that regard, the images may be used for quality assurance of the cleaning inspection process, where a cleaning personnel may "sign off" after a visual inspection of the machine before proceeding to the next cleaning step. In that regard, a digital signal indicating a "sign off" of the inspection may be sent from a computing device of the personnel for recording and/or display by the dashboard application 140.

Flow meters/gauges may be used to help measure fluid consumption during the cleaning process, such as the amount of water used. In that regard, a flow meter may be located near a drain of the freezer to measure the amount of fluid exiting the freezer during the cleaning process. Such a measurement can help determine the amount of fluid being recycled during the cleaning process. A flow meter may also be located on the defrost system of the freezer to help gauge the amount of fluid used during defrost, such as by deluge with water or hot refrigeration gases, by high-pressure nozzle blown air, or by a hot gas defrost technique.

RFID sensors, or RFID sensor tags may be used to detect environmental changes and events for the machine before, during, and/or after the cleaning process and communicate the data wirelessly to an RFID reader. Such environmental changes and events may include opening/closing of a machine access point (e.g., a door), the use of certain equipment in proximity to the machine (e.g., a spray hose or other manual cleaning device), etc. In one example, the RFID sensor tag may be considered a Lockout/Tagout (LO/TO) reader that detects an event during the LO/TO process and sends a signal indicating if/when a LO/TO event occurred.

Companies and personnel involved need to follow OSHA's LO/TO standard during a cleaning process to ensure operator safety. Generally, the LO/TO process is a safety protocol that ensures that the machine is properly secured during any human interaction with the machine where the unexpected energization or startup of the machine or equipment, or release of stored energy, could harm the human. In that regard, the LO/TO procedure includes procedures for releasing, locking out and verifying zero energy for every source of the machine. When an operator needs to enter or access the machine for cleaning, for instance, the operator must lock out the energy source(s) (e.g., lock the power button(s)/switch(es) to prevent it from being turned on) and physically hang a tag on or near the lock indicating which specific operator has locked out the machine. A LO/TO reader could be used to detect whether any or all aspects of the LO/TO process have occurred (a "LO/TO event"). Moreover, any other sensors, such as motion sensors, pressure sensors, etc., may be used to detect whether any or all aspects of the LO/TO process have occurred.

Figure 2B:
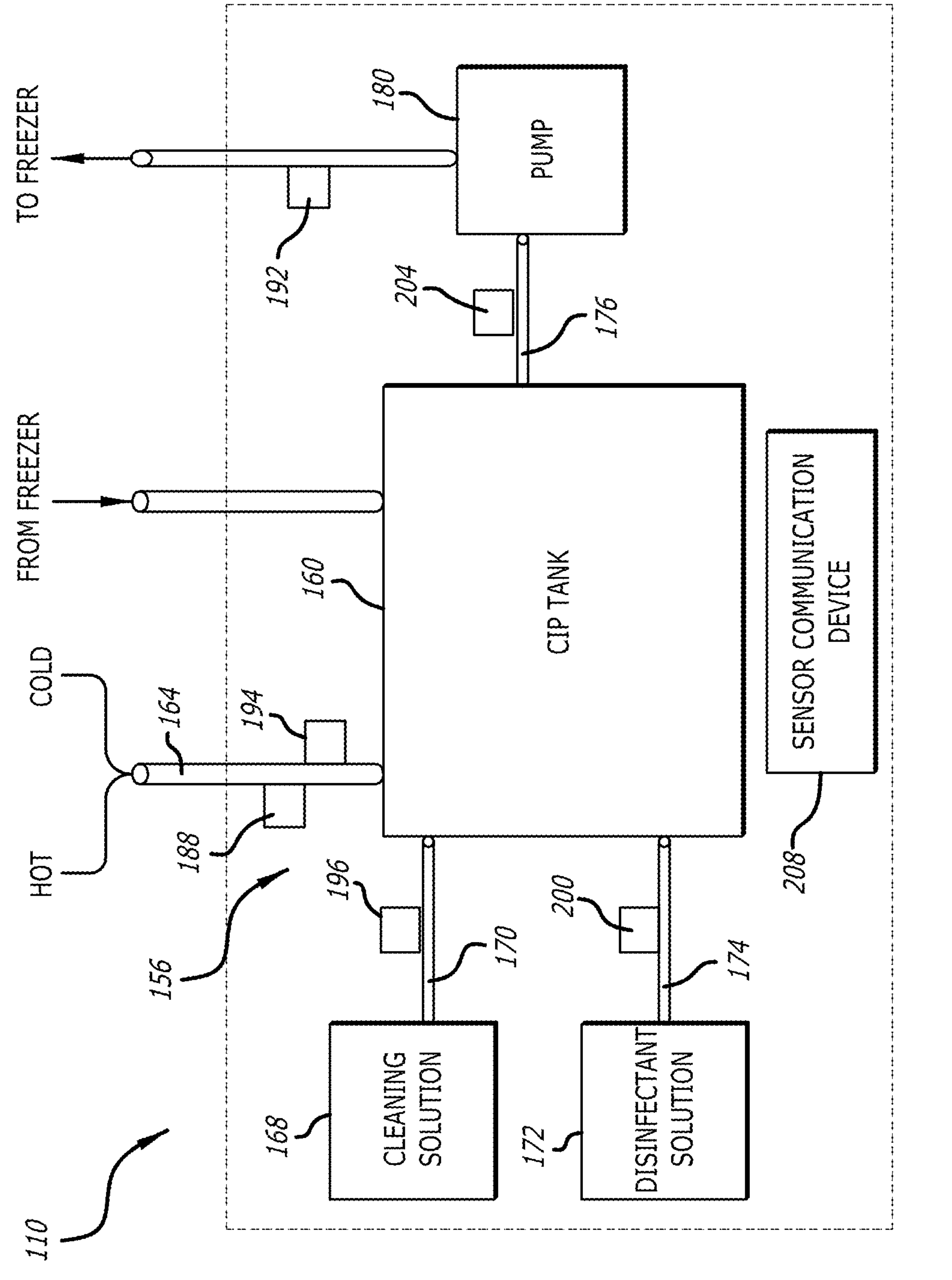
FIG. 2B is a schematic of an exemplary embodiment of a simplified CIP system for use with the systems and methods described herein

The CIP system 110 used with the freezer 104 or another piece of equipment may include a CIP sensor assembly 156 having various CIP system sensors and other devices for detecting and/or measuring a physical property of the CIP system during the cleaning process (see FIG. 2B). As described above, the cleaning process of an industrial freezer may include the steps of: defrosting; applying cleaning/disinfectant foam to the freezer walls, conveyor, blowers and other equipment in the freezer; rinsing; inspecting and spot cleaning; and drying. The sensors and devices of the CIP sensor assembly 156 may be configured to measure and/or detect various physical properties during some or all of these cleaning steps for monitoring, recording, and analyzing key metrics of the cleaning process. For example, the CIP sensor assembly 156 may include flow meters/gauges, temperature sensors, pH sensors, chemical concentration sensors, pressure sensors, and other sensors and devices to measure or detect various physical properties during the cleaning process.

Flow meters/gauges may be used to measure how much liquid or gas moves through a pipeline of the CIP system in a given period of time, indicating fluid consumption during the cleaning process, such as the amount of water used. Water is a scarce resource in many parts of the world. However, an adequate amount of water is needed to ensure sufficient cleaning. Flow meters may be used to generate alerts if local limits of water are surpassed. The flow meters may also be used to track the sufficiency of the water flow for adequate cleaning. For instance, the flow data may be used to deduce that less than a necessary amount of water was used to ensure an adequate spray-down of the machine.

Temperature sensors may also be used to determine if the water is within tolerances for a cleaning step(s) to ensure an adequate cleaning. For instance, temperature data of the water may be used to deduce that suitably hot water/steam was or was not used to create homogenous lethal environmental conditions for pathogens. On the other hand, energy may be conserved by using a lower temperature water for other steps in the cleaning process, such as a spray-down.

Flow meters/gauges may also be used to measure other fluid consumption, such as chemical consumption, during the cleaning process. The chemical consumption may be used to determine the concentration of the cleaning solution, for instance, for comparison to set dosing limits desired for the cleaning process. Flow meters/gauges may be used to generate alerts if chemical consumption is lower or higher than the preset limits for adequate cleaning. For instance, the flow data may be used to deduce that less than a necessary amount of chemicals was introduced into the cleaning solution to ensure an adequate removal of filth layers.

Chemical concentration sensors, pH sensors, chemical sensors and the like (hereinafter sometimes collectively called "chemical sensors") may also be used for assessing the pH and/or chemical concentration level of cleaning solutions. Chemical sensors can be placed in a container (e.g., a tank) of concentrated chemicals that are to be mixed with water, a container of concentrated chemicals already mixed with water, at an inlet of concentrated chemicals being introduced into a container, etc. The sensors can be used to measure the pH and/or chemical concentration level of the contained fluid, which can be used to assess the effectiveness of the cleaning solution for the cleaning process. For instance, if the concentration level (%) is too low, the cleaning solution may not be effective for cleaning. On the other hand, if the concentration level (%) is too high, it may be deduced that more cleaning solution than necessary is being used. The chemical sensor data can be analyzed with flow data of the water and/or the cleaning solution to assess the effectiveness of the cleaning solution for the cleaning process.

Pressure sensors may be used to assess pump performance for any fluids being supplied during the cleaning process. For instance, pressure sensors may be used to determine if pump discharge pressure is suitable for achieving a threshold back pressure level for creating a necessary volumetric rate distribution to each of the internal spray nozzles. Any change in pressure, even subtle, can be used to indicate an abnormality in spray performance. If left uncorrected, underperforming spray nozzles can lead to inadequate removal of films and filth harborages from internal surfaces and components.

The CIP sensor assembly 156 may include other sensors and devices, such as level sensors to monitor a fluid level in a CII' tank, position sensors for any of the valves, etc.

FIG. 2B depicts a schematic of one exemplary embodiment of a simplified CIP system 110 for use with the systems and methods described herein. The CIP system 110 may include a CIP tank 160 that receives water from a water inlet 164, which may receive water from hot and cold water sources. The CIP tank 160 may receive cleaning solution automatically or semi-automatically from a cleaning solution pipe 170 connected to a cleaning solution tank 168 and/or by adding the solution to the pipe manually through a filling inlet. Similarly, the CIP tank 160 may receive disinfectant solution automatically or semi-automatically from a disinfectant solution pipe 174 connected to a disinfectant solution tank 172 and/or by adding the solution to the pipe manually through a filling inlet. Fluid flows from the CIP tank through a CIP tank outlet 176, through a pump 180 (such as a lower pressure pump), and to the freezer through a pump outlet 184. Suitable valves may be used throughout the CIP system 110, which may be controlled by a PLC of the CIP system 110, such as the machine computing device 108.

The CIP system 110 may include a CIP sensor assembly 156 that includes a plurality of CIP sensors or other devices configured for detecting and/or measuring a physical property of the CIP system during the cleaning process, such as one or more of the CIP sensors discussed above. The CIP sensor assembly 156 includes a plurality of sensors that together provide insight into the various aspects of the CIP process such that the CIP process may be optimized.

In the depicted exemplary embodiment, the CIP sensor assembly 156 may include a first pressure sensor 188 on the water inlet 164 and a second pressure sensor 192 on the pump outlet 184, wherein the difference in pressure measured between the first pressure sensor 188 and the second pressure sensor 192 may be used to indicate whether the pump 180 is operating at an intended value or capacity. For instance, pump performance may be determined by pressure build up and the output flow. By measuring the pressure of the incoming water pressure with the first pressure sensor 188 and comparing the pressure to the output pressure of the pump (measured by the second pressure sensor 192), the pump contribution can be determined. If the difference in pressure is not within a specified range, an indication may be generated (such as by the dashboard application 140, described below) such that leakages or blockages in the pump mechanics can be assessed. Further, the pump pressure data can be used to determine effective fluid pressure for cleaning inside the freezer. For instance, if the pressure leaving the pump is insufficient, the fluid entering the freezer (e.g., through the spray nozzles) will not sufficiently distribute the fluid for cleaning. Accordingly, the pressure sensors can be used to help assess and optimize the cleaning process.

The CIP sensor assembly 156 may also include a first flow meter 194 on the water inlet 164, which may be used to track the total water consumed by the CIP system, either to provide an indication of insufficient water usage for proper cleaning, or water consumption that exceeds a predetermined limit. A second flow meter 196 may be located on the cleaning solution pipe 170, and a third flow meter 200 may be located on the disinfectant solution pipe 174. The flow through the second and third flow meters 196 and 200 may be used to determine whether the proper concentration of cleaning solution and disinfectant, respectively, is being used. For instance, the flow of cleaning solution through the cleaning solution pipe 170 may be compared to the total water flow into the CIP tank to assess cleaning solution concentration. Similarly, the flow of disinfectant solution through the disinfectant solution pipe 174 may be compared to the total water flow into the CIP tank to assess disinfectant solution concentration. An optional fourth flow meter 204 may be located on the CIP tank outlet 176 for measuring the flow of the fluid out of the CIP tank 160. If a measurement of a flow meter indicates that that the flow is different than expected, an indication may be generated to check whether a pipe is partially or completely blocked, whether a valve should be checked, etc.

Each flow meter may also be configured to measure the temperature of the fluid, and/or a separate temperature sensor may be included for each of the water inlet 164, the cleaning solution pipe 170, the disinfectant solution pipe 174, and/or the CIP tank outlet 176. The temperature sensor data can be used to determine whether the CIP fluid is within the desired temperature range, and if not, whether the temperature of the incoming water or the fluid from another part of the system (e.g., the cleaning solution and/or the disinfectant) is above or below a desired threshold.

Each flow meter may also be configured to measure a chemical concentration and/or pH of the fluid, and/or a separate chemical sensor(s) may be included for each of the cleaning solution pipe 170, the disinfectant solution pipe 174, and/or the CIP tank outlet 176. The chemical sensor data can be used to measure the pH and/or chemical concentration level of the fluid, which can be used to assess the effectiveness of the cleaning solution for the cleaning process. The chemical sensor data can be analyzed with flow data of the water and/or the cleaning solution to assess the effectiveness of the cleaning solution for the cleaning process. For instance, if the chemical concentration or pH level of the cleaning solution is outside a preferred range, and the flow rate sensor data of the first flow meter 196 indicates suboptimal flow, an indication may be generated that the cleaning solution pipe 170 needs to be assessed for blockages, leakage, etc.

Each CIP sensor of the CIP sensor assembly 156 may be in communication with at least one of the other CIP sensors and/or freezer sensors and/or in communication with the machine computing device 108 or another computing device of the system 100 through a communication device 208. For instance, the CIP sensors may be communicatively coupled via an IO-link, such as through one or more IO-link hubs that are connected to an IO-link master. The IO-link master, in turn, may communicate with the machine computing device 108 or another computing device of the system 100 via a standard messaging protocol, such as MQTT.

The CIP sensors may be configured as smart sensors or Internet of Things (IoT) devices configured for transmitting and receiving data over the network. In that regard, the IO-link master may include an IODD (TO Device Description) file that contains information about the various sensors (e.g., the device's identity, parameters, process data, diagnosis data, communication properties and the design of the user interface of engineering tools, etc.) such that the accurate sensor data may be communicated to the machine computing device 108. At the same time, control logic of the machine computing device 108 (such as the sensor processing application 134, described below) or another application or computing device of the system may be configured to receive and process the sensor data communicated from the CIP sensor assembly 156.

In that regard, the freezer sensor assembly 138 and the CIP sensor assembly 156 are in communication with one or more computing devices of the system 100 (such as the machine computing device 108, the operator computing device 112, and/or the client computing device 116) for carrying out aspects of the system. As will become better appreciated below, the sensor data is processed by one or more computing devices of the system 100 for implementing logic to monitor, record, and analyze key metrics of a cleaning process for improving aspects of the cleaning process.

FIG. 1 shows a block diagram that illustrates aspects of a non-limiting example embodiment of the machine computing device 108 according to various aspects of the present disclosure. The illustrated machine computing device 108 may be implemented by any computing device or collection of computing devices, including but not limited to a desktop computing device, a laptop computing device, a mobile computing device, a server computing device, a computing device of a cloud computing system, and/or combinations thereof.

In some embodiments, the machine computing device 108 is configured to store and process data for monitoring, recording, and analyzing key metrics of a cleaning process (es) of the freezer 104 as well as freezer operations relating to the cleaning process. As shown, the machine computing device 108 includes one or more processors 144, one or more communication interfaces 148, a data store 142, and a computer-readable medium 152.

In some embodiments, the communication interfaces 148 include one or more hardware and or software interfaces suitable for providing communication links between components. The communication interfaces 148 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

The data store 142 may store cleaning process data received from the cleaning application 130 and sensor data received from the sensor processing application 134 for retrieval by any of the applications of the machine computing device 108. The data store 142 may also store reference data, such as target or average metrics determined from the metric data of other machines or other cleaning sessions of the same machine, alarm data for the machine, etc., for use in analyzing the cleaning process.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. For example, in some embodiments, a cloud service such as Google Cloud Storage or Azure cloud storage may be used as a data store. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As shown, the computer-readable medium 152 has stored thereon logic that, in response to execution by the one or more processors 144, cause the machine computing device 108 to process data for monitoring, recording, and analyzing key metrics of a cleaning process(es) of the freezer 104 as well as freezer operations relating to the cleaning process. For example, the computer-readable medium 152 may include a cleaning application 130 generally configured to operate and/or control a cleaning process of the freezer, a sensor processing application 134 generally configured to process data from the freezer sensor assembly 138 and the CIP sensor assembly 156, and a dashboard application 140 generally configured to process data to determine key metrics of the cleaning process, visually/graphically present various key metrics on a display, and provide recommended solutions for improving the cleaning process.

Further description of the configuration of each of the applications of the machine computing device 108 is provided below. The cleaning application 130 will first be described.

As noted above, the cleaning application 130 may be used to control aspects of the freezer cleaning process, either automatically or semi-automatically. The operator may interact with the cleaning application 130 to select a freezer cleaning program or recipe from a list of predetermined programs, such as a specific cleaning program to clean the freezer 104 after processing a specific food product identified by a SKU (stock keeping unit). For instance, the cleaning program may be selected to accommodate the level of soiling of the freezer (e.g., chicken nuggets may produce less soiling than chicken wings covered in a sauce). The cleaning program may also be tailored to a specific day of the week (e.g., a deeper cleaning may be used at the end of the week versus the beginning of the week). In some instances, as mentioned above, machine production runs multiple days with nightly cold keeping prior to a cleaning cycle event and the program may be tailored to support such gaps in cleaning. In other instances, the cleaning program may be defined by manual inputs. The cleaning program may instead be controlled either automatically or manually through any other computing device in communication with the machine computing device 108.

In any event, the cleaning application 130 may send data regarding the cleaning program to the data store 142 and/or the dashboard application 140 for use in monitoring, recording, and analyzing key metrics of a cleaning process(es). For instance, the data may include the type of cleaning program used (e.g., defrost and clean), the steps included in the cleaning program, the SKU processed before the cleaning, the expected time duration for each step, etc.

The sensor processing application 134 of the machine computing device 108 will now be described. The sensor processing application 134 is generally configured to receive and/or retrieve sensor data from the freezer sensor assembly 138 and the CIP sensor assembly 156, process the sensor data, and output one or more signals to other modules, applications, or components of the machine computing device 108 or another computing device of the system 100. For instance, the sensor processing application 134 may process and send sensor data to the data store 142 for retrieval by the dashboard application 140 or other applications. In another aspect, the sensor processing application 134 may process and send sensor data directly to the dashboard application 140 for generating real time metrics of the cleaning process, an event, a status, a test, etc. In some embodiments, the sensors and devices of the freezer sensor assembly 138 and the CIP sensor assembly 156 may communicate with the sensor processing application 134 either periodically or continuously.

The dashboard application 140 is generally configured to process data for use in monitoring, recording, and analyzing key metrics of a cleaning process for a food processing machine, such as the freezer 104. For instance, real time sensor data received from the sensor processing application 134 may be used for monitoring and recording key metrics of a cleaning session during the session. In another aspect, past sensor data and other reference data may be retrieved from the database 142 for generating comparative key metrics for analyzing the cleaning process, such as the particular cleaning program being used. In another aspect, the dashboard application 140 may process sensor data and output one or more signals to a computing device (such as a networked device displaying a dashboard, an app on a wearable device of a plant manager, etc.) indicative of an event, a status, a test, etc., such that appropriate action may be taken manually in response to receiving the notification, automatically by the machine computing device 108 (e.g., the cleaning application 130 stops the CIP process, adjusts a parameter, step, duration, etc.), etc. It should be appreciated that the sensor data and reference data may be sent to the dashboard application 140 from the sensor processing application 134 and/or the database 142 on the machine computing device 108, and/or any other computing device in communication with the machine computing device 108.

As noted above, the dashboard application 140 processes the data to generate various key metrics for the cleaning process. Such key metrics may include, for example, the duration of each cleaning step, time spent on manual cleaning, cleaning solution/foam and water consumed, pump pressure, electricity used for defrosting and drying, the pH and/or chemical concentration level of a cleaning solution/foam, alarms/alerts issued regarding problems that occurred, etc. In some examples, the sensor data is processed to determine event durations, such as the duration of a particular cleaning step and/or the overall cleaning process, a duration of machine production before and/or after a cleaning process, a duration of any pause in a cleaning process, a duration of a machine event (e.g., opening/closing of the door), a duration of sensor activation (e.g., water supply on/off), etc.

The key metrics, once determined, can be visually/graphically presented by the dashboard application 140 on a display of a computing device, such as on a display of the client computing device 116. The information is arranged in a graphical user interface (GUI) shown on the display. The key metrics can be visually/graphically presented for each cleaning session as well as for over a desired time frame (e.g., sessions over time). The information presented by the dashboard application 140 can be used to improve or correct specific steps in the cleaning process as well as observe trends that indicate that an overall change or correction in the cleaning process is needed.

Figure 3:
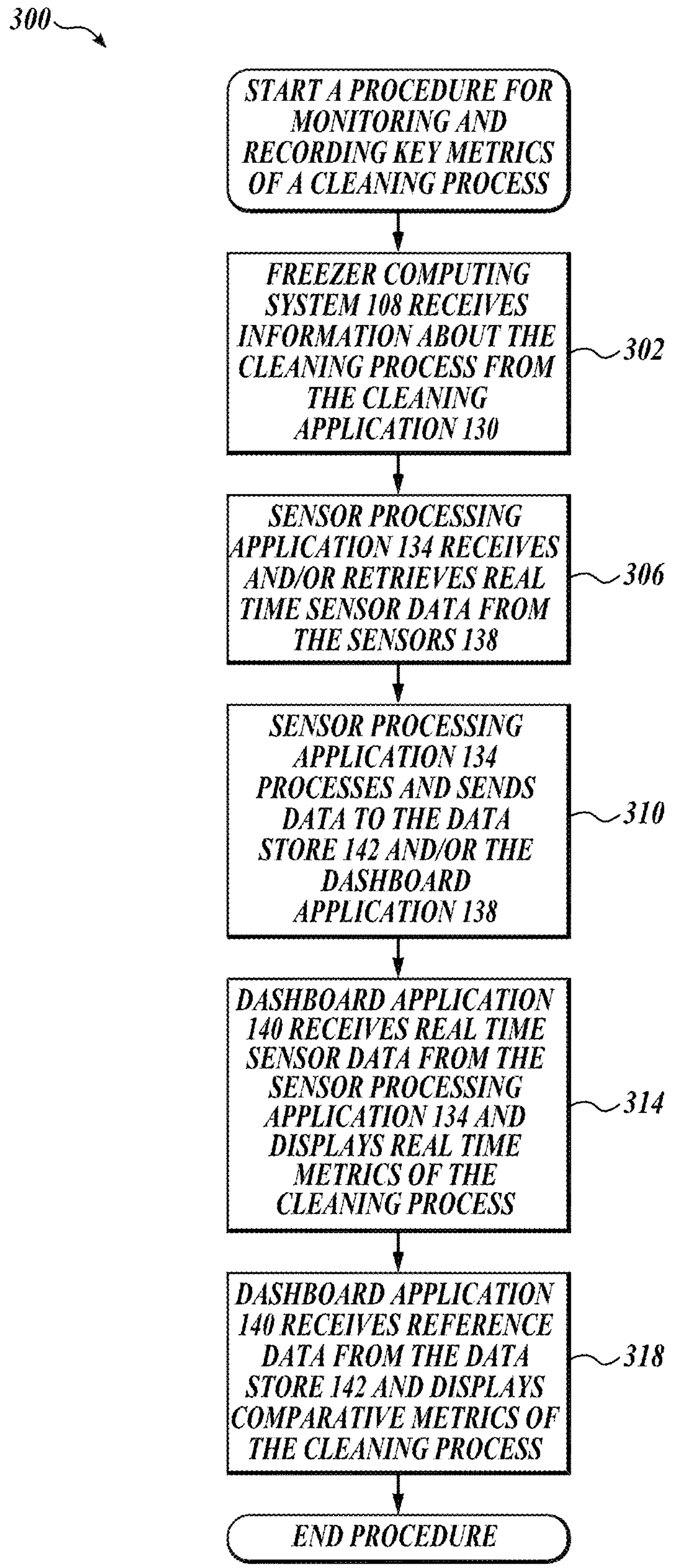
FIG. 3 is a flowchart that illustrates a non-limiting example embodiment of a method of monitoring and recording key metrics of a cleaning process according to various aspects of the present disclosure.

FIG. 3 is a flowchart that illustrates a non-limiting example embodiment of a method 300 of monitoring and recording key metrics of a cleaning process according to various aspects of the present disclosure. From a start block, the method 300 proceeds to block 302, where the machine computing device 108 receives information about the cleaning process from the cleaning application 130, such as, e.g., the date of a cleaning session, the product SKU processed before the cleaning session, the type of cleaning program used, the steps included in the cleaning program for that session, the expected time duration for each step in the session, etc.

The method 300 proceeds to block 306, where the sensor processing application 134 receives and/or retrieves real time sensor data from the freezer sensor assembly 138 captured during the cleaning session. After processing the sensor data, the sensor processing application 134 sends data to the data store 142 and/or the dashboard application 140 at block 310.

At block 314, the dashboard application 140 receives real time sensor data from the sensor processing application 134 and displays real time metrics of the cleaning session on a dashboard display. At block 318, the dashboard application 140 receives reference data from the data store 142 and displays comparative metrics of the cleaning process, such as data regarding the current sessions compared to past sessions or other reference data. The steps set forth in blocks 314 and 318 will be described in further detail below with respect to FIGS. 4-15. The method 300 then proceeds to an end block and terminates.

Figure 4:
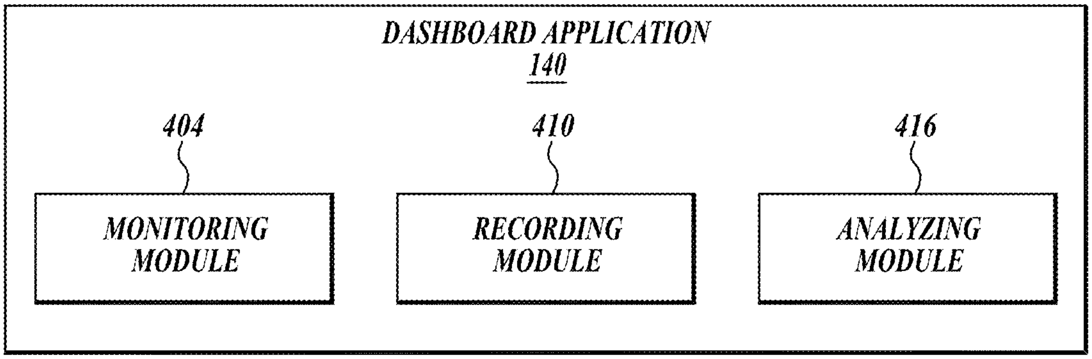
FIG. 4 is a block diagram that illustrates aspects of a non-limiting example embodiment of a dashboard application according to various aspects of the present disclosure.

FIG. 4 is a block diagram that illustrates aspects of an exemplary embodiment of the dashboard application 140 showing various modules that may be executed for carrying out aspects of the system and methods disclosed herein. More specifically, the exemplary modules shown and described herein may be used for monitoring, recording, and/or analyzing a cleaning process of a food processing machine. In that regard, in the exemplary embodiment the dashboard application 140 includes a monitoring module 404, a recording module 408, and an analyzing module 412.

The monitoring module 404, recording module 408, and analyzing module 412 are used to generate and display metrics or key performance indicators (KPIs) about the cleaning process as well as recommended steps for improving the cleaning process. As noted above, the KPIs may include information about the specific order of each step in the process, the duration of the cleaning process, the energy consumed during the process, alarms generated during the process, the duration of each cleaning step of the process, pH, concentration, the amount of chemicals used or consumed, a status of the process, pump discharge pressure or spray nozzle performance, pathogen lethality environmental conditions, etc. In that regard, KPIs may be particular to the type of food processing machine (such as a freezer), the cleaning session being analyzed, the cleaning program selected, the type of product or SKU processed by the machine before the session, etc.

For instance, the KPIs for a freezer may include information about each of the steps of a freezer cleaning process (e.g., defrost, foaming, rinsing, inspecting and spot cleaning, and drying), the components of the freezer used in the cleaning process or affected by the process (e.g., the nozzles, the blower, conveyor, etc.), and the CIP system used to carry out the CIP process. The KPIs for an oven cleaning program would correlate to different cleaning program steps (e.g., no defrost step) and different components. In another example, additional KPIs may be generated and displayed for a machine cleaning program after processing a wet product, which may require more cleaning steps or steps longer in duration than a cleaning program for a machine after processing a dry product. The KPIs may be either automatically selected by the dashboard application 140 (for instance, based on the cleaning program selected, the type of machine, the SKU processed by the machine, the CIP system used, etc.) or manually selected by a cleaning operator or machine owner/manager.

The KPIs are displayed on a display (such as on a display of computing devices 112 and/or 116) for use by a cleaning operator and/or a manager of the machine. Exemplary GUI screenshots showing a dashboard providing cleaning session KPIs are shown in FIGS. 5-13. The KPIs may be organized into various areas of the dashboard to separate the metrics of the cleaning process by category. Moreover, the KPIs are shown for either a single cleaning session or for sessions over time, which may be selected and/or changed in a navigation menu on the dashboard (see e.g., navigation menu 504 shown in a header for selecting a "Single Session" or "Sessions over Time").

Figure 5:
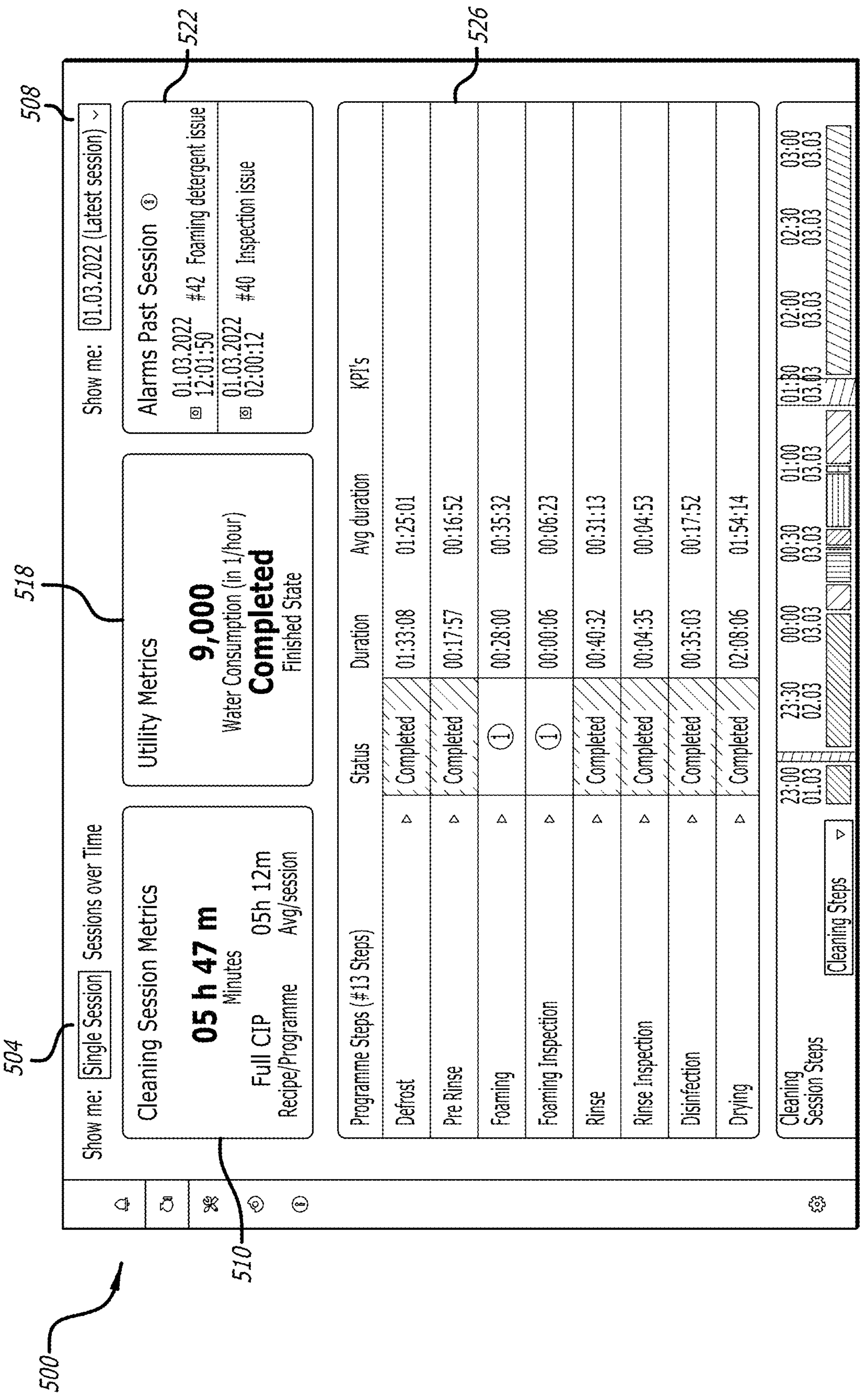
FIGS. 5-8 are exemplary GUI screenshots showing a dashboard providing cleaning session metrics of a single cleaning session of a machine.

The particular session for the dashboard may be selected and/or changed in a session menu included in the dashboard (see drop-down session menu 504 near a top of dashboard 500 shown in FIG. 5). In one example, if a cleaning session is in progress, the dashboard may default to the session in progress to show real time metrics, and the session menu may allow a user to select a past session to view the metrics for that session if desired.

The monitoring module 404, recording module 408, and analyzing module 412 of the dashboard application 140 will now be further described.

The monitoring module 404 may be generally configured to receive real time sensor data from the sensor processing application 134 and display real time KPIs of a cleaning session on a dashboard display for carrying out block 314 of method 300. The real time sensor data may include sensor data from one or more of the machine sensors such as the sensors described above, including time sensors, thermal sensors, humidity sensors, chemical sensors, flow meters, motion sensors, cameras, etc. The real time KPIs can be displayed on a display (such as on a display of computing device 112 and/or 116) and used by an operator, machine owner or manager for monitoring a cleaning session and attending to any issues that arise during the session.

The recording module 410 may be generally configured to receive real time sensor data and past sensor data from the sensor processing application 134 and/or the data store 142 and display KPIs of a completed cleaning session(s) on a dashboard display for carrying out blocks 314 and 318 of method 300, for instance. The KPIs of a completed cleaning session(s) can be displayed on a display (such as on a display of computing device 112 and/or 116) and used by an operator or manager for assessing a cleaning session, the overall cleaning process, machine performance, etc.

The analyzing module 418 may be generally configured to receive real time sensor data and past sensor data from the sensor processing application 134 and/or the data store 142 and display comparative KPIs of cleaning sessions as well as suggested solutions for improving the cleaning process. For instance, the analyzing module 418 may display KPIs comparing aspects of a current (or selected) cleaning session to past cleaning sessions. The analyzing module 418 may also be used to display KPIs of cleaning sessions over time. In that regard, the analyzing module 418 may also be used to carry out blocks 314 and 318 of method 300. The comparative KPIs and suggested solutions can be displayed on a display (such as on a display of computing device 112 and/or 116) and used by an operator or manager for assessing a cleaning session, machine performance, etc., as well as addressing any inefficiencies of the cleaning process.

Aspects of the monitoring module 404, recording module 408, and analyzing module 412 will become better understood with reference to the exemplary GUI screenshots shown in FIGS. 5-13, which will now be described in detail. For ease of reference, the same reference numeral will be used to identify the same or similar components of the dashboards, except for the reference numeral being in the '100 series corresponding to that dashboard.

As will become appreciated from the following, the information provided in the dashboard provides transparency into a cleaning session so that the machine owner or production manager can optimize the specific cleaning program for the machine, both by improving cleaning steps (e.g., ensuring that all desired areas are sprayed down during inspection, addressing any components or actions that trigger an alarm, etc.)

and conserving utilities (e.g., using only the amount of water, cleaning solution, etc., needed for the step). The information presented on the dashboard also increases efficiency in assessing the particular cleaning sessions and the overall cleaning process by providing KPIs for each step of the cleaning process as well as comparative metrics for quickly assessing the effectiveness and efficiency of the step. Further, the information displayed on the dashboard can be used for assessing and improving the overall cleaning process for the site and/or machine to maximize uptime of the machine. These benefits, as well as additional benefits, will become better understood by the dashboard examples discussed below.

FIG. 5 depicts an exemplary GUI screenshot showing a dashboard 500 providing KPIs of a single cleaning session for a machine (for instance, a session selected from menus 504 and 508). A first window 510 shows "Cleaning Session Metrics", which may include the duration of the cleaning session (e.g., hours and minutes), the type of cleaning program or "recipe" used (e.g., "Full CIP", which includes all the cleaning program steps, versus a shortened program of "Drying only" for example), as well as the average duration for past cleaning sessions of the same type (i.e. the same or similar cleaning program for that machine). By comparing the duration of the cleaning session to the average duration for past cleaning sessions of the same type within the first window 510, the user can quickly deduce whether the cleaning session ran longer than expected and investigate the cause further to improve future cleaning sessions and/or the overall cleaning process.

A second window 518 shows "Utility Metrics", which may include the energy consumed during the cleaning session (e.g., water consumption in liters per hour). Although not shown, the second window 518 may also show the average energy consumption for past cleaning sessions for that machine of the same type; i.e. the same or similar cleaning program. In another example, the second window 518 may show local limits for water or energy consumption and optionally provide any alerts if the limit is exceeded (e.g., show the energy consumed during the cleaning session in red font if it exceeds the limit).

The "Utility Metrics" may be a cue to a user to optimize the efficiency of the specific cleaning program being used to clean the machine. For instance, if the user sees that much more water was consumed than expected, the user can investigate certain steps of the cleaning program that consume water (such as pre-rinse, foaming, rinse, etc.). The "Utility Metrics" may be a cue to a user to optimize certain components of the machine impacting the cleaning process, such as the pump supplying pressure to the spray nozzles used to spray water. The user can investigate relevant steps by referencing other areas of the dashboard that provide KPIs pertaining to those steps, components, etc. With the KPI information, the user can determine if any action can be taken to make those steps more efficient, to resolve any component issues causing inefficiencies, etc.

The second window 518 may also show a status of the cleaning session for the machine (e.g., completed, aborted, canceled, etc.). Such status information can be used to quickly determine whether, for instance, the operator forced a shutdown of the cleaning program, whether the program was completed according to the manufacturer installed and recommended cleaning program, etc. In this manner, the machine owner or production manager can immediately determine whether the cleaning session was successful, or instead, whether an aspect of the machine or cleaning session requires investigation.

A third window 522 shows alerts or "Alarms", which may include any events triggered by sensor data that indicate an error, inefficiency, etc., that occurred during the cleaning session for that machine. For instance, the alarm may be generated by a sensor value surpassing or being below a threshold value for that sensor (determined by data science, calculated values, manufacturer settings, manual settings, processed past sensor data, local limits, or otherwise). For instance, the alarm may be generated when a cleaning solution concentration or detergent level goes below a recommended threshold, indicating that future cleaning sessions may be compromised in quality unless the cleaning solution/detergent is replenished. As another example, the alarm may be generated when a cleaning step has a longer or shorter duration than recommended per reference to a threshold value, indicating, for instance, that the cleaning step was not carried out per recommendations or requirements of the machine owner or manufacturer. As yet another example, an alarm may be generated when a temperature and/or humidity sensor indicates a potential environment for pathogen growth. As yet another example, an alarm may be generated when a pump flow rate for the spray nozzles is outside a recommended flow rate range. As yet another example, an alarm may be generated when an event indicates that a machine was accessed without proper LO/TO procedures being followed. For instance, if a machine door/panel was opened and the RFID sensor did not detect an aspect of the LO/TO procedure, an alarm may be generated.

The alarm may include information about the event that occurred to trigger the alarm (e.g., foaming detergent issue, inspection issue (e.g., the door was opened during the cleaning session, etc.)). Data corresponding to the alarm, such as the time, date, cleaning step, etc., may also be displayed near the alarm description, such as in tabular form. Moreover, a user may click on a specific alarm to show more detailed information about the alarm and/or to highlight another area of the dashboard relevant to the alarm generated. In one example, a pop-up or fly-in window may appear to provide more details about the alarm and/or provide automatically generated recommended actions for addressing the alarm, similar to the fly-in window 646B shown in the exemplary dashboard GUI screenshot of FIG. 6B.

The alarms generated in the third window 522 may include alarms that occurred for the entire machine during that cleaning session, rather than alarms specific only to a cleaning process. Certain cleaning process issues do not trigger a cleaning process alarm, and the user may miss insight into an issue occurring during the cleaning process. For instance, the alarm may indicate a belt error during an inspection step, and the user could deduce that an operator caused a belt issue (such as by stepping on the belt) during the inspection step of the cleaning session. By generating alarms for the entire machine during the session, the user will have additional insight into the cleaning session steps. Such information can be critical in assessing any subsequent production issues caused by the event triggering the alarm.

Such information can also help a user quickly dismiss an alarm, rather than having to go inspect the component or program step generating the alarm. For instance, if a user knows that a certain sensor is triggered during a cleaning step (perhaps due to sensor arrangement), he/she can quickly dismiss the alarm without any investigation. Not only can the alarm information save the user time, but it can also minimize machine intervention (e.g., opening access doors to enter the machine where hazards are located), increasing safety of the operator.

A fourth window 526 shows the Program Steps, which may include a list of each program cleaning step in the cleaning session and information regarding each step in tabular form. The cleaning steps may be listed in a first column of the table in the order that they occurred, and information particular to each step may be displayed in an adjacent column(s). For instance, a "Status" column may be used to summarize what happed during the cleaning step, a "Duration" column may be used to indicate the duration of the cleaning step (e.g., hours and minutes) and an "Average Duration" column may be used to provide a comparative metric of the duration of past cleaning sessions (e.g., hours and minutes for past cleaning sessions of the same type). The information presented side by side in the "Duration" and "Average Duration" columns allows a user to quickly see whether the cleaning step went longer or shorter than expected. This may be important in identifying where cleaning processes can be improved to shorten the duration of one or more cleaning steps. In other aspects, the user can determine if a step may not have been fully carried out when the cleaning step was shorter than expected.

As an example, the drying step is typically one of the longest cleanest steps because the operator must ensure that the entire freezer interior is dry. If a portion of the freezer is still wet and the temperature is reduced, the moisture will freeze, causing belt issues, among other issues. Accordingly, a sufficiently long drying step is needed to ensure that the entire freezer interior is dry. At the same time, the longer the drying step, the longer the machine down time and potentially the more utilities used. As such, there is a desire to reduce the drying step as much as possible while also taking the time needed to ensure that the freezer is dry. By providing the "Duration" and "Average Duration" for each step, the user can get quick insight into these important steps.

The information in the "Status" column may provide a user with a high-level summary or overview of the success or failure of the cleaning step during that session. Using the "Status" column, the user can quickly deduce which, if any steps, were not carried out according to program requirements.

In the depicted example, each row in the "Status" column may be highlighted with a color corresponding to the status of that step, such as "red" if an alarm was generated for that step, if the process was aborted during that step, etc. "Yellow" may be used if, for instance, there was a wait time during that step, if the step duration was significantly longer or shorter than the average duration for that step, etc. "Green" may be used if, for instance, the step was completed without any alarms, without any wait times, close to the expected duration, etc. In addition to a color indication, a textual summary of the success or failure of the cleaning step during that session maybe included, such as "completed", "in progress", error code "1", "2", "3", phase "1", "2", "3", "aborted", "alarm event", etc. Of course, other colors may instead be used, and additional colors or other visual indicators may be used to indicate or otherwise correspond to a status of the step.

Additional KPIs may also be displayed in one or more additional adjacent columns, such as the start and end time of the cleaning step, temperature of the system or component during that step, water/energy consumed, etc. The additional KPIs may be specific to the particular cleaning step of the program. As a non-limiting example, during inspections, the operator must typically enter the machine to verify if the cleaning was done, and/or the operator must manually spray down portions of the machine interior. If a machine owner or production manager requests that the operator specifically clean certain portions of the machine interior (e.g., the four corners), then he/she would expect the water consumption in that inspection spray-down step to be around a certain amount. Accordingly, a KPI for the inspection step may be water consumption. The machine owner or production manager can reference the water consumption KPI for the inspection step to determine if the water consumption was close to the expected amount for a thorough spray-down. The water consumption KPI may also be used to determine if more than the expected amount of water is being used, and if so, what inefficiencies can be addressed to conserve utilities. In that regard, another column of the table may include a reference KPI or an average KPI for that step for a quick comparison.

Figure 6A:
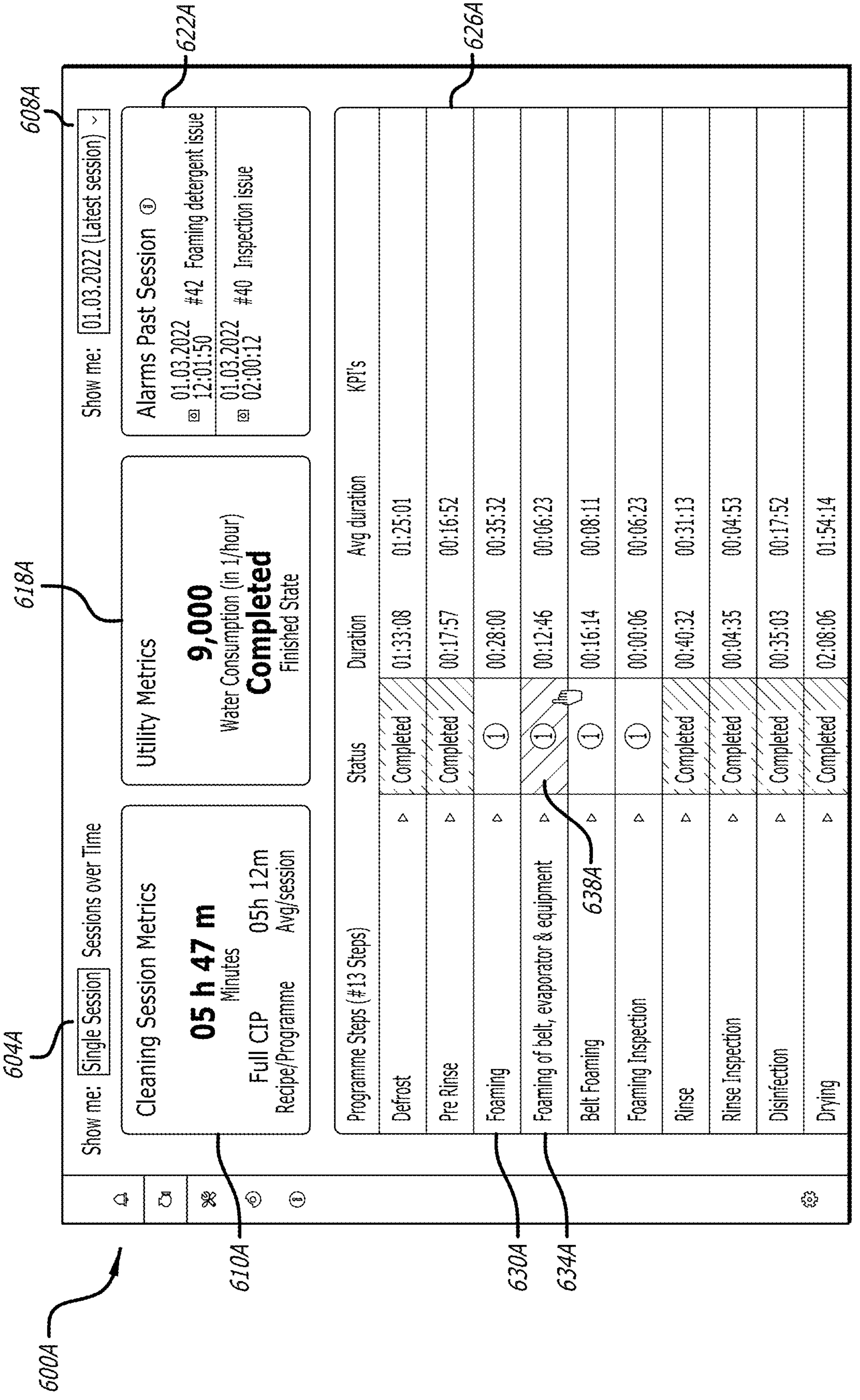
Figure 6B:
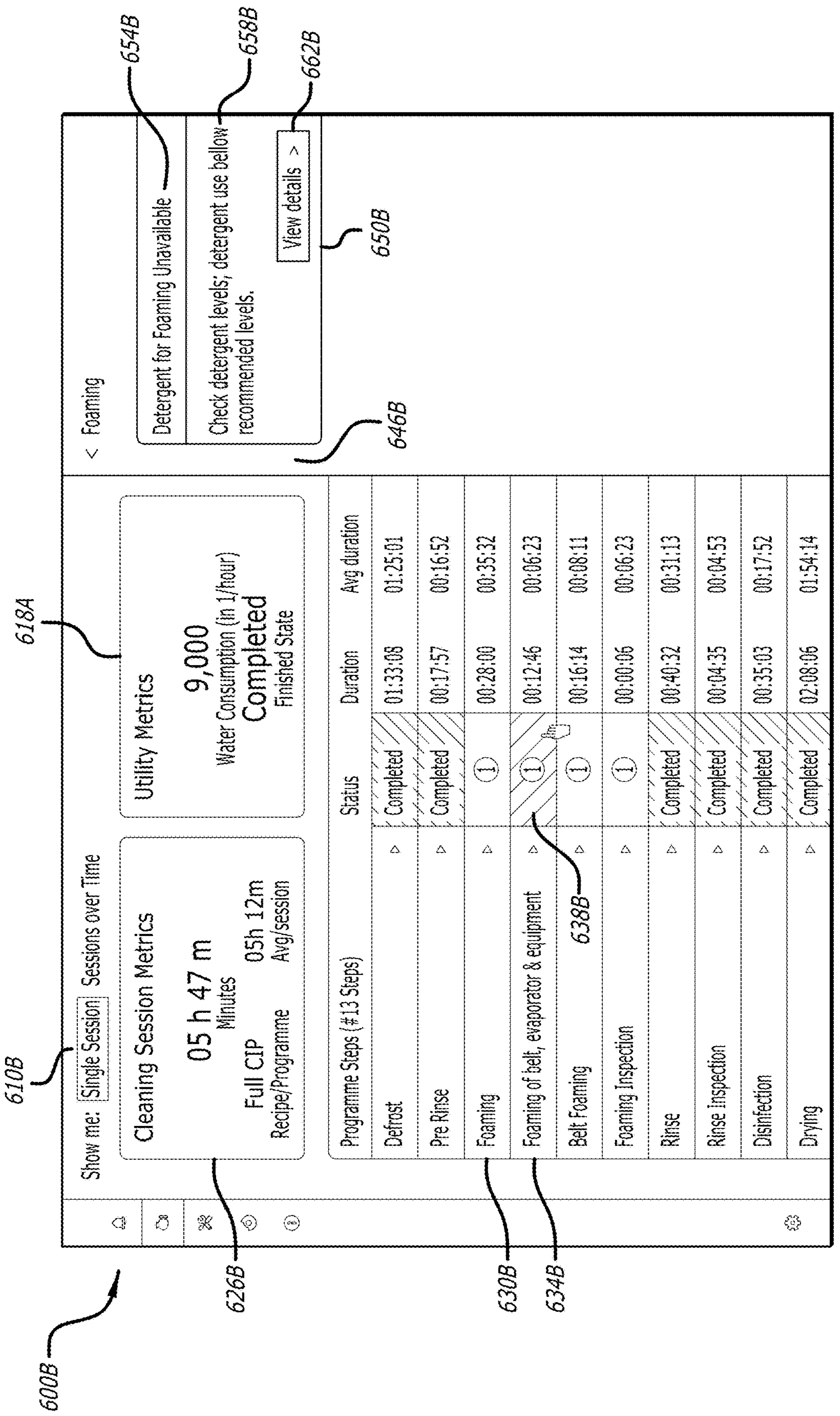

Referring to the exemplary dashboard GUI screenshot shown in FIG. 6A, the user may interact with the fourth window 626A to show further details for a cleaning step. For instance, as shown in FIG. 6A, the user may click on a listed cleaning step (or an arrow or similar near the step) to display all the sub-steps of that cleaning step. In that regard, the steps initially listed in the fourth window 626A may be considered parent steps, with child steps displayed after clicking on the parent step in the window.

A parent or child step may be selected for investigation by clicking on the parent or child step itself or any reference information for that step in the same row. Once a parent or child step is selected, a pop-up or fly-in window 646B may appear to provide more details about the step and/or automatically generated recommended actions for improving the step, as shown in the exemplary dashboard GUI screenshot of FIG. 6B. For instance, the fly-in window 646B, which may have a heading corresponding to the parent step name (e.g., "Foaming"), includes at least one sub-window 650B including details about the step and/or recommended actions for improving the step. For instance, each sub-window may include a title 654B summarizing the issue at the top of the sub-window, and further details or automatically generated recommended actions 658B for improving or otherwise correcting the issue for that step (i.e., addressing the issue that generated the alarm) may be included beneath the title.

Further details for the issue may be found by clicking on a "View details" button 662B or similar to take the user to more detailed information about the issue and/or information on how to fix the issue. For instance, the user may be able to access further details about the event that occurred during the cleaning session step, such as, for instance, when the event happened, the specific components involved in triggering the event, the threshold versus actual value triggering the event, which operator was involved in the LO/TO process, etc. Further, the user may be able to access more detailed information on how to fix the issue, such as, for instance, a manual for repairing a component, a website for ordering replacement components, suggested cleaning program step modifications, LO/TO procedure clarifications, etc.

In the example shown, the status section 638A of the "Foaming" step 630A (shown in the adjacent "Status" column) gives an error or status code "1" and is highlighted in red. To investigate the issue with the foaming step, the user may click on the "Foaming" step 630A to display all the child steps. With the child steps of the "Foaming" step 630A displayed, the user may then click on a child step, such as the child step "Foaming of belt, evaporator, & equipment" 634A to investigate which, if any, child steps generated the error, alarm, etc.

In the depicted exemplary embodiment, the slide window 646B includes a first sub-window 650B, having a heading 654B entitled "Detergent for Foaming Unavailable", and beneath the heading, the sub-window 650B includes an automatically generated recommended action 658B to "Check detergent levels; detergent use below recommended levels." Further, details for the issue may be found by clicking on a "View details" button 662B, which may provide processed sensor data relating to the issue, such as the cleaning solution concentration of the CIP tank, the fluid level in the CIP tank, etc. With this information, the user can quickly identify the issue and take specific recommended action to improve the cleaning step (e.g., replenishing detergent supply). Immediate action for the next cleaning session may be imperative to ensuring that the next production run meets food processing standards. In a specific example, if insufficient detergent is being used to clean a machine that processes poultry or a similar product that must be processed according to very high standards, the manufacturer may potentially have to throw away its entire produce the next day.

One or more additional sub-windows may be included in the slide window 646B to provide information about one or more additional issues regarding the cleaning step. As an example, a second sub-window (not shown) may be included to indicate if the amount of water used for the foaming step was above or below the recommended level for effective and efficient foaming (based on, for instance, processed sensor data gathered from the first flow meter 194 on the water inlet 164 to the CIP tank 160, the pressure sensor data from sensors 188 and 192, etc., as shown in FIG. 2B). The water consumption may be too high or too low for a variety of reasons (e.g., component malfunction, cleaning process interrupted, cleaning program inefficiency, etc.). The second sub-window may identify the reason and a possible solution for quick resolution by the user. The sub-windows may provide information that corresponds to the alarms listed in the third window 622A shown in FIG. 6A.

In other examples not shown, the status section of a cleaning step may indicate a harborage for pathogens based on, for instance, analyzed temperature and humidity data, as well as recommended steps for addressing the harborage. For instance, with reference to the "Defrost" step, information presented in an additional sub-window(s) (after, for instance, clicking on the parent or child step generating an error) may indicate that a temperature of an interior surface is below a threshold temperature level such that an environment lethal to pathogens was not created. As a specific example, the temperature of the floor surface may indicate a possible layer of frost accumulation beneath the floor. Accordingly, recommended actions for defrosting the underside of the floor may be provided.

In other examples not shown, the status section of a cleaning step may indicate a harborage for pathogens based on, for instance, cleaning solution data (e.g., gathered from the flow meters of the CIP system, such as the first flow meter 194 and second flow meter 196 shown in FIG. 2B), as well as recommended steps for addressing the harborage. For instance, with reference to the "Disinfection" step, information presented in an additional sub-window(s) (after, for instance, clicking on the parent or child step generating an error) may indicate that any films inside the freezer were not likely effectively removed. The recommended action for addressing the issue may include performing a food safety technical cleaning effectiveness assessment, such as by using at least one of swab testing and riboflavin testing discussed above. In other instances, the recommended action may include adjusting a future cleaning event set point parameters to mitigate risk by increasing the pathogen kill step effectiveness, increasing either individual cycle step times or combinations of cycle step times, adjusting temperatures or chemical concentrations in cleaning, adjusting pump pressure, etc. The recommended action may be determined based on the KPI and any comparative KPI that is monitored, recorded, and analyzed for the cleaning step.

In other examples not shown, the status section of a cleaning step may indicate that a LO/TO event occurred. For instance, during an inspection step, the operator might need to perform a LO/TO of the machine to safely enter the machine for inspection. Accordingly, the status section of the inspection step may display information regarding a LO/TO event(s) to indicate whether the LO/TO process was or was not properly followed.

Figure 7:
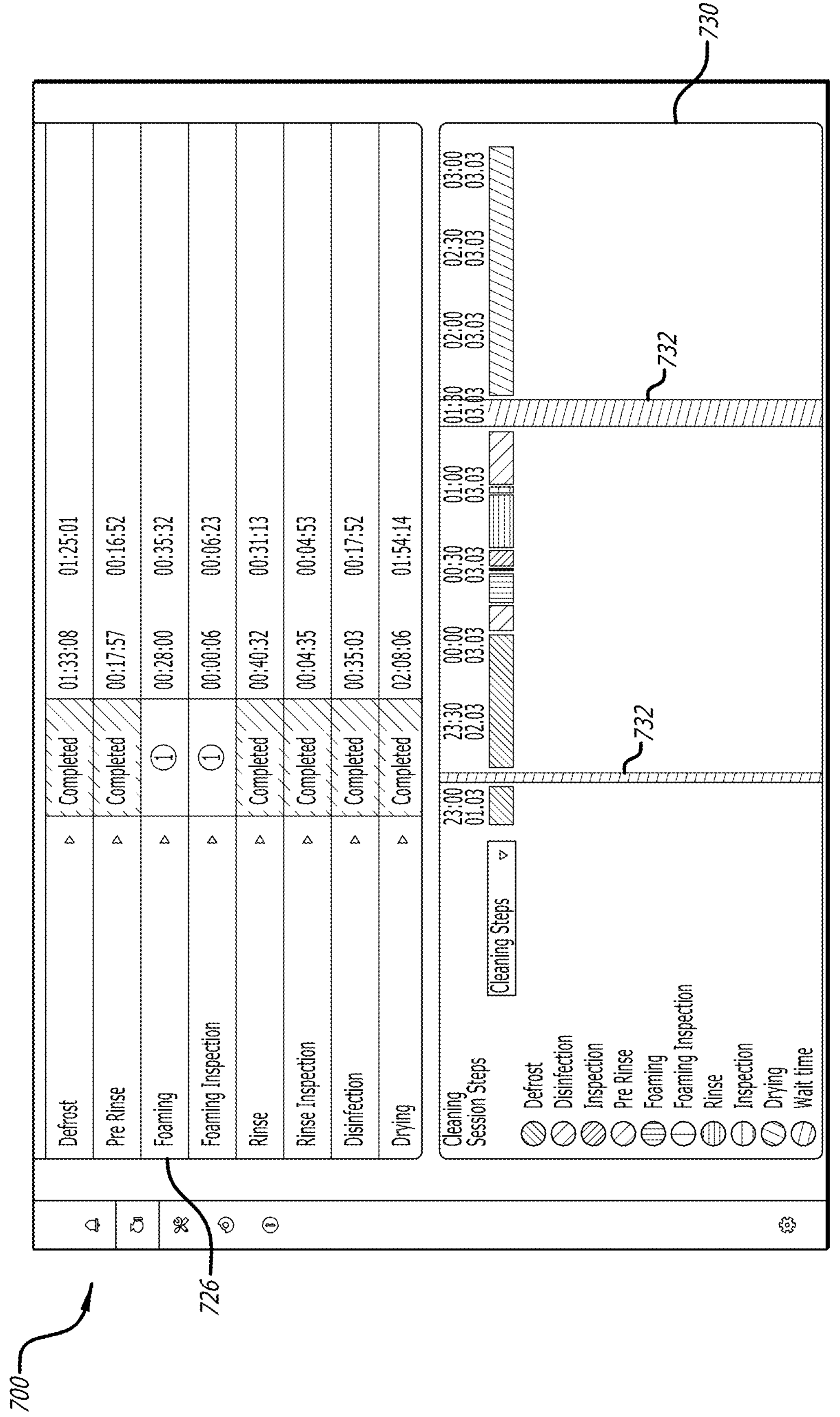

Referring to the exemplary dashboard GUI screenshot shown in FIG. 7, a fifth window 730 shows information regarding the cleaning session steps organized in a manner to provide a visual representation of the duration of the cleaning session steps as well as any disruptions to the cleaning session, such as waiting times, alarms, etc. For instance, the fifth window 730 may include a list of each step in the cleaning session along a side of the window, and a graph may be depicted adjacent to the list to visually represent the duration of the step. The list of steps may include waiting times or other events that consume a portion of the overall duration of the cleaning session but that are not included as programmed cleaning steps. The steps may be correlated to the graph with a color or other designation to provide a quick visual representation of the cleaning step duration in its relation to the overall cleaning session duration.

In the depicted exemplary embodiment, a segmented bar graph is depicted with each segment of the bar graph corresponding to a duration of the step. The segment may have a color or other designation that corresponds to the cleaning step, and the segments collectively represent the overall duration of the cleaning session along a horizontal axis. The horizontal axis along the top of the segmented bar graph may include a timeline of the cleaning session (showing the start/end time for the session as well as each step), as well as the duration for the cleaning step represented by the segment. Visually representing the cleaning step durations in this manner allows a user to identify which steps of the cleaning session are short or long in duration compared to the other steps and compared to the session overall duration.

The "waiting time" step may be represented by a vertical segment 732 interposed between cleaning steps and/or overlaid over the cleaning step that was paused. By visually representing the "waiting time" of the cleaning session, the user can quickly see when the cleaning process was paused during the session so that the user may investigate the reasoning for the pause (e.g., operator took a break, an alarm went off, etc.)

Similarly, a LO/TO event may be represented by a vertical segment (not shown) interposed between cleaning steps and/or overlaid over the cleaning step that was paused. By visually representing the LO/TO event of the cleaning session, the user can quickly see when the LO/TO event occurred during the session so that the user may investigate any alarms that may have been generated or any safety issues that occurred.

In that regard, any alarms or alerts generated during the cleaning session may be overlaid over the step in which it occurred during the cleaning session. For instance, referring to the exemplary dashboard GUI screenshot shown in FIG. 10B, one or more alarm indicators 1036B are overlaid over a segmented bar graph to visually indicate to the user when the alarm occurred. Using this visual information, a user may be able to quickly deduce, for instance, why the cleaning step was shorter or longer than expected, why the wait time occurred, etc. Certain alarms, such as alarms specific to the LO/TO process, may be highlighted to the user with a special color, shape, etc.

Figure 8:
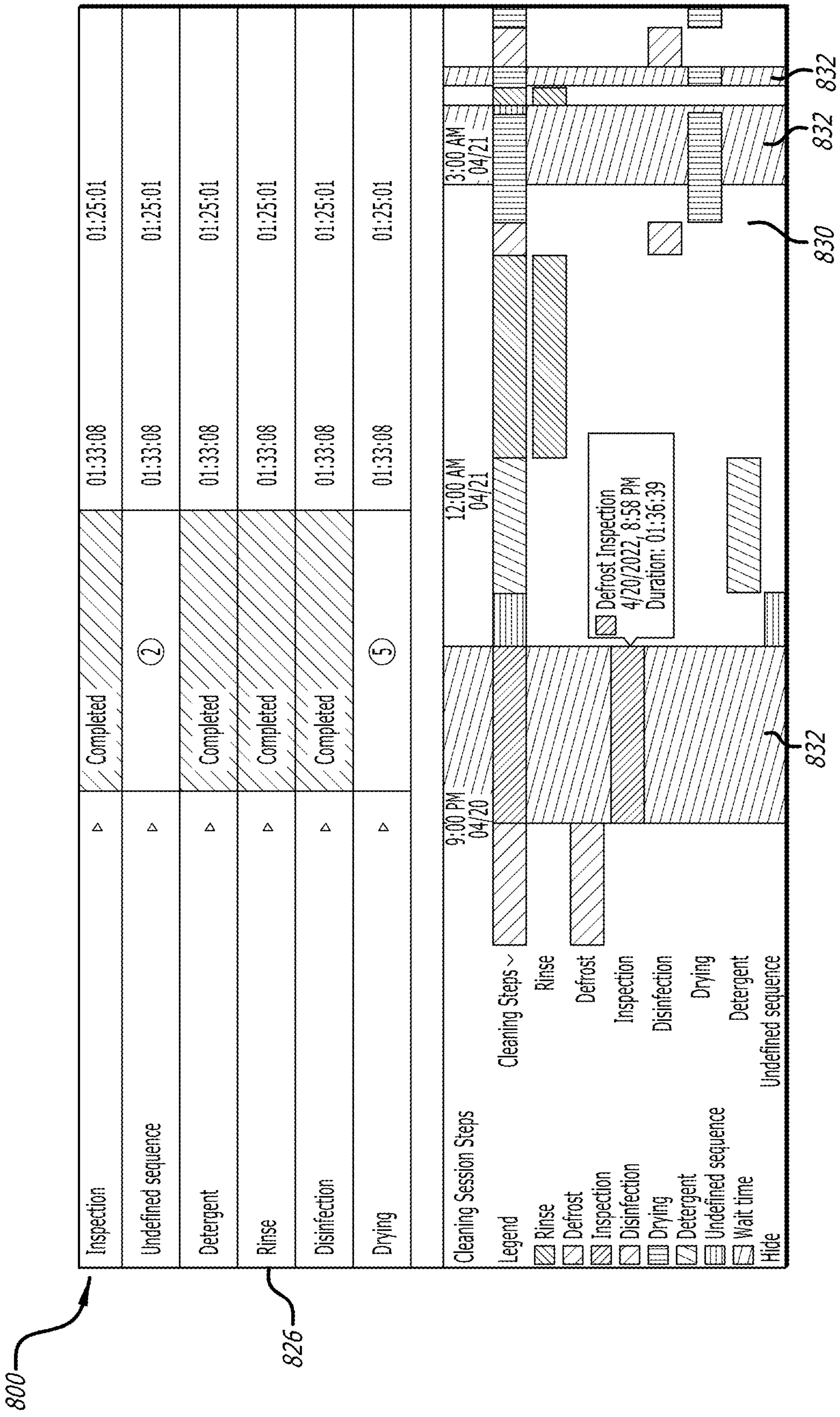

The exemplary dashboard GUI screenshot shown in FIG. 8 depicts an alternative embodiment of the fifth window 830, which allows a user to visually show the cleaning steps in a different segmented manner. For instance, the user may click on an arrow or similar next to a heading "Cleaning Steps" to graphically display each step of the cleaning process in an isolated segment beneath the segmented bar graph. The user may click on or hover over the isolated segment (or over the segment in the bar graph) step to display information regarding that step, such as its duration, the time/day, status, etc. The same detailed information may be provided by hovering over the segments shown in FIG. 7. FIG. 8 also shows a highlighted or translucent section overlying a step, which may indicate, for instance, a status of the step (e.g., a wait period indicating that the system is waiting for an operator to give input).

The exemplary dashboard GUI screenshots shown in FIGS. 5-8 depict information regarding a single cleaning session, such as a cleaning session in progress or a past session selected (such as with menu 508 shown in FIG. 5). The information provides insight to the user as to what actually happened during an individual cleaning session, as well as how it compares to past cleaning sessions. Such information can be used to quickly assess the cleaning session and determine steps for improving the quality and/or efficiency of the next or a future cleaning session.

For instance, a user can quickly identify the overall efficiency of the particular session by viewing the cleaning session metrics compared to an average session duration of the same cleaning program. The user can also identify steps that are generating alarms and receive information for improving the step. In addition, the user may see which steps of the cleaning session are running for a short or long time compared to the session overall duration, as well as any unnecessary wait times.

Using this information, the user can identify problematic cleaning steps and develop immediate solutions to improve those steps for future cleaning sessions. Solutions may include, for instance, adjusting time and temperature set points, chemical concentration changes, better configuration of the machine (e.g., different components, assembly, etc.), installation of automated systems, development of new cleaning automation, nozzle configuration, etc. In one embodiment, the user can use the information to improve or modify the cleaning program used, such as by combining cleaning steps (e.g., spray with chemical during defrost to cause the water to wick away faster, install an extra spray bar that allows for spraying down machine faster, etc.), eliminating steps, etc. As a specific example, the user may be able to see that the cleaning session had two defrost steps, and by performing this step twice, the process ended 30 minutes later than average, leading to 30 minutes of essentially downtime on the machine. The user could use this information to adjust the cleaning program for efficiency.

The user can also identify when the cleaning session started to assess a production run of the previous day. Cleaning sessions often start late because production the previous day runs long. Production can run long for a number of reasons, including low staffing, a breakdown on machine, SKU changes, etc. By looking at when the cleaning session started, the user can look at the previous day's production run to identify and/or troubleshoot any production issues.

Thus, the exemplary dashboard GUI screenshots shown in FIGS. 5-8, which depict information regarding a single cleaning session, can be used to quickly identify problematic steps or aspects of a cleaning session and implement specific actions to improve the quality and/or efficiency of future cleaning sessions.

The exemplary dashboard GUI screenshots shown in FIGS. 9-13 depict information regarding cleaning sessions over time. The information regarding cleaning sessions over time provides insight to the user as to how the cleaning process of that machine is trending. Such information can be used to assess the cleaning process of that machine and determine steps for improving the overall cleaning process, efficiency, machine production, etc. With that being said, the information regarding a single cleaning session (such as that shown in FIGS. 5-8) can also be used to assess the cleaning process of that machine and determine steps for improving the overall cleaning process, efficiency, machine production, etc., such as by highlighting what aspects of the machine or cleaning process to investigate further (such as by looking at the cleaning sessions over time). The user may choose to view the information regarding cleaning sessions over time (versus a single cleaning session) by selecting "Sessions over Time" or similar in the first navigation menu (see menu 904 in FIG. 9).

Figure 9:
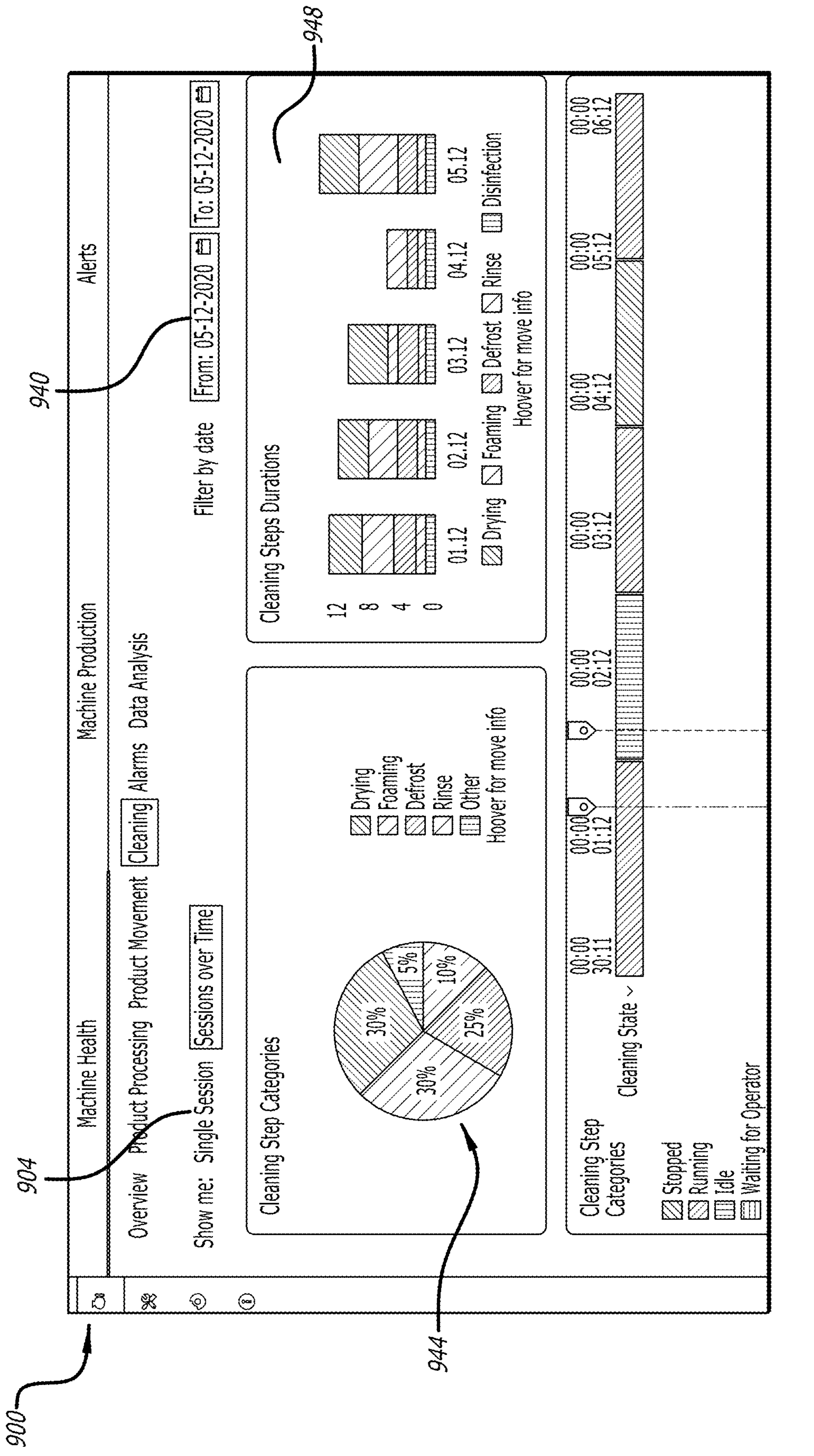
FIGS. 9-13 are exemplary GUI screenshots showing a dashboard providing cleaning session metrics of cleaning sessions over time of a machine.

FIG. 9 depicts an exemplary GUI screenshot showing a dashboard 900 providing KPIs of cleaning sessions over time for a machine. The timeframe of the sessions displayed may be determined by, for instance, the selection of a date range identified in a navigation menu 940.

In the exemplary embodiment depicted, a first window 944 shows "Cleaning Step Categories", which may include information comparing a KPI of the cleaning steps over time. For instance, the first window 940 may display information indicating the average amount of time for each cleaning step over the selected period of time. The average amount of time for each cleaning step may be displayed as a percentage of the overall process duration in a pie chart or similar. In the example shown, a pie chart is used to show that the drying and foaming steps each make up 30% of the total duration of the cleaning process. The user may be able to click on or hover over a section of the pie chart to see additional KPIs over time regarding that step.

The user can select a different timeframe to see if the cleaning steps have changed over time. For instance, if the drying step increased from 25% to 30% in duration over time, the user may want to target improvement of that cleaning step (to reduce the duration). As a specific example, if a new drying process was implemented, and the trend over time indicates a longer duration in drying time using the new drying process, the user will know to abandon that newly implement drying process or instead modify the process (such as, for example, by using one or more of the strategies described above (e.g., replacing components, implementing or developing cleaning automation, changing the cleaning program, adjusting aspects of the production run, etc.)).

A second window 948 shows “Cleaning Steps Durations”, which may depict the total cleaning session duration and the duration for each cleaning step for each of the cleaning sessions in the selected timeframe. In that regard, the second window 948 can be used to show which steps made up most of the cleaning time for specific cleaning sessions in the selected timeframe. The information may be represented by a stacked bar graph, for example, with each bar representing the total duration of the cleaning session and showing the duration of the cleaning steps stacked in the bar. The user may be able to click on or hover over a bar or section of the bar to see additional KPIs regarding that step.

Using the stacked bar chart shown in the second window 948 (or a similar graphical depiction), the user can easily deduce whether a cleaning process efficiency is changing over time (such as by noting the trend in overall session duration represented by the bars), as well as whether a cleaning step efficiency is changing over time (such as by comparing the stacked sections of different bars representing the duration of the cleaning step). The user can use this information to improve upon or modify the cleaning process or machine operation using one or more of the strategies discussed above.

Figure 10A:
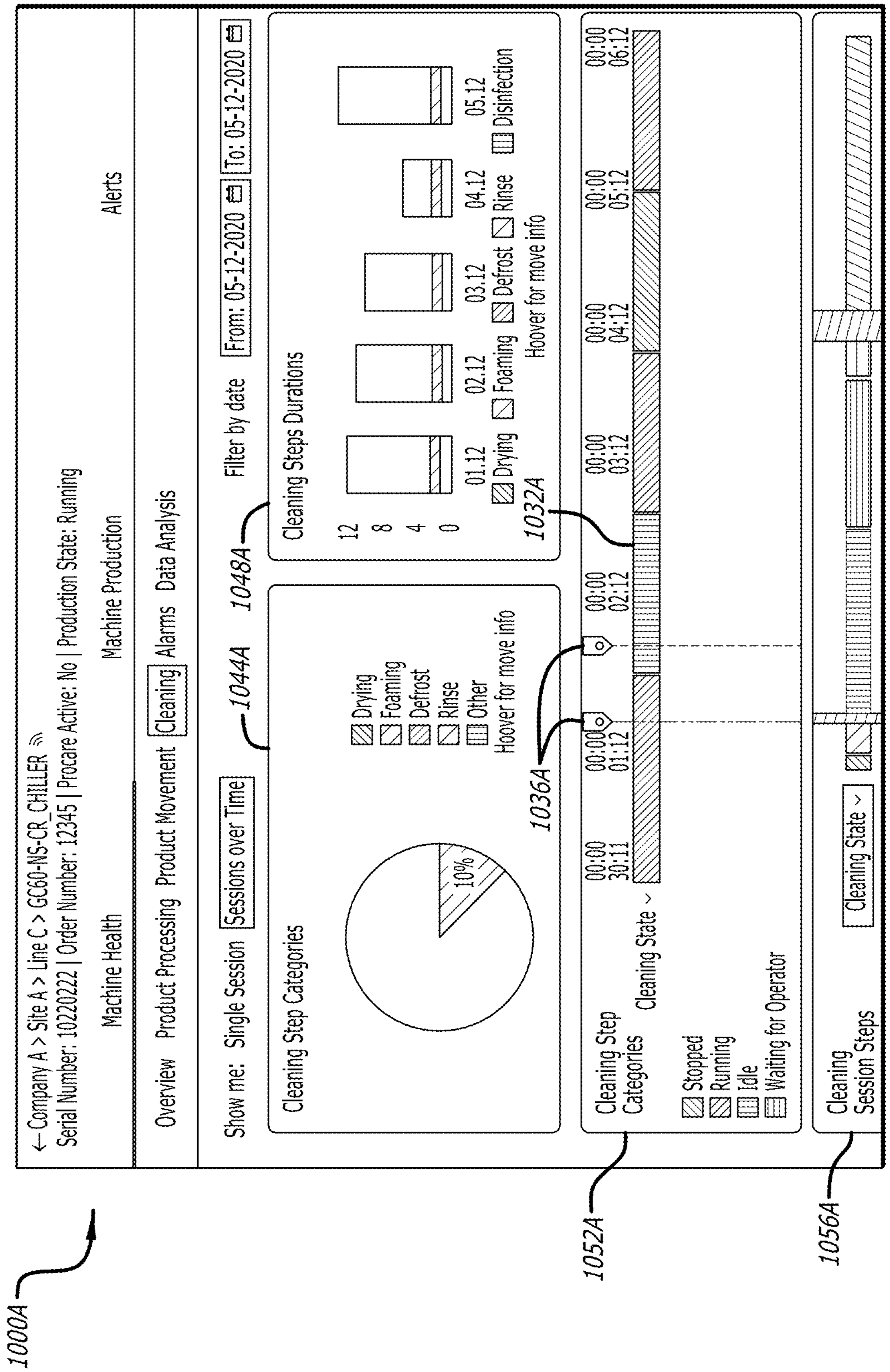

Referring to the exemplary dashboard GUI screenshot shown in FIG. 10A, the user may interact with at least one of the first and second windows 1044A and 1048A to correlate the information visually represented in these windows. For instance, in the example shown, the user has clicked on the “Rinse” portion of the pie chart shown in the first window 1044A, and thereafter, the other portions of the pie chart shown in the first window 1044A become greyed out. At the same time, the “Rinse” portions of the stacked bar charts in the second window 1048A remain colored/highlighted, with the remaining portions of the stacked bar charts in the second window 1048A becoming greyed out. By highlighting or otherwise emphasizing the cleaning step categories in this manner, the user can quickly and easily see how the particular cleaning step is trending over time (e.g., increasing or decreasing in duration).

Figure 10B:
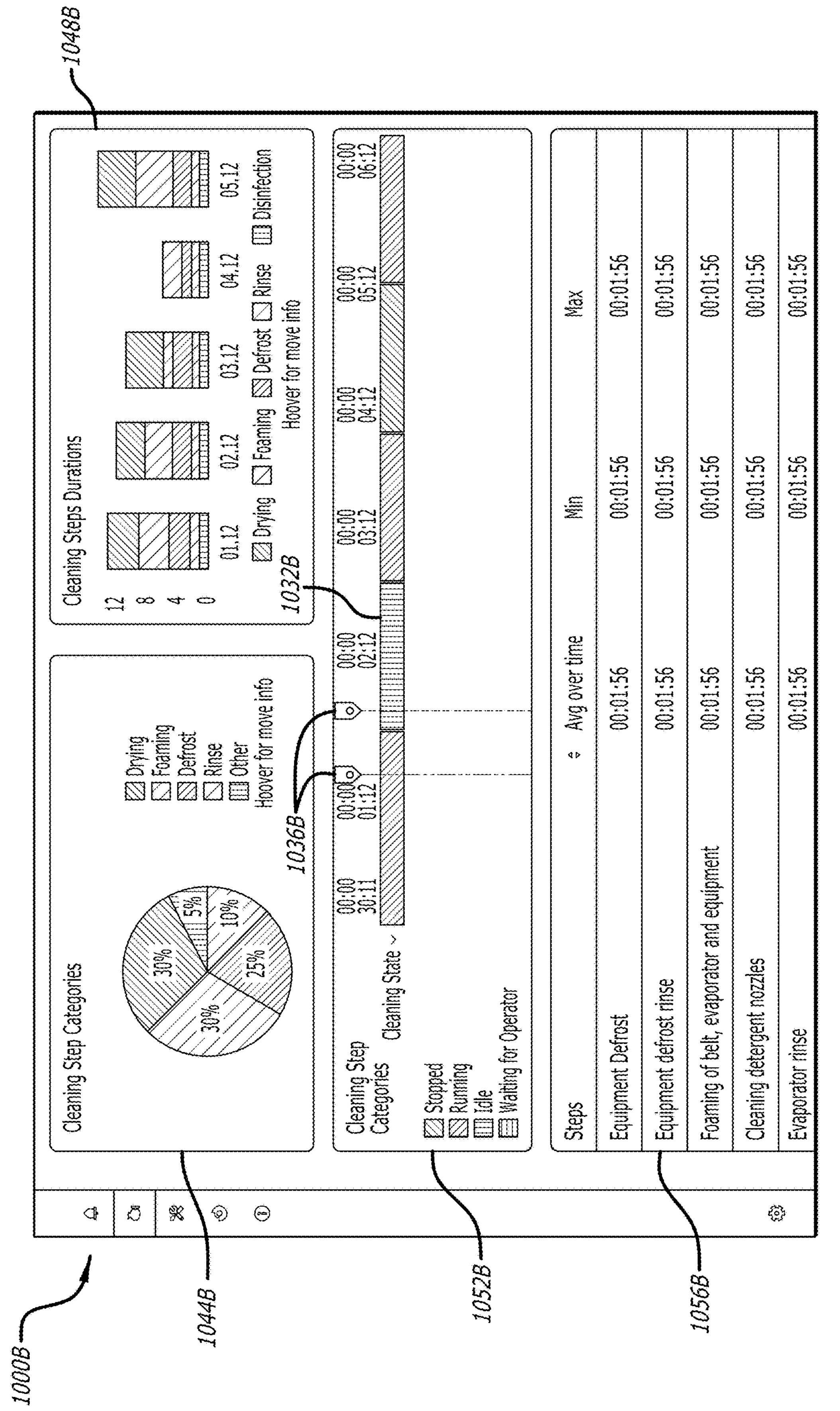

Referring to the exemplary dashboard GUI screenshot shown in FIG. 10B, a third window 1052B shows “Cleaning State Categories”, which may depict a state of the machine during the cleaning process over time. In the depicted example, the third window 1052B includes a list of each status category, such as “stopped,” “running,” “idle,” “waiting for operator,” etc., along a side of the window, and a graph may be depicted adjacent to the list to visually represent the state of the machine during the cleaning process over time.

In the depicted exemplary embodiment, a segmented bar graph may be depicted with each segment of the bar graph corresponding to a state of the machine during cleaning sessions over time. The segment may have a color or other designation that corresponds to a listed category or state, and the segments collectively represent the overall cleaning session. The horizontal axis along the top of the segmented bar graph may include a timeline of the cleaning session (e.g., showing the time/date for the session).

If any alarms were generated during the cleaning sessions, the alarms may be overlaid with the segment in which it occurred during the cleaning sessions. For instance, one or more alarm indicators 1036B are shown overlaid over the cleaning session segment to visually indicate to the user when the alarm occurred. Using this visual information, a user may be able to quickly deduce, for instance, why the machine was stopped or idle during the cleaning sessions.

Figure 11A:
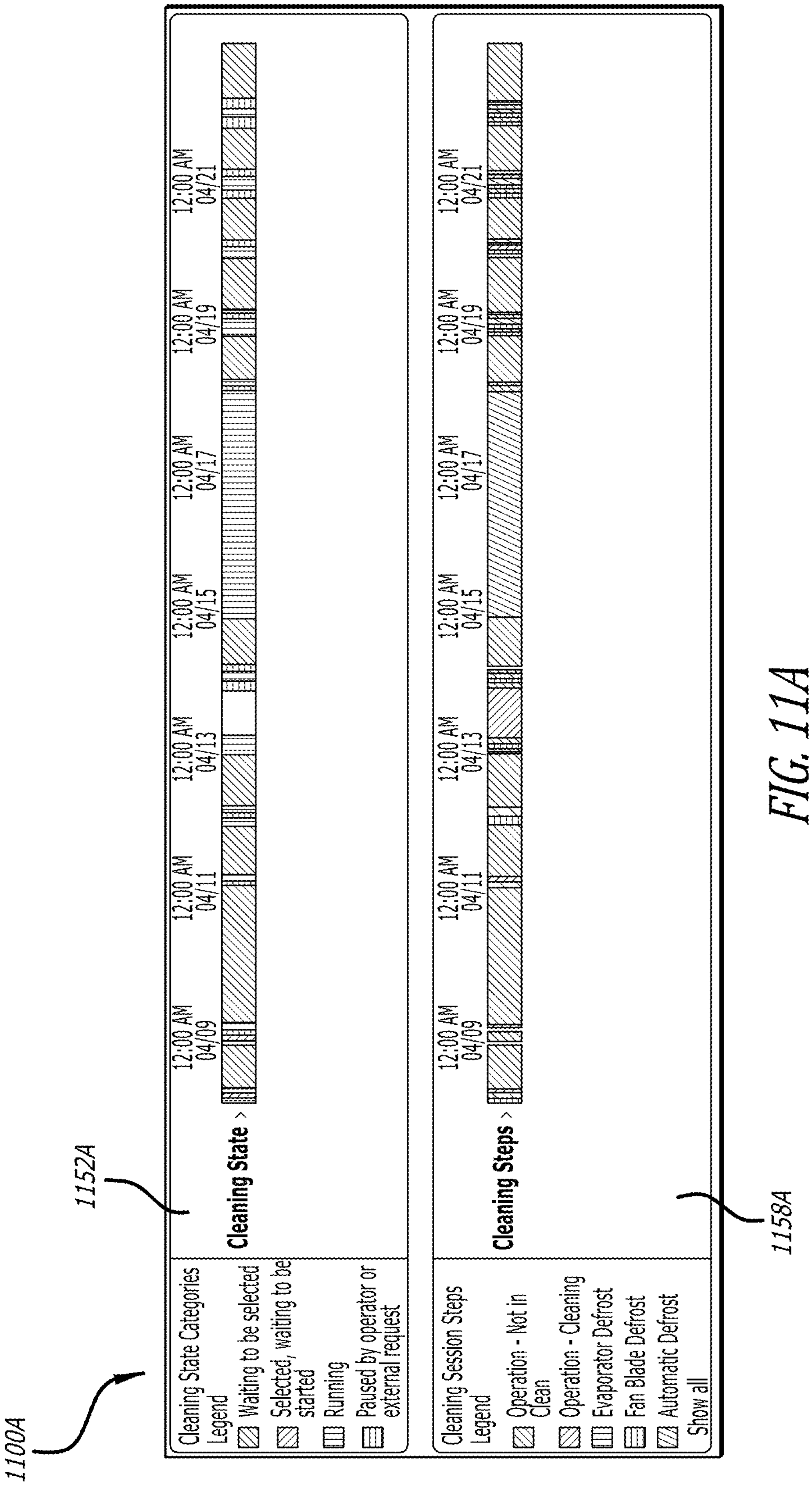
Figure 11B:
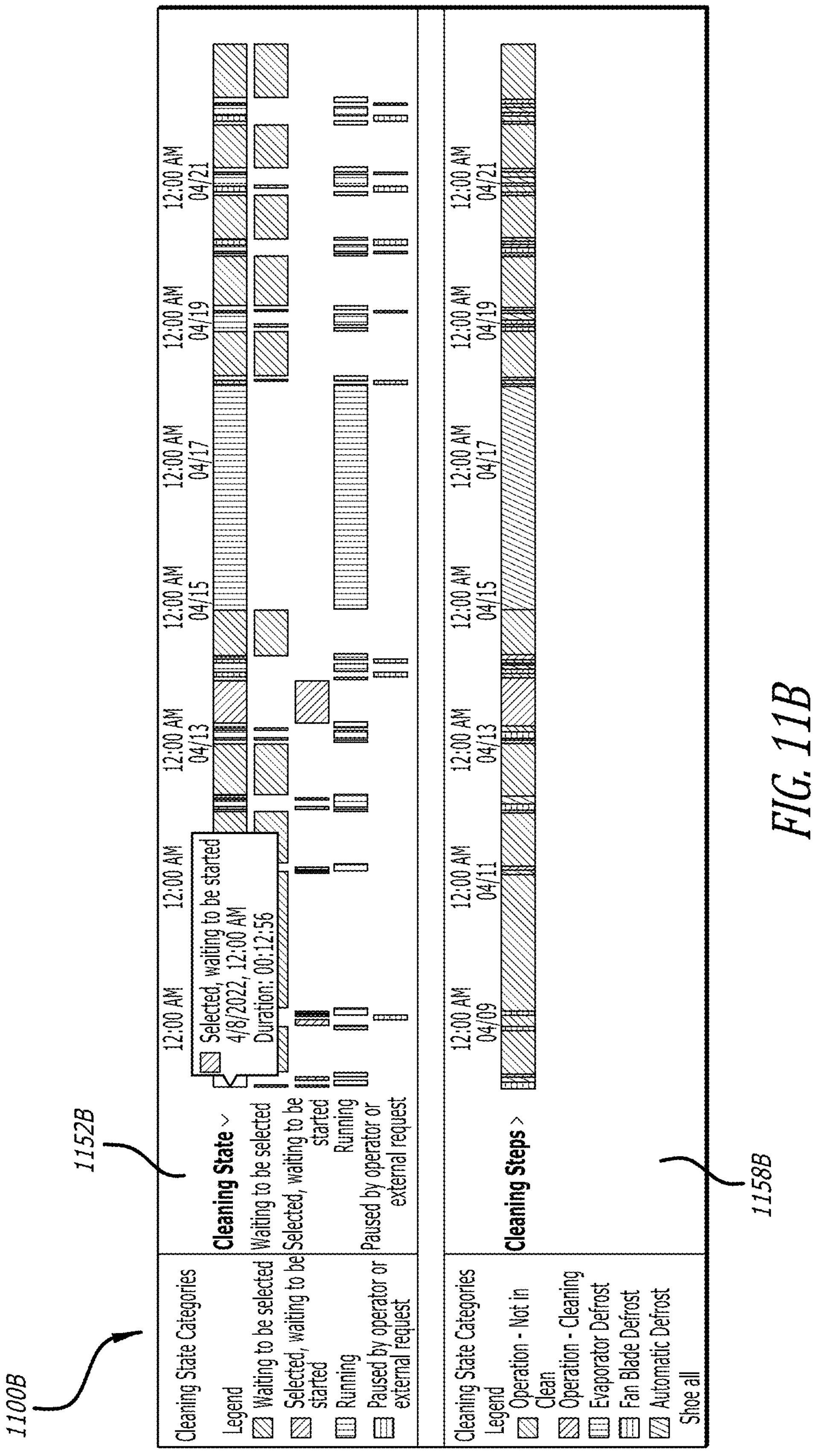

Referring to the exemplary dashboard GUI screenshots shown in FIGS. 11A and 11B, which show alternative embodiments of the third window 1152A/1152B, the user may interact with the third window to show further details for each state of the machine during the cleaning process over time. For instance, the user may click on an arrow or similar next to a heading “Cleaning State” to graphically display each state of the cleaning process in an isolated segment beneath the segmented bar graph. The user may click on or hover over the isolated segment (or over the segment in the bar graph) to display information regarding that step, such as its duration, the time/day, etc.

Referring back to the exemplary dashboard GUI screenshot shown in FIG. 10B, a fourth window 1056B shows “Steps”, which may provide KPIs regarding the steps of the cleaning process for that machine over time. In the depicted example, the fourth window 1056B shows the average duration over time for the timeframe selected, the minimum duration (“Min”) of that step for the timeframe selected, and the maximum duration (“Max”) of that step for the timeframe selected. The information is shown in a table format, although graphical depictions may instead/also be used. The user may click on or hover over the “Min” or “Max” information to display further information regarding that step, such as the cleaning session time/day, etc.

Figure 12:
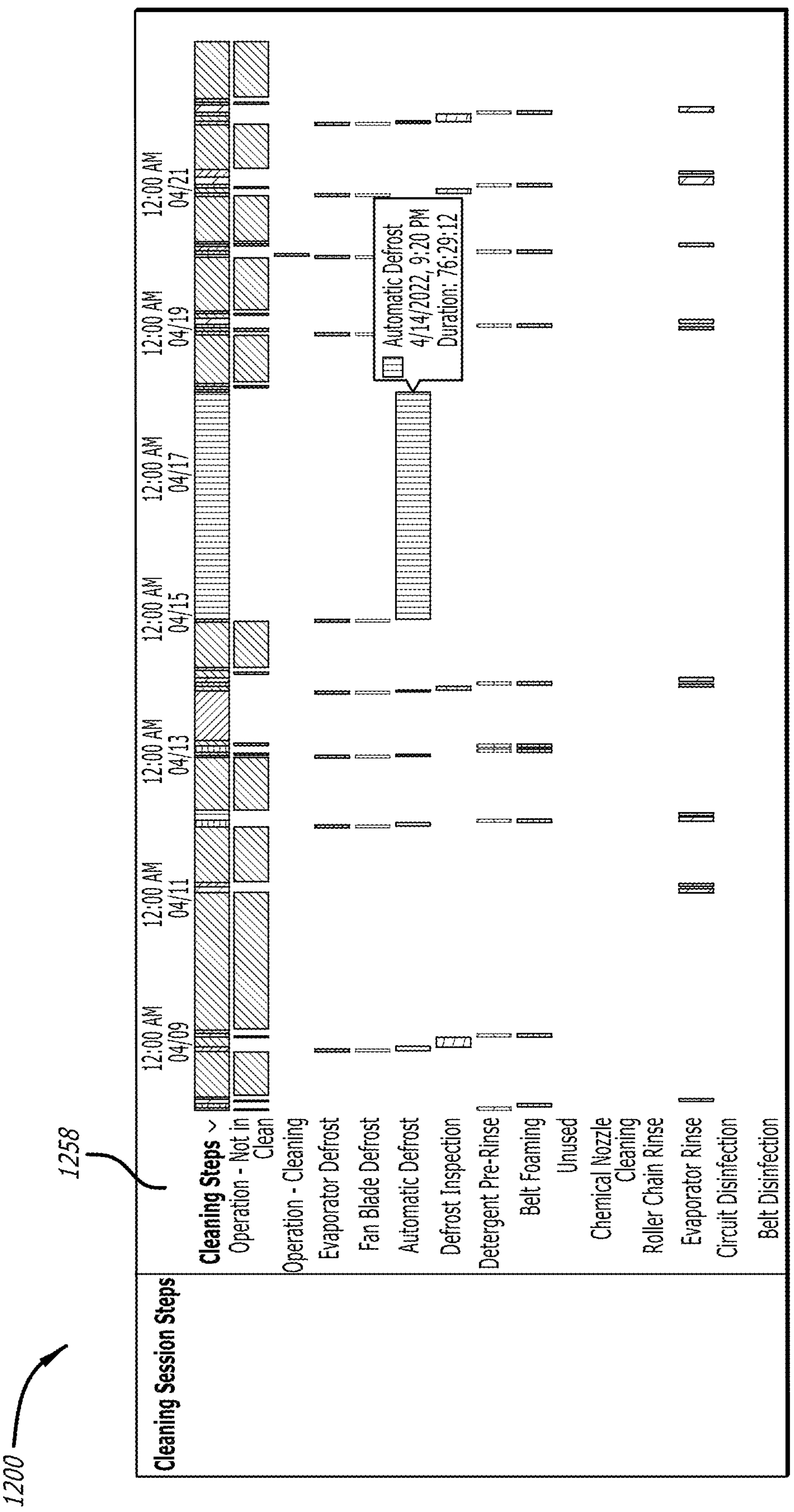

The exemplary dashboard GUI screenshots of FIGS. 11A, 11B, and 12 depict an alternative embodiment of a fourth window 1158A/1158B/1258, where KPIs regarding the “Cleaning Session Steps” of the cleaning process for that machine over time are graphically depicted. Referring to FIGS. 11A and 11B, in the depicted example, the fourth window 1158A/1158B shows a list of each cleaning step along a side of the window, and a graph is depicted adjacent to the list to visually represent the cleaning step of the machine during the cleaning process over time.

In the depicted exemplary embodiment, a segmented bar graph may be depicted with each segment of the bar graph corresponding to a cleaning step of the cleaning sessions for that machine over time. The segment may have a color or other designation that corresponds to a listed step, and the segments collectively represent the overall cleaning session. The horizontal axis along the top of the segmented bar graph may include a timeline of the cleaning sessions (e.g., showing the time/date for the session).

Referring to the exemplary dashboard GUI screenshot shown in FIG. 12, the user may interact with the fourth window 1258 to show further details for each step of the cleaning process for that machine over time. For instance, the user may click on an arrow or similar next to a heading “Cleaning Sessions Steps” to graphically display each step of the cleaning process in an isolated segment beneath the segmented bar graph. The user may click on or hover over the isolated segment (or over the segment in the bar graph) to display information regarding that step, such as its duration, the time/day, etc.

Figure 13:
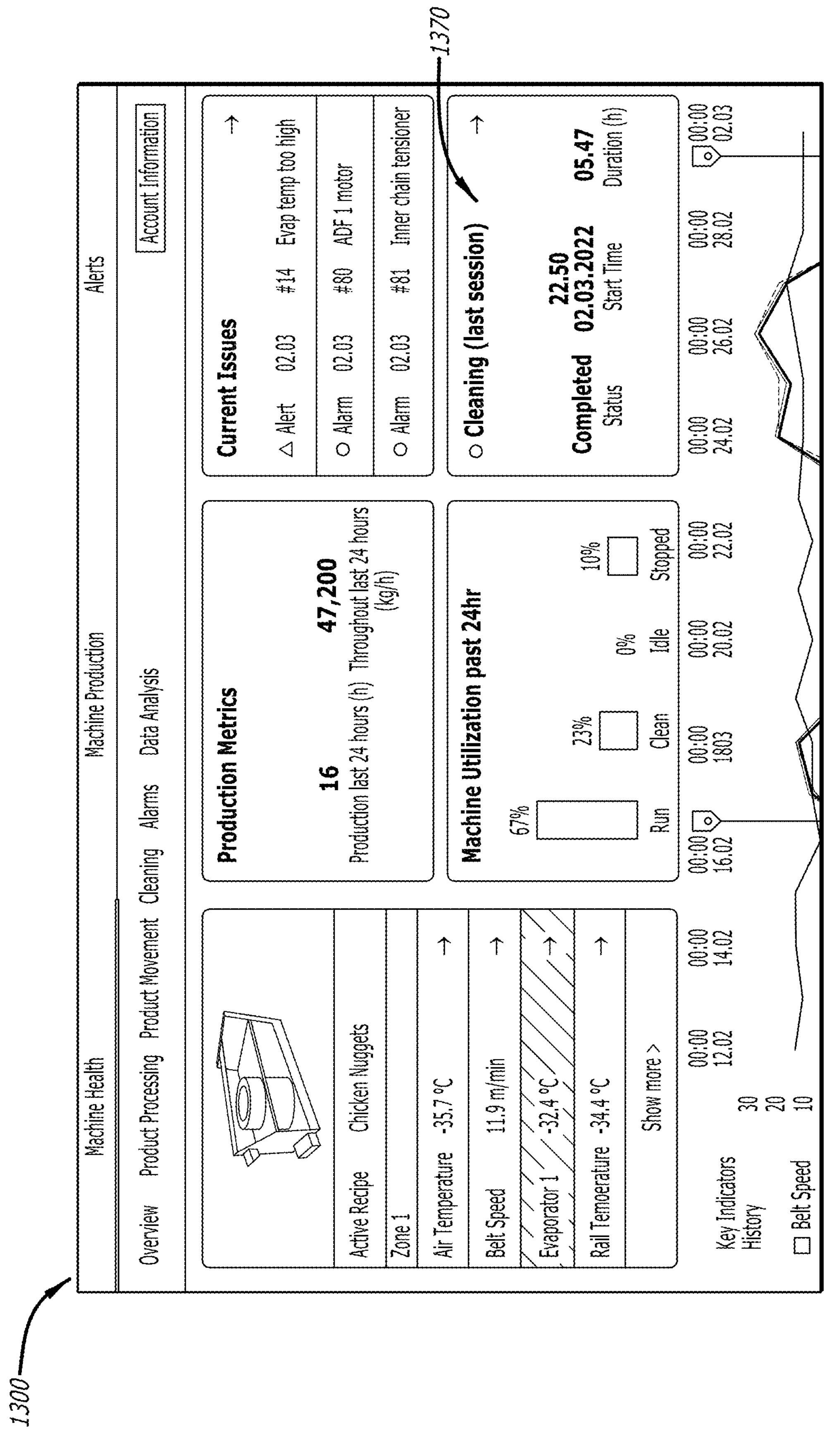

Referring to the exemplary dashboard GUI screenshot shown in FIG. 13, an overall summary of the last cleaning session may be displayed in a summary window 1370 on, for instance, a landing page of a machine application (not shown) of the machine computing device 108. The summary window 1370 can provide the user with a condensed summary of the latest cleaning session (e.g., by providing the status, start and/or end time, duration, etc.) so that the user may quickly decide whether to investigate the cleaning session in more detail (such as, for instance, by clicking on a "Cleaning" tab of the application to show one or more of the dashboard GUI screenshots described and shown herein).

It should be appreciated that the dashboard GUI screenshots shown in FIGS. 5-13 are exemplary only, and the information processed and displayed by the dashboard application 140 may instead be shown on a dashboard in any other suitable manner. For instance, the information represented in each window may instead be represented in a manner other than what is shown (such as in tabular form, another graphical form, etc.). Moreover, the information represented in the window may be different than what is used, such as a different KPI(s). Accordingly, the exemplary dashboard GUI screenshots should not be seen as limiting. Moreover, some or all of the dashboard GUI screenshots may be printable and/or savable as an electronic document in a report format for off-line reference by a user.

Figure 14:
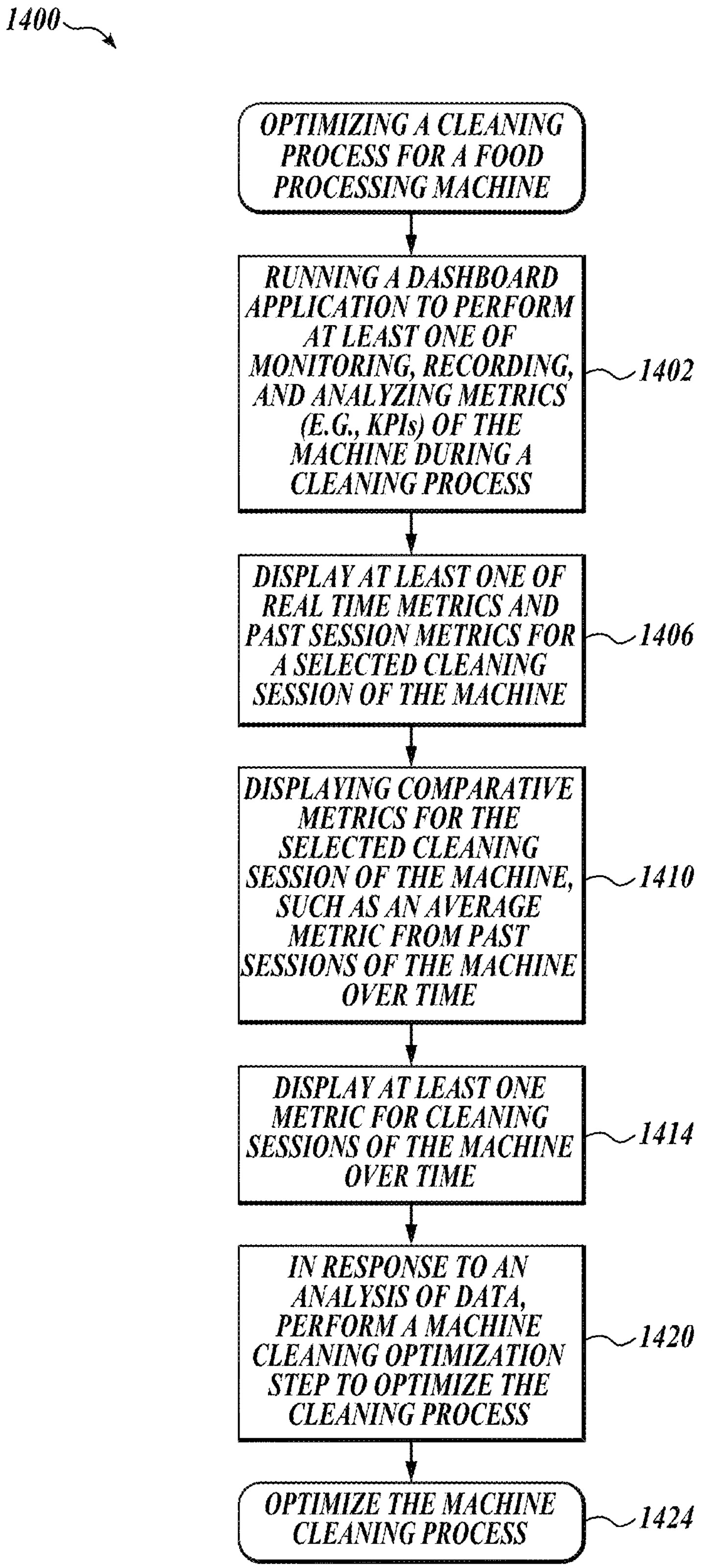
FIG. 14 is a flowchart that illustrates a non-limiting example embodiment of a method of optimizing a cleaning process for a machine according to various aspects of the present disclosure.

FIG. 14 is a flowchart that illustrates a non-limiting example embodiment of a method 1400 of optimizing a cleaning process for a food processing machine, such as an industrial freezer, according to various aspects of the present disclosure. By carrying out some or all aspects of method 1400, the machine owner or production manager can optimize the cleaning process for the machine, such as by improving the quality of cleaning steps and conserving utilities. Moreover, the overall cleaning process for the site and/or machine can be optimized to maximize uptime of the machine. It should be appreciated that the steps of method 1400 may be performed in any other order, and certain steps may be omitted.

The steps of method 1400 may be carried out, for example, by running one or more of the monitoring module 404, the recording module 410, and the analysis module 416 of the dashboard application 140, as well as the cleaning application 130 and the sensor processing application 134 of the machine computing device 108.

From a start block, the method 1400 proceeds to block 1402, where the method includes running a dashboard application to perform at least one of monitoring, recording, and analyzing metrics (e.g., KPIs) of the food processing system during a cleaning process. Running the dashboard application 140 may include using the monitoring module 404, recording module 408, and/or analyzing module 412 to generate and display metrics or key performance indicators (KPIs) about cleaning session(s) as well as recommended steps for improving the cleaning session(s) and the overall cleaning process for a machine, based on, for instance, processed sensor data sent from the sensor processing application 134.

In that regard, at block 1406, the method 1400 includes displaying at least one of real time metrics and past session metrics for a selected cleaning session of the machine. The metrics may be displayed on a dashboard, such as one of the exemplary dashboard GUI screenshots shown in FIGS. 5-8. The metrics may include, for instance, any alarms, alerts, or other notifications generated during the cleaning sessions, wait times, etc. The notifications may be generated after the analyzing module 412 processes sensor data received/retrieved from the sensor processing application 134 that indicates, for instance, that a temperature, humidity level, pressure, fluid level, flow, concentration level, pH level, etc., is outside a preferred range for optimized cleaning.

At block 1410, the method 1400 includes displaying comparative metrics for the selected cleaning session of the machine, such as an average metric from past cleaning sessions of the machine. In an example, the method 1400 may include displaying comparative metrics for an environmental conditions-based status of the machine before, during, and/or after the cleaning session of the machine (e.g., metrics related to temperature, humidity, etc.). In another example, the method 1400 may include displaying comparative metrics for a production-based status of the machine (e.g., monitored production conditions such as through-put of the machine, production quality, etc.) before and/or after the cleaning session of the machine. The comparative metrics for an environmental conditions-based status and/or the production-based status of the machine can be processed to suggest solutions for ensuring full filth layer accumulation removal. The metrics may be displayed on a dashboard, such as one of the exemplary dashboard GUI screenshots shown in FIGS. 5-8.

In one or more optional steps (not shown), the method 1400 may include graphically displaying the metric(s), such as with one or more bar charts, pie charts, or the like. In an example, the method 1400 may include graphically displaying a duration of each cleaning step for the cleaning session of the machine shown along a timeline.

At block 1414, the method 1400 may include displaying at least one metric for cleaning sessions of the machine over time. The metrics may be displayed on a dashboard, such as one of the exemplary dashboard GUI screenshots shown in FIGS. 9-12. In one or more optional steps (not shown), the method 1400 may include graphically displaying a metric(s) of cleaning sessions of the machine over time. As non-limiting examples, the graphically displayed metrics may include a duration of each of the cleaning steps of a cleaning process over time as a percentage of the overall cleaning session duration, a visual representation of a duration of each the cleaning steps of the session for multiple sessions, a duration of each cleaning state of the cleaning sessions of the machine over time, and/or a duration of each cleaning step shown along a timeline for the cleaning process of the machine over time.

In one aspect, the method 1400 may include monitoring and recording metrics of machine performance between cleanings (e.g., a type of product (SKU) processed by the machine, a throughput of product of the machine, a temperature of product processed the machine at various points within the machine, a temperature of a chamber inside the machine, and a production start and end time of the machine, whether the next cleaning is a pre- or post-production cleaning, etc.). Metrics pertaining to machine performance between cleanings can be generated from data gathered, for instance, from sensors and/or operator input. The machine performance metrics data can be correlated with at least one of the metrics of the cleaning process as described herein to help show additional trends (e.g., cleaning session went poorly after product A was processed, but went smoothly after product B was processed) and/or to generate recommended actions for the next or a future cleaning session.

For instance, it is industry knowledge that specific food product types (e.g., chicken nuggets made by a specific food recipe) are identified by SKU (stock keeping unit). Each particular product or SKU processed by a machine can create different cleaning results for the same or similar cleaning recipe used to clean that machine. More particularly, each processed SKU can create some variation in the amount of filth mess depositing in and on food machinery. The amount of time that the machine runs with a particular product in combination with the overall volume or through-put rate of the product are main factors in the quantity of filth deposits created in and on food machinery. Another factor, that is less obvious, is that in most industrial food cooking applications, cooking temperature equilibration is not final until the cooked food product is well within the freezing process zone. Therefore, oily renderings may remain on food surfaces causing filth depositing onto contact surfaces like conveyor belting, which in turn touches other internal surfaces. Also, some food products have coatings which may disconnect form the food surface and fall downward. So, in the step of monitoring and recording metrics of machine performance between cleanings, metrics may be generated to indicate how the level of filth created in and on food machinery varies by factors of prior food product run time, food product through-put rate (often measured in tons of daily production) and the food recipe (SKU). The quantity levels of these or similar factors are a proxy to amount of filth needing to be cleaned.

In other examples, a full cleaning typically occurs just after the last production day of the week, then the machinery is out of service in periods occurring typically over weekends where the freezer or other machinery is taken out of service after cleaning on the prior work week. After the prior work week cleaning, the food processing machine may be left at room ambient temperature for sometimes full day periods prior to being cleaned again the night before a next production run or early the morning of the next food production run. Such a freezer was left fully cleaned with very little filth left due to having a full cleaning done just after the previous production run. Accordingly, the pre-production cleaning can be a sanitation customized or focused cleaning (specialized at gaining microbiological effect) as opposed to filth removal seeing as filth removal occurred during the post-production cleaning. System monitoring would help detect this post-production cleaning practice and afford the system user the opportunity to tailor the pre-production cleaning process for sanitation of a prior cleaned freezer where filth had been fully removed. In that regard, the step of monitoring and recording metrics of machine performance between cleanings may include generating metrics to indicate whether the past or next cleaning session is a post- or pre-production cleaning.

At block 1420, method 1400 may include determining a machine cleaning optimization step in response to an analysis of data for improving future cleaning sessions for the machine and/or the overall cleaning process for the machine. The data analyzed may include data from at least one sensor of current and past cleaning sessions of the food processing machine and/or CIP system, data from third party sources (data science, calculated values, manufacturer settings, manual settings, publicly available agency regulatory historical data for compliance during a time where product may be recalled for determining the production date range when defective products had been processed, etc.), metrics pertaining to machine performance between cleanings, etc.

The machine cleaning optimization step may be determined by logic stored in the machine computing device 108, which includes at least one processor and a non-transitory computer-readable medium, and which is communicatively coupled to the food processing machine. The non-transitory computer-readable medium has a data store and computer-executable instructions stored thereon. The instructions, in response to execution by the at least one processor, may cause the machine computing device to determine a machine cleaning optimization step(s), which may include providing more details about the analyzed data (that can be used by a user to determine a machine cleaning optimization step(s)) and/or providing recommended actions for improving the cleaning process (see e.g., actions 658B displayed in the screenshot shown in FIG. 6B). The machine cleaning optimization step may be displayed by the machine computing device. If the machine cleaning optimization step includes changing an aspect of the cleaning program, the machine cleaning optimization step may include automatically modifying a program in the cleaning application 130 for use in future cleaning sessions.

The machine cleaning optimization step may be displayed or performed by the machine computing device in response to a first metric relating to at least one cleaning step of the cleaning session of the food processing machine being outside a predetermine range of an average first metric of the at least one cleaning step of a plurality of past cleaning sessions of the food processing machine.

The machine cleaning optimization step may include one or more of the strategies or steps discussed herein that improve the next or a future cleaning session for the machine and/or the overall cleaning process for the machine. For instance, the machine cleaning optimization step may include but is not limited to adjusting set points for time and temperature to ensure pathogen lethal conditions (e.g., on the inlet temperature to the CIP tank, on the duration of a step, etc.), chemical concentration changes, nozzle configuration, pump adjustment, replacing machine components, implementing cleaning process automation, developing cleaning process automation, changing at least one step in the cleaning process, combining cleaning steps, adjusting aspects of a production run before the cleaning process, adjusting the cleaning recipe and/or using a different cleaning recipe based on metrics pertaining to machine performance between cleanings, etc.

For instance, in one example the machine cleaning optimization step includes adjusting and/or changing the cleaning recipe depending on the level of filth created in and on food machinery, which may depend on the prior food product run time, food product through-put rate, and the food recipe (SKU). In another example, the machine cleaning optimization step includes adjusting and/or changing the cleaning recipe depending on whether the past or next cleaning session is a post- or pre-production cleaning.

In another example, the machine cleaning optimization step includes decreasing the length of a cleaning step using water to ensure that water usage stays within local limits. In another example, the machine cleaning optimization step includes increasing the length of a cleaning step using water to ensure that an adequate spray-down of the machine has occurred. In another example, the machine cleaning optimization step includes monitoring an inspection step to ensure, for instance, that certain portions of the machine interior (e.g., the four corners) are thoroughly sprayed down. In another example, the machine cleaning optimization step includes increasing a ramp, soak, and/or hold time at a specified temperature to ensure all the walls, components, etc., reach and stay at a temperature sufficient for pathogen lethality. In another example, the machine cleaning optimization step includes adjusting a configuration of a pump and/or a spray nozzle to create a necessary volumetric rate distribution to each of the internal spray nozzles. In another example, the machine cleaning optimization step includes adjusting a pH and/or chemical concentration level of a cleaning solution to increase removal of any filth accumulation.

In another example, the machine cleaning optimization step includes replenishing cleaning solution when the level or concentration goes below a recommended threshold. In another example, the machine cleaning optimization step includes providing more detailed information on how to fix the issue, such as, for instance, a manual for repairing a component, a website for ordering replacement components, suggested cleaning program step modifications, etc. In another example, the machine cleaning optimization step includes increasing the temperature of water, cleaning solution, air, etc., to ensure adequate defrost of the machine interior and/or components (e.g., the freezer floor). In another example, the machine cleaning optimization step includes modifying the cleaning program by combining cleaning steps (e.g., spray with chemical during defrost to cause the water to wick away faster, install an extra spray bar that allows for spraying down machine faster, etc.), eliminating steps, etc. In another example, the machine cleaning optimization step includes investigating and/or adjusting aspects of the production run before cleaning.

In another example, the machine cleaning optimization step includes performing a cleaning system effectiveness assessment. For instance, the machine cleaning optimization step may include performing a food safety technical cleaning effectiveness assessment giving full data sets with trend plots from machine mounted sensors during a cleaning cycle running a chosen historical timing of a sanitation assessment period data gathering concurrent or relevant to a form of manual sanitation effectiveness testing. The food safety technical cleaning effectiveness assessment may include using at least one of swab testing and riboflavin testing discussed above.

Assessing the cleaning effectiveness and/or machine performance before and/or after times of cleaning effectiveness assessments can be used to improve the cleaning process effectiveness using one or more of the steps discussed herein. For instance, the method may include adjusting a next cleaning event set point parameters to mitigate risk by increasing the pathogen kill step effectiveness, increasing either individual cycle step times or combinations of cycle step times, adjusting temperatures or chemical concentrations in cleaning, etc. Any of the parameters may be automatically adjusted (such as by the cleaning application 130) to effectuate a more aggressive cleaning process after recent data trends indicate off-cycle environmental measures that were suitable for pathogen growth inside the freezer.

It should be appreciated that the machine cleaning optimization step may include any other steps discussed herein or otherwise appropriate for optimizing the cleaning process of a food processing machine, and the machine cleaning optimization step is not limited to the examples provided herein.

In some embodiments, the method 1400 optionally includes storing in the data store 142 by the machine computing device 108, data from the at least one sensor of past cleaning sessions of the food processing machine, and processing, by the machine computing device, the data from the at least one sensor of at least one of current and past cleaning sessions using a machine learning model to determine at least one strategy or machine cleaning optimization step for optimizing a future cleaning process of the food processing machine. The machine computing device 108 may reference data from third party sources (data science, calculated values, manufacturer settings, manual settings, etc.) to train the machine learning model to determine at least one strategy for optimizing a future cleaning process of the food processing machine. In a further optional step, the method 1400 may include modifying, by the machine computing device 108, a future cleaning process of the food processing machine in response to the at least one strategy. For instance, a cleaning program for the food processing machine may be automatically modified and updated in the cleaning application 130 for use in future cleaning sessions.

At block 1424, the method 1400 includes optimizing the machine cleaning process, which includes performing the machine cleaning optimization step to optimize the cleaning process. Performance of the machine cleaning optimization step may be carried out by a user analyzing the displayed data and/or viewing the displayed machine cleaning optimization step (or any party or machine associated with such a user), by logic stored in a computing device, such as the machine computing device 108, or a combination thereof.

Performing the machine cleaning optimization step to optimize the cleaning process may result in reducing the duration of the cleaning session time period and/or one or more steps of the cleaning session, improving the efficiency of the session (e.g., energy consumed), improving the effectiveness of the cleaning session (e.g., more clean by tailoring the cleaning program to a specific SKU or production run, more automated, more lethal for pathogens by adjusting temperature/humidity set points, etc.), correlating a machine cleaning program to a specific production run of the machine (such as the SKU, the day of the month, etc.), etc.

By carrying out some or all aspects of method 1400, the machine owner or production manager can optimize the cleaning process for the machine, such as by improving the quality of cleaning steps and conserving utilities. Moreover, the overall cleaning process for the site and/or machine can be optimized to maximize uptime of the machine. It should be appreciated that the steps of method 1400 may be performed in any other order, and certain steps may be omitted.

Figure 15:
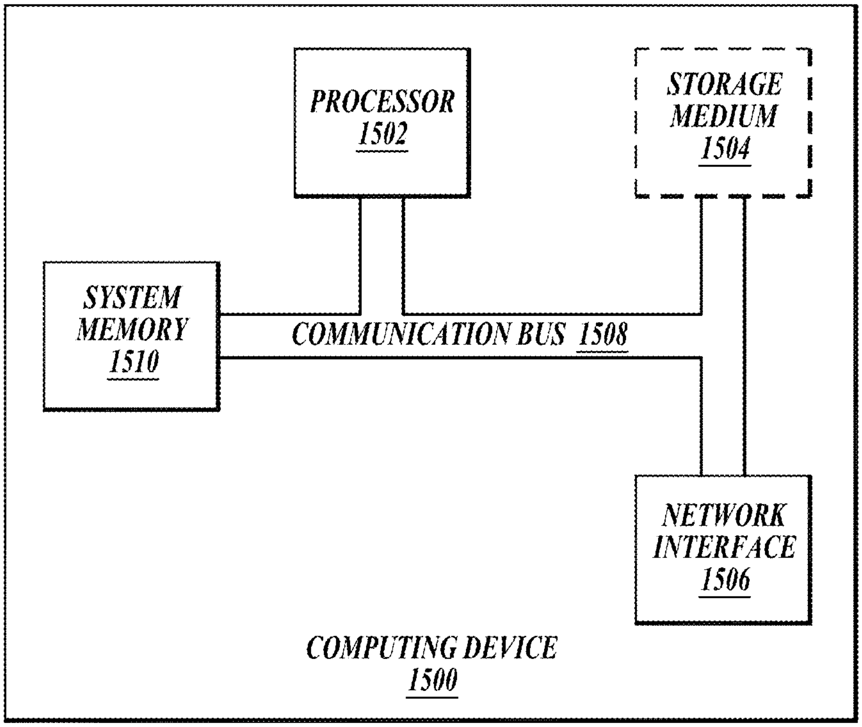
FIG. 15 is a block diagram that illustrates a non-limiting example embodiment of a computing device appropriate for use as a computing device with embodiments of the present disclosure.

FIG. 15 is a block diagram that illustrates aspects of an exemplary computing device 1500 appropriate for use as a computing device of the present disclosure. While multiple different types of computing devices were discussed above, the exemplary computing device 1500 describes various elements that are common to many different types of computing devices. While FIG. 15 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 1500 may be any one of any number of currently available or yet to be developed devices.

In its most basic configuration, the computing device 1500 includes at least one processor 1502 and a system memory 1515 connected by a communication bus 1508. Depending on the exact configuration and type of device, the system memory 1510 may be volatile or nonvolatile memory, such as read only memory ("ROM"), random access memory ("RAM"), EEPROM, flash memory, or similar memory technology. Those of ordinary skill in the art and others will recognize that system memory 1510 typically stores data and/or program modules that are immediately accessible to and/or currently being operated on by the processor 1502. In this regard, the processor 1502 may serve as a computational center of the computing device 1500 by supporting the execution of instructions.

As further illustrated in FIG. 15, the computing device 1500 may include a network interface 1506 comprising one or more components for communicating with other devices over a network. Embodiments of the present disclosure may access basic services that utilize the network interface 1506 to perform communications using common network protocols. The network interface 1506 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1506 illustrated in FIG. 15 may represent one or more wireless interfaces or physical communication interfaces described and illustrated above with respect to particular components of the computing device 1500.

In the exemplary embodiment depicted in FIG. 15, the computing device 1500 also includes a storage medium 1504. However, services may be accessed using a computing device that does not include means for persisting data to a local storage medium. Therefore, the storage medium 1504 depicted in FIG. 15 is represented with a dashed line to indicate that the storage medium 1504 is optional. In any event, the storage medium 1504 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1502, system memory 1510, communication bus 1508, storage medium 1504, and network interface 1506 are known and commercially available. For ease of illustration and because it is not important for an understanding of the claimed subject matter, FIG. 15 does not show some of the typical components of many computing devices. In this regard, the computing device 1500 may include input devices, such as a keyboard, keypad, mouse, microphone, touch input device, touch screen, tablet, and/or the like. Such input devices may be coupled to the computing device 1500 by wired or wireless connections including RF, infrared, serial, parallel, Bluetooth, Bluetooth low energy, USB, or other suitable connections protocols using wireless or physical connections. Similarly, the computing device 1500 may also include output devices such as a display, speakers, printer, etc. Since these devices are well known in the art, they are not illustrated or described further herein.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Systems implementing methods according to this disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Various example embodiments of the disclosure are discussed in detail above. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. The term "about," "approximately," etc., means plus or minus 5% of the stated value.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

While illustrative embodiments have been illustrated and described, it will be appreciated that various changes can be made therein without departing from the spirit and scope of the invention.

LISTING OF INNOVATIONS

Clause 1. A system for optimizing a cleaning process of a food processing machine, the system comprising: a food processing machine having at least one sensor for performing at least one of detecting and measuring a physical property of the food processing machine during a cleaning session having at least one cleaning step; a machine computing device having at least one processor and a non-transitory computer-readable medium; wherein the machine computing device is communicatively coupled to the food processing machine; wherein the non-transitory computer-readable medium has a data store and computer-executable instructions stored thereon; and wherein the instructions, in response to execution by the at least one processor, cause the machine computing device to perform actions comprising: receiving, by the machine computing device, data from the at least one sensor; processing, by the machine computing device, the data from the at least one sensor; and displaying, by the machine computing device, processed sensor data as a first metric relating to at least one cleaning step of a selected cleaning session of the food processing machine compared to an average first metric of the at least one cleaning step of a plurality of past cleaning sessions of the food processing machine.

Clause 2. The system of Clause 1, wherein the instructions, in response to execution by the at least one processor, cause the machine computing device to perform actions further comprising: storing in the data store, by the machine computing device, data from the at least one sensor of the at least one cleaning step of past cleaning sessions of the food processing machine; processing, by the machine computing device, the data from the at least one sensor of the at least one cleaning step of at least one of current and past cleaning sessions using a machine learning model to determine at least one strategy for optimizing a future cleaning session of the food processing machine.

Clause 3. The system of Clause 2, wherein the instructions, in response to execution by the at least one processor, cause the machine computing device to perform actions further comprising: modifying, by the machine computing device, at least one cleaning step of a future cleaning session of the food processing machine in response to the at least one strategy.

Clause 4. The system of Clause 1, wherein the instructions, in response to execution by the at least one processor, cause the machine computing device to perform actions further comprising: monitoring and recording, by the machine computing device, machine performance metrics between cleaning sessions of the food processing machine.

Clause 5. The system of Clause 4, wherein the instructions, in response to execution by the at least one processor, cause the machine computing device to perform actions further comprising: correlating, by the machine computing device, the machine performance metrics between cleaning sessions using the at least one cleaning step with cleaning session metrics generated from data from the at least one sensor of past cleaning sessions of the food processing machine using the at least one cleaning step.

Clause 6. The system of Clause 4 or 5, wherein the machine performance metrics between cleaning sessions include at least one of a type of product processed by the food processing machine, a throughput of product of the food processing machine, a temperature of product processed by the food processing machine at various points within the food processing machine, a temperature of a chamber inside the food processing machine, a production start and end time of the food processing machine, and an indication of whether a past or next cleaning session is a post- or pre-production cleaning.

Clause 7. The system of Clause 4, 5 or 6, wherein the instructions, in response to execution by the at least one processor, cause the machine computing device to perform actions further comprising: displaying, by the machine computing device, a machine cleaning optimization step configured to improve at least one of future cleaning sessions for the machine and an overall cleaning process for the machine.

Clause 8. The system of Clause 7, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying the at least one step in the cleaning process, using a different a cleaning recipe from a previous cleaning session, combining cleaning steps, adjusting aspects of a production run before the cleaning session, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, performing a cleaning system effectiveness assessment, and performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 9. The system of Clause 8, wherein the food safety technical cleaning effectiveness assessment include using at least one of swab testing and riboflavin testing.

Clause 10. The system of Clause 7, 8, or 9, wherein the instructions, in response to execution by the at least one processor, cause the machine computing device to perform actions further comprising: performing the machine cleaning optimization step.

Clause 11. The system of Clause 7, wherein the machine performance metrics between cleaning sessions of the food processing machine using the at least one cleaning step include indications of filth level.

Clause 12. The system of Clause 11, wherein the indications of filth level are determined on at least one of a prior food product run time, food product through-put rate, and food recipe (SKU).

Clause 13. The system of Clause 11 or 12, wherein the machine performance metrics between cleaning sessions of the food processing machine include an indication of whether a past or next cleaning session is a post- or pre-production cleaning.

Clause 14. The system of Clause 11, 12, or 13, wherein the machine cleaning optimization step includes adjusting at least one cleaning step of a next or future cleaning session depending on at least one of the filth indication level and the indication of whether the past or next cleaning session is a post- or pre-production cleaning.

Clause 15. The system of Clause 1, wherein the instructions, in response to execution by the at least one processor, cause the machine computing device to perform actions further comprising: displaying, by the machine computing device, at least one of real time metrics and past session metrics for a selected cleaning session of the food processing machine.

Clause 16. The system of Clause 1, wherein the instructions, in response to execution by the at least one processor, cause the machine computing device to perform actions further comprising: displaying, by the machine computing device, a status indicating at least one of an alarm, a wait time, and an indication of a LO/TO event(s) generated during a step of the selected cleaning session.

Clause 17. The system of Clause 16, wherein the instructions, in response to execution by the at least one processor, cause the machine computing device to perform actions further comprising: displaying, by the machine computing device, at least one of further details and recommended actions for addressing the issue that generated the alarm during the step of the selected cleaning session.

Clause 18. The system of Clause 17, wherein alarms generated during a step of a cleaning session are configured to relate to both a cleaning system component and a food processing machine component.

Clause 19. The system of Clause 17 or 18, wherein the alarms generated during a step of a cleaning session indicate at least one of an inspection step having a duration shorter than an average duration of the inspection step of at least one past cleaning session, a drying step having a duration shorter than an average duration of the drying step of at least one past cleaning sessions, a sensed temperature of at least one of a machine portion and component having at least one of a temperature and a hold time less than a temperature and hold time of at least one past cleaning session, a sensed temperature of at least one of a machine portion and component having at least one of a temperature and a hold time less than a temperature and hold time of at least one past cleaning session, water consumption during a spray-down step that is less than an average water consumption of at least one past cleaning session, water consumption during a spray-down step that is greater than an average water consumption of at least one past cleaning session, a filth level indicative of a harborage for pathogens, Clause 20. The system of Clause 17 or 18, wherein the alarms generated during a step of a cleaning session indicate a sensed temperature of a portion of a freezer floor having at least one of a temperature and a hold time less than a temperature and hold time of at least one past cleaning session.

Clause 21. The system of Clause 17, 18, 19, or 20, wherein the instructions, in response to execution by the at least one processor, cause the machine computing device to perform actions further comprising: expanding, upon selection by a user interfacing with the machine computing device, at least one cleaning step of the cleaning session generating an alarm for displaying sub-steps of the at least one cleaning step, wherein the user may select a sub-step to display at least one of further details and recommended actions for addressing the issue that generated the alarm during the at least one cleaning step of the cleaning session.

Clause 22. The system of Clause 1, wherein the instructions, in response to execution by the at least one processor, cause the machine computing device to perform actions further comprising: displaying, by the machine computing device, a machine cleaning optimization step configured to improve at least one of future cleaning sessions for the machine and the overall cleaning process for the machine.

Clause 23. The system of Clause 22, wherein the machine cleaning optimization step includes at least one of replacing machine components, adjusting set points for time and temperature, adjusting at least one of a pH and chemical concentration of a cleaning solution, adjusting nozzle configuration, automating the cleaning process, changing at least one step in the cleaning process, combining cleaning steps, using a different cleaning recipe, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, performing a cleaning system effectiveness assessment, and performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 24. The system of Clause 23, wherein the food safety technical cleaning effectiveness assessment include using at least one of swab testing and riboflavin testing.

Clause 25. The system of Clause 22, 23 or 24, wherein the instructions, in response to execution by the at least one processor, cause the machine computing device to perform actions further comprising: performing the machine cleaning optimization step.

Clause 26. The system of Clause 1, wherein the instructions, in response to execution by the at least one processor, cause the machine computing device to perform actions further comprising: at least one of displaying and performing, by the machine computing device, a machine cleaning optimization step configured to improve at least one of future cleaning sessions for the machine and the overall cleaning process for the machine.

Clause 27. The system of Clause 26, wherein the machine cleaning optimization step includes at least one of adjusting set points for time and temperature, adjusting at least one of a pH and chemical concentration of a cleaning solution, automating the cleaning process, changing at least one step in the cleaning process, combining cleaning steps, using a different cleaning recipe, adjusting aspects of a production run before the cleaning session, decreasing the length of a cleaning step using water, increasing the length of a cleaning step using water, monitoring an inspection step, increasing at least one of a ramp, soak, or hold time at a specified temperature, providing detailed information on how to fix an issue, increasing the temperature of a fluid, and performing a cleaning system effectiveness assessment.

Clause 28. The system of Clause 1, wherein the first metric is one of a duration of a cleaning step of a cleaning session and an overall duration of a cleaning session.

Clause 29. The system of Clause 1, wherein the instructions, in response to execution by the at least one processor, cause the machine computing device to perform actions further comprising: displaying, by the machine computing device, a graphical depiction of the first metric of a first cleaning step of a cleaning session of the food processing machine compared to the first metric of at least a second cleaning step of the cleaning session of the food processing machine.

Clause 30. The system of Clause 29, wherein the first metric is a duration of the cleaning step, and wherein the duration of each cleaning step of the cleaning session is represented in a segmented bar graph.

Clause 31. The system of Clause 29 or 30, wherein the instructions, in response to execution by the at least one processor, cause the machine computing device to perform actions further comprising: displaying, by the machine computing device, at least one of an alarm, a wait time, and an indication of a LO/TO event(s) at least one of interposed between cleaning steps and overlaid on at least one of the cleaning steps.

Clause 32. The system of Clause 30 or 31, wherein the instructions, in response to execution by the at least one processor, cause the machine computing device to perform actions further comprising: displaying, by the machine computing device, at least a second metric for each cleaning step when a user performs at least one of clicking on or hovering over the segment in the bar graph.

Clause 33. The system of Clause 1, wherein the instructions, in response to execution by the at least one processor, cause the machine computing device to perform actions further comprising: displaying, by the machine computing device, a graphical depiction of steps of a cleaning session as a timeline showing the duration of each cleaning step in the cleaning session and the overall duration of the cleaning session.

Clause 34. The system of Clause 33, wherein the instructions, in response to execution by the at least one processor, cause the machine computing device to perform actions further comprising: displaying, by the machine computing device, a graphical depiction of an alarm of the cleaning session at least one of overlying the cleaning step of the cleaning session in which the alarm occurred and interposed between cleaning steps of the cleaning session in which the alarm occurred.

Clause 35. The system of Clause 1, wherein the instructions, in response to execution by the at least one processor, cause the machine computing device to perform actions further comprising: displaying, by the machine computing device, a graphical depiction of a wait time of the food processing machine at least one of overlying the cleaning step of the cleaning session in which the wait time occurred and interposed between cleaning steps of the cleaning session in which the alarm occurred.

Clause 36. The system of Clause 1, wherein the instructions, in response to execution by the at least one processor, cause the machine computing device to perform actions further comprising: displaying, by the machine computing device, a graphical depiction of a wait time of the food processing machine overlying a state of the cleaning session in which the wait time occurred or interposed between states of the cleaning session in which the wait time occurred.

Clause 37. The system of Clause 1, wherein the instructions, in response to execution by the at least one processor, cause the machine computing device to perform actions further comprising: displaying, by the machine computing device, a graphical depiction of a LO/TO event(s) of the food processing machine overlying a state of the cleaning session in which the LO/TO event(s) occurred or interposed between states of the cleaning session in which the LO/TO event(s) occurred.

Clause 38. The system of Clause 1, wherein the instructions, in response to execution by the at least one processor, cause the machine computing device to perform actions further comprising: displaying, by the machine computing device, a graphical depiction of a first metric of the at least one cleaning step of a cleaning session of the food processing machine over a selected period of time.

Clause 39. The system of Clause 38, wherein the instructions, in response to execution by the at least one processor, cause the machine computing device to perform actions further comprising: displaying, by the machine computing device, a graphical depiction of a first metric of the at least one cleaning step of a first cleaning session of the food processing machine compared to a graphical depiction of a first metric of the at least one cleaning step of a second cleaning session of the food processing machine.

Clause 40. The system of Clause 1, wherein the instructions, in response to execution by the at least one processor, cause the machine computing device to perform actions further comprising: displaying, by the machine computing device, a first metric of the at least one cleaning step of a cleaning session compared to at least one of a minimum and maximum first metric of the at least one cleaning step of a past cleaning session of the food processing machine.

Clause 41. The system of any preceding Clause, wherein the food processing machine is a freezer, and wherein the cleaning session for the freezer includes at least one of the following cleaning steps: defrosting an evaporator coil, pre-rinsing the freezer interior and freezer components, applying at least one of a cleaning solution and foam to a freezer interior and freezer components, rinsing the freezer interior and freezer components, inspecting the freezer interior and freezer components, disinfecting the freezer interior and freezer components, spot cleaning the freezer interior and freezer components, and drying the freezer interior and freezer components.

Clause 42. A method for optimizing a cleaning process of a food processing machine, the method comprising: performing, with at least one sensor, at least one of detecting and measuring a physical property of at least one of a food processing machine and a clean-in-place (CIP) system for carrying out a CIP process on the food processing machine during at least one cleaning step of the cleaning session; receiving, by a machine computing device, data from the at least one sensor; processing, by the machine computing device, the data from the at least one sensor; and displaying, by the machine computing device, processed sensor data as a first metric relating to the at least one cleaning step of the cleaning session of the food processing machine compared to an average first metric of the at least one cleaning step of a plurality of past cleaning sessions of the food processing machine.

Clause 43. The method of Clause 42, further comprising: storing, by the machine computing device in a data store of the machine computing device, data from the at least one sensor of the at least one cleaning step of past cleaning sessions of the food processing machine; processing, by the machine computing device, the data from the at least one sensor of the at least one cleaning step of at least one of current and past cleaning sessions using a machine learning model to determine at least one strategy for optimizing a future cleaning process of the food processing machine.

Clause 44. The method of Clause 43, further comprising at least one of displaying and performing, by the machine computing device, a machine cleaning optimization step to optimize the cleaning process according to the at least one strategy.

Clause 45. The method of Clause 44, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying at least one step in the cleaning process, using a different a cleaning recipe from a previous cleaning session, combining cleaning steps, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 46. The method of Clause 44, wherein the machine cleaning optimization step includes performing, by the machine computing device, a food safety technical cleaning effectiveness assessment giving full data sets with trend plots from machine mounted sensors during a cleaning cycle running a chosen historical timing of a sanitation assessment period data gathering concurrent or relevant to a form of manual sanitation effectiveness testing.

Clause 47. The method of Clause 46, wherein the food safety technical cleaning effectiveness assessment include using at least one of swab testing and riboflavin testing.

Clause 48. The method of Clause 44, 45, 46, or 47, wherein performing the machine cleaning optimization step optimizes the machine cleaning process by one of increasing or reducing the duration of a cleaning session, one of increasing or reducing the duration of one or more steps of a cleaning session, improving the efficiency of a cleaning session, improving the effectiveness of a cleaning session, correlating a machine cleaning program to a specific production run of the machine, or any combination thereof.

Clause 49. The method of Clause 42, further comprising at least one of displaying and performing, by the machine computing device, a machine cleaning optimization step configured to improve at least one of future cleaning sessions for the machine and the overall cleaning process for the machine.

Clause 50. The method of Clause 49, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying at least one step in the cleaning process, combining cleaning steps, using a different cleaning recipe, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 51. The method of Clause 49, wherein the machine cleaning optimization step includes performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 52. The method of Clause 51, wherein the food safety technical cleaning effectiveness assessment include using at least one of swab testing and riboflavin testing.

Clause 53. The method of Clause 42, further comprising monitoring and recording, by the machine computing device, machine performance metrics between cleaning sessions of the food processing machine.

Clause 54. The method of Clause 53, further comprising correlating, by the machine computing device, the machine performance metrics between cleaning sessions using the at least one cleaning step with cleaning session metrics generated from data from the at least one sensor of past cleaning sessions of the food processing machine using the at least one cleaning step.

Clause 55. The method of Clause 53 or 54, wherein the machine performance metrics between cleaning sessions include at least one of a type of product processed by the machine, a throughput of product of the machine, a temperature of product processed the machine at various points within the machine, a temperature of a chamber inside the machine, a production start and end time of the machine, and an indication of whether a past or next cleaning session is a post- or pre-production cleaning.

Clause 56. The method of Clause 53, 54, or 55, further comprising at least one of displaying and performing, by the machine computing device, a machine cleaning optimization step configured to improve at least one of future cleaning sessions for the machine and the overall cleaning process for the machine.

Clause 57. The method of Clause 56, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying the at least one step in the cleaning process, using a different a cleaning recipe from a previous cleaning session, combining cleaning steps, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 58. The method of Clause 56, wherein the machine cleaning optimization step includes performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 59. The method of Clause 58, wherein the food safety technical cleaning effectiveness assessment include using at least one of swab testing and riboflavin testing.

Clause 60. The method of Clause 53, further comprising monitoring and recording, by the machine computing device, a filth level of the machine between cleaning sessions using the at least one cleaning step.

Clause 61. The method of Clause 60, wherein the step of monitoring and recording, by the machine computing device, the filth level of the machine between cleaning sessions is determined on at least one of a prior food product run time, food product through-put rate, and food recipe (SKU).

Clause 62. The method of Clause 60 or 61, further comprising monitoring and recording, by the machine computing device, whether a past or next cleaning session is a post- or pre-production cleaning.

Clause 63. The method of Clause 60, 61, or 62, further comprising adjusting, by the machine computing device, at least one cleaning step of a next or future cleaning session depending on at least one of a filth indication level and an indication of whether the past or next cleaning session is a post- or pre-production cleaning.

Clause 64. The method of Clause 42, further comprising displaying, by the machine computing device, at least one of real time metrics and past session metrics for a selected cleaning session of the food processing machine.

Clause 65. The method of Clause 42, further comprising displaying, by the machine computing device, a status indicating at least one of an alarm, a wait time, and an indication of a LO/TO event(s) generated during a step of the selected cleaning session.

Clause 66. The method of Clause 65, further comprising displaying, by the machine computing device, at least one of further details and recommended actions for addressing the issue that generated the alarm, wait time, or indication of a LO/TO event(s) during the step of the selected cleaning session.

Clause 67. The method of Clause 65 or 66, wherein alarms generated during a step of a cleaning session are configured to relate to both a cleaning system component and a food processing machine component.

Clause 68. The method of Clause 65, 66, or 67 wherein the alarms generated during a step of a cleaning session indicate at least one of an inspection step having a duration shorter than an average duration of the inspection step of at least one past cleaning session, a drying step having a duration shorter than an average duration of the drying step of at least one past cleaning sessions, a sensed temperature of at least one of a machine portion and component having at least one of a temperature and a hold time less than a temperature and hold time of at least one past cleaning session, a sensed temperature of at least one of a machine portion and component having at least one of a temperature and a hold time less than a temperature and hold time of at least one past cleaning session, water consumption during a spray-down step that is less than an average water consumption of at least one past cleaning session, water consumption during a spray-down step that is greater than an average water consumption of at least one past cleaning session, a filth level indicative of a harborage for pathogens, Clause 69. The method of Clause 65, 66, 67, or 68 wherein the alarms generated during a step of a cleaning session indicate a sensed temperature of a portion of a freezer floor having at least one of a temperature and a hold time less than a temperature and hold time of at least one past cleaning session.

Clause 70. The method of Clause 65, 66, 67, 68, or 69 further comprising expanding, upon selection by a user interfacing with the machine computing device, at least one cleaning step of the cleaning session generating an alarm for displaying sub-steps of the at least one cleaning step, wherein the user may select a sub-step to display at least one of further details and recommended actions for addressing the issue that generated the alarm during the at least one cleaning step of the cleaning session.

Clause 71. The method of Clause 42, wherein the first metric is one of a duration of a cleaning step of a cleaning session and an overall duration of a cleaning session.

Clause 72. The method of Clause 42, further comprising displaying, by the machine computing device, a graphical depiction of the first metric of a first cleaning step of a cleaning session of the food processing machine compared to the first metric of at least a second cleaning step of the cleaning session of the food processing machine.

Clause 73. The method of Clause 72, wherein the first metric is a duration of the cleaning step, and wherein the duration of each cleaning step of the cleaning session is represented in a segmented bar graph.

Clause 74. The method of Clause 72 or 73, further comprising displaying, by the machine computing device, at least one of an alarm, a wait time, and an indication of a LO/TO event(s) interposed between cleaning steps and overlaid on at least one of the cleaning steps.

Clause 75. The method of Clause 72, 63, or 74, further comprising displaying, by the machine computing device, at least a second metric for each cleaning step when a user performs at least one of clicking on or hovering over the segment in the bar graph.

Clause 76. The method of Clause 42, further comprising displaying, by the machine computing device, a graphical depiction of a first metric of the at least one cleaning step of a cleaning session of the food processing machine over a selected period of time.

Clause 77. The method of Clause 42, further comprising displaying, by the machine computing device, a graphical depiction of a first metric of the at least one cleaning step of a first cleaning session of the food processing machine compared to a graphical depiction of a first metric of the at least one cleaning step of a second cleaning session of the food processing machine.

Clause 78. The method of Clause 42, further comprising displaying, by the machine computing device, a first metric of a cleaning session compared to at least one of a minimum and maximum first metric of a past cleaning session of the food processing machine.

Clause 79. The method of any preceding Clause, wherein the food processing machine is a freezer, and wherein the step of performing a cleaning process on a food processing machine having at least one sensor includes at least one of the following cleaning steps: defrosting an evaporator coil, pre-rinsing the freezer interior and freezer components, applying at least one of a cleaning solution and foam to a freezer interior and freezer components, rinsing the freezer interior and freezer components, inspecting the freezer interior and freezer components, disinfecting the freezer interior and freezer components, spot cleaning the freezer interior and freezer components, and drying the freezer interior and freezer components.

Clause 80. A method for optimizing a cleaning process of a food processing machine, the method comprising: performing at least one cleaning step of a cleaning session on a food processing machine; performing, with at least one sensor, at least one of detecting and measuring a physical property of at least one of a food processing machine and a clean-in-place (CIP) system for carrying out a CIP process on the food processing machine during the cleaning session; receiving, by a machine computing device, data from the at least one sensor; processing, by the machine computing device, the data from the at least one sensor; displaying, by the machine computing device, processed sensor data as a first metric relating to at least one cleaning step of the cleaning session of the food processing machine compared to an average first metric of the at least one cleaning step of a plurality of past cleaning sessions of the food processing machine; displaying, by the machine computing device, a status indicating at least one of an alarm, a wait time, and an indication of a LO/TO event(s) generated during the at least one cleaning step of the cleaning session; and at least one of displaying and performing, by the machine computing device, a machine cleaning optimization step for addressing the issue that generated the at least one of an alarm, a wait time, and an indication of a LO/TO event(s) during the at least one cleaning step of the cleaning session in response to the first metric relating to at least one cleaning step of the cleaning session of the food processing machine being outside a predetermine range of the average first metric of the at least one cleaning step of a plurality of past cleaning sessions of the food processing machine.

Clause 81. The method of Clause 80, further comprising: storing, in a data store of the machine computing device, data from the at least one sensor of the at least one cleaning step of past cleaning sessions of the food processing machine; processing, by the machine computing device, the data from the at least one sensor of the at least one cleaning step of at least one of current and past cleaning sessions using a machine learning model to determine at least one strategy for optimizing a future cleaning process of the food processing machine.

Clause 82. The method of Clause 81, further comprising performing the machine cleaning optimization step to optimize the cleaning process according to the at least one strategy.

Clause 83. The method of Clause 82, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying at least one step in the cleaning process, combining cleaning steps, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 84. The method of Clause 82, wherein the machine cleaning optimization step includes performing, by the machine computing device, a food safety technical cleaning effectiveness assessment giving full data sets with trend plots from machine mounted sensors during a cleaning cycle running a chosen historical timing of a sanitation assessment period data gathering concurrent or relevant to a form of manual sanitation effectiveness testing.

Clause 85. The method of Clause 84, wherein the food safety technical cleaning effectiveness assessment include using at least one of swab testing and riboflavin testing.

Clause 86. The method of Clause 82, 83, 84, or 85, wherein performing the machine cleaning optimization step optimizes the machine cleaning process by one of increasing or reducing the duration of a cleaning session, one of increasing or reducing the duration of one or more steps of a cleaning session, improving the efficiency of a cleaning session, improving the effectiveness of a cleaning session, or correlating a machine cleaning program to a specific production run of the machine, or any combination thereof.

Clause 87. The method of Clause 80, wherein the machine cleaning optimization step includes at least one of replacing machine components, adjusting set points for time and temperature, adjusting at least one of a pH and chemical concentration of a cleaning solution, adjusting nozzle configuration, automating the cleaning process, changing at least one step in the cleaning process, combining cleaning steps, using a different cleaning recipe, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 88. The method of Clause 80, wherein the machine cleaning optimization step includes performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 89. The method of Clause 88, wherein the food safety technical cleaning effectiveness assessment include using at least one of swab testing and riboflavin testing.

Clause 90. The method of Clause 87, 88, or 89, wherein the machine cleaning optimization step optimizes the machine cleaning process by at least one of reducing or increasing the duration of a cleaning session, at least one of reducing or increasing the duration of one or more steps of a cleaning session, improving the cleaning efficiency of a cleaning session, improving the effectiveness of a cleaning session, or correlating a machine cleaning program to a specific production run of the machine, or any combination thereof.

Clause 91. The method of Clause 80, further comprising monitoring and recording, by the machine computing device, machine performance metrics between cleaning sessions of the machine.

Clause 92. The method of Clause 91, further comprising correlating, by the machine computing device, the machine performance metrics between cleaning sessions using the at least one cleaning step with cleaning session metrics generated from data from the at least one sensor of past cleaning sessions of the food processing machine using the at least one cleaning step.

Clause 93. The method of Clause 91 or 92, wherein the machine performance metrics between cleaning sessions include at least one of a type of product processed by the machine, a throughput of product of the machine, a temperature of product processed the machine at various points within the machine, a temperature of a chamber inside the machine, a production start and end time of the machine, and an indication of whether a past or next cleaning session is a post- or pre-production cleaning.

Clause 94. The method of Clause 91, 92, or 93, wherein the machine cleaning optimization step includes at least one of replacing machine components, adjusting set points for time and temperature, adjusting at least one of a pH and chemical concentration of a cleaning solution, adjusting nozzle configuration, automating the cleaning process, changing at least one step in the cleaning process, combining cleaning steps, using a different cleaning recipe, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, adjusting aspects of the production run before the cleaning session, and performing a cleaning system effectiveness assessment.

Clause 95. The method of Clause 91, 92, or 93, wherein the machine cleaning optimization step includes performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 96. The method of Clause 95, wherein the food safety technical cleaning effectiveness assessment include using at least one of swab testing and riboflavin testing.

Clause 97. The method of Clause 80, further comprising monitoring and recording, by the machine computing device, a filth level of the machine between cleaning sessions using the at least one cleaning step.

Clause 98. The method of Clause 97, wherein the step of monitoring and recording, by the machine computing device, the filth level of the machine between cleaning sessions is determined on at least one of a prior food product run time, food product through-put rate, and food recipe (SKU).

Clause 99. The method of Clause 97 or 98, further comprising monitoring and recording, by the machine computing device, whether a past or next cleaning session is a post- or pre-production cleaning.

Clause 100. The method of Clause 97, 98, or 99, further comprising adjusting, by the machine computing device, at least one cleaning step of a next or future cleaning session depending on at least one of a filth indication level and an indication of whether the past or next cleaning session is a post- or pre-production cleaning.

Clause 101. The method of any of Clauses 91-100, wherein the machine cleaning optimization step optimizes the machine cleaning process by at least one of reducing or increasing the duration of a cleaning session, at least one of reducing or increasing the duration of one or more steps of a cleaning session, improving the cleaning efficiency of a cleaning session, improving the effectiveness of a cleaning session, or correlating a machine cleaning program to a specific production run of the machine, or any combination thereof.

Clause 102. The method of Clause 80, wherein alarms generated during a step of a cleaning session are configured to relate to both a cleaning system component and a food processing machine component.

Clause 103. The method of Clause 80 or 102 wherein the alarms generated during a step of a cleaning session indicate at least one of an inspection step having a duration shorter than an average duration of the inspection step of at least one past cleaning session, a drying step having a duration shorter than an average duration of the drying step of at least one past cleaning sessions, a sensed temperature of at least one of a machine portion and component having at least one of a temperature and a hold time less than a temperature and hold time of at least one past cleaning session, a sensed temperature of at least one of a machine portion and component having at least one of a temperature and a hold time less than a temperature and hold time of at least one past cleaning session, water consumption during a spray-down step that is less than an average water consumption of at least one past cleaning session, water consumption during a spray-down step that is greater than an average water consumption of at least one past cleaning session, a filth level indicative of a harborage for pathogens, Clause 104. The method of Clause 80, 102, or 103, wherein the alarms generated during a step of a cleaning session indicate a sensed temperature of a portion of a freezer floor having at least one of a temperature and a hold time less than a temperature and hold time of at least one past cleaning session.

Clause 105. The method of Clause 80, 102, 103, or 104, further comprising expanding, upon selection by a user interfacing with the machine computing device, at least one cleaning step of the cleaning session generating an alarm for displaying sub-steps of the at least one cleaning step, wherein the user may select a sub-step to display at least one of further details and recommended actions for addressing the issue that generated the alarm during the at least one cleaning step of the cleaning session.

Clause 106. The method of Clause 80, further comprising displaying, by the machine computing device, at least one of real time metrics and past session metrics for a selected cleaning session of the food processing machine.

Clause 107. The method of Clause 80, wherein the at least one metric is one of a duration of a cleaning step of a cleaning session and an overall duration of a cleaning session.

Clause 108. The method of Clause 80, further comprising displaying, by the machine computing device, a graphical depiction of the at least one metric of a first cleaning step of a cleaning session of the food processing machine compared to the at least one metric of at least a second cleaning step of the cleaning session of the food processing machine.

Clause 109. The method of Clause 108, wherein the at least one metric is a duration of the cleaning step, and wherein the duration of each cleaning step of the cleaning session is represented in a segmented bar graph.

Clause 110. The method of Clause 108 or 109, further comprising displaying, by the machine computing device, at least one of an alarm, a wait time, and an indication of a LO/TO event(s), wherein the at least one of an alarm, a wait time, and an indication of a LO/TO event(s) are at least one of interposed between cleaning steps and overlaid on at least one of the cleaning steps.

Clause 111. The method of Clause 109 or 110, further comprising displaying, by the machine computing device, at least a second metric for each cleaning step when a user performs at least one of clicking on or hovering over the segment in the bar graph.

Clause 112. The method of Clause 80, further comprising displaying, by the machine computing device, a graphical depiction of a first metric of the at least one cleaning step of a cleaning session of the food processing machine over a selected period of time.

Clause 113. The method of Clause 80, further comprising displaying, by the machine computing device, a graphical depiction of a first metric of the at least one cleaning step of a first cleaning session of the food processing machine compared to a graphical depiction of a first metric of the at least one cleaning step of a second cleaning session of the food processing machine.

Clause 114. The method of Clause 80, further comprising displaying, by the machine computing device, a first metric of a cleaning session compared to at least one of a minimum and maximum first metric of a past cleaning session of the food processing machine.

Clause 115. The method of any of Clauses 80-114, wherein the food processing machine is a freezer, and wherein the step of performing a cleaning process on a food processing machine having at least one sensor includes at least one of the following cleaning steps: defrosting an evaporator coil, pre-rinsing the freezer interior and freezer components, applying at least one of a cleaning solution and foam to a freezer interior and freezer components, rinsing the freezer interior and freezer components, inspecting the freezer interior and freezer components, disinfecting the freezer interior and freezer components, spot cleaning the freezer interior and freezer components, and drying the freezer interior and freezer components.

Clause 116. The system of Clause 1, wherein the instructions, in response to execution by the at least one processor, cause the machine computing device to perform actions further comprising: monitoring environmental-based conditions and automatically adjusting cleaning process parameters per a prior time period of monitored environmental conditions to remove biofilm layer accumulation.

Clause 117. The system of Clause 116, wherein the instructions, in response to execution by the at least one processor, cause the machine computing device to perform actions further comprising: monitoring production-based conditions and automatically adjusting cleaning process parameters per prior monitored production conditions to remove biofilm layer accumulation.

Clause 118. The method of Clause 80, further comprising performing a historical data search with agency regulatory focus for compliance during a time where product may be recalled for determining the production date range when defective products had been processed.

Clause 119. The method of Clause 80, further comprising performing a food safety technical cleaning effectiveness assessment, with the machine computing device, giving full data sets with trend plot from machine mounted sensors during time of cleaning cycle system running a chosen historical timing of a sanitation assessment period data gathering concurrent or relevant to a form of manual sanitation effectiveness testing.

Clause 120. The method of Clause 119, further comprising of adjusting, with the machine computing device, next cleaning event set point parameters to mitigate risk by increasing the pathogen kill step effectiveness, increasing either or combinations of individual cycle step times, temperatures, or chemical concentrations in cleaning by automatically readjusting any of those parameters to have a more aggressive cleaning process after recent data trend indication of off-cycle environmental measures that were suitable for pathogen growth inside the freezer.

Clause 121. The method of Clause 119, wherein the food safety technical cleaning effectiveness assessment include using at least one of swab testing and riboflavin testing.

Clause 122. The method of Clause 119, 120, or 121, wherein reactionary cleaning effectiveness assessment becomes less frequent or unnecessary with improved sanitation sensing within the equipment in combination with trend record keeping of historical process parameters.

Clause 123. The system of Clause 1, wherein the at least one sensor is a CIP sensor of a clean-in-place (CIP) system for the food processing machine.

Clause 124. The system of Clause 123, wherein the CIP system has a CIP tank, a water inlet for supply water to the CIP tank, a cleaning solution inlet for supplying cleaning solution to the CIP tank, a pump for flowing fluid from the CIP tank to the food processing machine, and a CIP sensor assembly.

Clause 125. The system of Clause 124, wherein the CIP sensor assembly comprises: a first pressure sensor for sensing the pressure of water flowing through the water inlet into the CIP tank; a second pressure sensor for sensing the pressure of water flowing out of the pump; a first flow meter for sensing the flow of water flowing through the water inlet into the CIP tank; and a second flow meter for sensing the flow of water flowing from the CIP tank; at least one temperature sensor for sensing the temperature of water flowing through at least one of the water inlet, an outlet from the CIP tank, and a pump outlet; and a communication device configured to communicatively couple the CIP sensors and transmit CIP sensor data to the machine computing device.

Clause 126. The system of Clause 125, wherein the instructions, in response to execution by the at least one processor, cause the machine computing device to perform actions further comprising: storing in the data store, by the machine computing device, data from the at least one sensor of the at least one cleaning step of past cleaning sessions of the food processing machine; processing, by the machine computing device, the data from the at least one sensor of the at least one cleaning step of at least one of current and past cleaning sessions using a machine learning model to determine at least one strategy for optimizing a future cleaning session of the food processing machine.

Clause 127. The system of Clause 126, wherein the instructions, in response to execution by the at least one processor, cause the machine computing device to perform actions further comprising: modifying, by the machine computing device, at least one cleaning step of a future cleaning session of the food processing machine in response to the at least one strategy.

Clause 128. The system of Clause 127, wherein the instructions, in response to execution by the at least one processor, cause the machine computing device to perform actions further comprising: monitoring and recording, by the machine computing device, at least one of food processing machine performance metrics and CIP sensor data between cleaning sessions of the food processing machine.

Clause 129. The system of Clause 128, wherein the instructions, in response to execution by the at least one processor, cause the machine computing device to perform actions further comprising: correlating, by the machine computing device, the food processing machine performance metrics between cleaning sessions using the at least one cleaning step with cleaning session metrics generated from data from the at least one sensor of past cleaning sessions of the food processing machine using the at least one cleaning step.

Clause 130. The system of Clause 128 or 129, wherein the machine performance metrics between cleaning sessions include at least one of a type of product processed by the food processing machine, a throughput of product of the food processing machine, a temperature of product processed by the food processing machine at various points within the food processing machine, a temperature of a chamber inside the food processing machine, a production start and end time of the food processing machine, and an indication of whether a past or next cleaning session is a post- or pre-production cleaning.

Clause 131. The system of Clause 128, 129, or 130, wherein the instructions, in response to execution by the at least one processor, cause the machine computing device to perform actions further comprising: displaying, by the machine computing device, a machine cleaning optimization step configured to improve at least one of future cleaning sessions for the machine and an overall cleaning process for the machine.

Clause 132. The system of Clause 131, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying the at least one step in the cleaning process, using a different a cleaning recipe from a previous cleaning session, combining cleaning steps, adjusting aspects of a production run before the cleaning session, decreasing the length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when the level goes below a recommended threshold, providing detailed information on how to fix an issue, increasing the temperature of a fluid, performing a cleaning system effectiveness assessment, and performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

Clause 133. The system of Clause 131 or 132, wherein the instructions, in response to execution by the at least one processor, cause the machine computing device to perform actions further comprising: performing the machine cleaning optimization step.

The invention claimed is:

1. A system for optimizing a cleaning process of a food processing machine, the system comprising:

- a food processing machine having at least one sensor for performing at least one of detecting and measuring a physical property of the food processing machine during a cleaning session having at least one cleaning step;
- a machine computing device having at least one processor and a non-transitory computer-readable medium;
- wherein the machine computing device is communicatively coupled to the food processing machine;
- wherein the non-transitory computer-readable medium has a data store and computer-executable instructions stored thereon; and
- wherein the instructions, in response to execution by the at least one processor, cause the machine computing device to perform actions comprising:
  - receiving, by the machine computing device, data from the at least one sensor;
  - processing, by the machine computing device, the data from the at least one sensor; and
  - displaying, by the machine computing device, processed sensor data as a first metric relating to at least one cleaning step of a selected cleaning session of the food processing machine compared to an average first metric of the at least one cleaning step of a plurality of past cleaning sessions of the food processing machine.

2. The system of claim 1, wherein the instructions, in response to execution by the at least one processor, cause the machine computing device to perform actions further comprising:

- storing in the data store, by the machine computing device, data from the at least one sensor of the at least one cleaning step of past cleaning sessions of the food processing machine;
- processing, by the machine computing device, the data from the at least one sensor of the at least one cleaning step of at least one of current and past cleaning sessions using a machine learning model to determine at least one strategy for optimizing a future cleaning session of the food processing machine.

3. The system of claim 2, wherein the instructions, in response to execution by the at least one processor, cause the machine computing device to perform actions further comprising:

modifying, by the machine computing device, at least one cleaning step of a future cleaning session of the food processing machine in response to the at least one strategy.

4. The system of claim 1, wherein the instructions, in response to execution by the at least one processor, cause the machine computing device to perform actions further comprising:

monitoring and recording, by the machine computing device, machine performance metrics between cleaning sessions of the food processing machine.

5. The system of claim 4, wherein the instructions, in response to execution by the at least one processor, cause the machine computing device to perform actions further comprising:

correlating, by the machine computing device, the machine performance metrics between cleaning sessions using the at least one cleaning step with cleaning session metrics generated from data from the at least one sensor of past cleaning sessions of the food processing machine using the at least one cleaning step.

6. The system of claim 4, wherein the machine performance metrics between cleaning sessions include at least one of a type of product processed by the food processing machine, a throughput of product of the food processing machine, a temperature of product processed by the food processing machine at various points within the food processing machine, a temperature of a chamber inside the food processing machine, a production start and end time of the food processing machine, and an indication of whether a past or next cleaning session is a post- or pre-production cleaning.

7. The system of claim 4, wherein the instructions, in response to execution by the at least one processor, cause the machine computing device to perform actions further comprising:

displaying, by the machine computing device, a machine cleaning optimization step configured to improve at least one of future cleaning sessions for the machine and an overall cleaning process for the machine.

8. The system of claim 7, wherein the machine cleaning optimization step includes at least one of replacing machine components, adjusting set points for time and temperature, adjusting at least one of a pH and chemical concentration of a cleaning solution, adjusting nozzle configuration, automating the cleaning process, modifying the at least one step in the cleaning process, using a different a cleaning recipe from a previous cleaning session, combining cleaning steps, adjusting aspects of a production run before the cleaning session, decreasing a length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when a level goes below a recommended threshold, providing detailed information on how to fix an issue, increasing the temperature of a fluid, performing a cleaning system effectiveness assessment, and performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

9. The system of claim 7, wherein the instructions, in response to execution by the at least one processor, cause the machine computing device to perform actions further comprising:

performing the machine cleaning optimization step.

10. The system of claim 1, wherein the instructions, in response to execution by the at least one processor, cause the machine computing device to perform actions further comprising:

displaying, by the machine computing device, at least one of real time metrics and past session metrics for a selected cleaning session of the food processing machine.

11. The system of claim 1, wherein the instructions, in response to execution by the at least one processor, cause the machine computing device to perform actions further comprising:

displaying, by the machine computing device, a status indicating at least one of an alarm, a wait time, and an indication of a LO/TO event(s) generated during a step of the selected cleaning session.

12. The system of claim 11, wherein the instructions, in response to execution by the at least one processor, cause the machine computing device to perform actions further comprising:

displaying, by the machine computing device, at least one of further details and recommended actions for addressing an issue that generated the alarm during the step of the selected cleaning session.

13. The system of claim 1, wherein the instructions, in response to execution by the at least one processor, cause the machine computing device to perform actions further comprising:

displaying, by the machine computing device, a machine cleaning optimization step configured to improve at least one of future cleaning sessions for the machine and an overall cleaning process for the machine.

14. The system of claim 13, wherein the machine cleaning optimization step includes at least one of replacing machine components, adjusting set points for time and temperature, adjusting at least one of a pH and chemical concentration of a cleaning solution, adjusting nozzle configuration, automating the cleaning process, changing at least one step in the cleaning process, combining cleaning steps, using a different cleaning recipe, decreasing a length of a cleaning step using water, increasing the length of a cleaning step using water, monitoring an inspection step, increasing at least one of a ramp, soak, or hold time at a specified temperature, adjusting a configuration of at least one of a pump and a spray nozzle to create a necessary volumetric rate distribution to the spray nozzle, replenishing cleaning solution when a level goes below a recommended threshold, providing detailed information on how to fix an issue, increasing the temperature of a fluid, adjusting aspects of a production run before the cleaning session, performing a cleaning system effectiveness assessment, and performing, by the machine computing device, a food safety technical cleaning effectiveness assessment giving full data sets with trend plots from machine mounted sensors during a cleaning session running a chosen historical timing of a sanitation assessment period data gathering concurrent or relevant to a form of manual sanitation effectiveness testing.

15. The system of claim 13, wherein the instructions, in response to execution by the at least one processor, cause the machine computing device to perform actions further comprising:

performing the machine cleaning optimization step.

16. The system of claim 1, wherein the instructions, in response to execution by the at least one processor, cause the machine computing device to perform actions further comprising:

at least one of displaying and performing, by the machine computing device, a machine cleaning optimization step configured to improve at least one of future cleaning sessions for the machine and an overall cleaning process for the machine.

17. The system of claim 16, wherein the machine cleaning optimization step includes at least one of adjusting set points for time and temperature, adjusting at least one of a pH and chemical concentration of a cleaning solution, automating the cleaning process, changing at least one step in the cleaning process, combining cleaning steps, using a different cleaning recipe, adjusting aspects of a production run before the cleaning session, decreasing a length of a cleaning step using water, increasing the length of a cleaning step using water, monitoring an inspection step, increasing at least one of a ramp, soak, or hold time at a specified temperature, providing detailed information on how to fix an issue, increasing the temperature of a fluid, and performing a cleaning system effectiveness assessment.

18. The system of claim 1, wherein the food processing machine is a freezer, and wherein the cleaning session for the freezer includes at least one of the following cleaning steps: defrosting an evaporator coil, pre-rinsing a freezer interior and freezer components, applying at least one of a cleaning solution and foam to a freezer interior and freezer components, rinsing the freezer interior and freezer components, inspecting the freezer interior and freezer components, disinfecting the freezer interior and freezer components, spot cleaning the freezer interior and freezer components, and drying the freezer interior and freezer components.

19. A method for optimizing a cleaning process of a food processing machine, the method comprising:

performing, with at least one sensor, at least one of detecting and measuring a physical property of at least one of a food processing machine and a clean-in-place (CIP) system for carrying out a CIP process on the food processing machine during at least one cleaning step of a cleaning session;

receiving, by a machine computing device, data from the at least one sensor;

processing, by the machine computing device, the data from the at least one sensor; and displaying, by the machine computing device, processed sensor data as a first metric relating to the at least one cleaning step of the cleaning session of the food processing machine compared to an average first metric of the at least one cleaning step of a plurality of past cleaning sessions of the food processing machine.

20. The method of claim 19, further comprising:

storing, by the machine computing device in a data store of the machine computing device, data from the at least one sensor of the at least one cleaning step of past cleaning sessions of the food processing machine;

processing, by the machine computing device, the data from the at least one sensor of the at least one cleaning step of at least one of current and past cleaning sessions using a machine learning model to determine at least one strategy for optimizing a future cleaning process of the food processing machine.

* * * * *